United States Patent
Ackmann et al.

(10) Patent No.: US 12,314,024 B2
(45) Date of Patent: *May 27, 2025

(54) METHOD FOR ESTABLISHING A BUILDING AUTOMATION SYSTEM INCLUDING INSTALLING A PLURALITY OF CONTROLLABLE DEVICES IN A PLURALITY OF ROOMS IN A BUILDING

(71) Applicant: Crestron Electronics, Inc., Rockleigh, NJ (US)

(72) Inventors: Evan Robert Ackmann, Hoboken, NJ (US); Fred Bargetzi, Upper Saddle River, NJ (US); John Pavlik, Ossining, NY (US); Doug Jacobson, Oradell, NJ (US)

(73) Assignee: Creston Electronics, Inc., Rockleigh, NJ (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/946,605

(22) Filed: Sep. 16, 2022

(65) Prior Publication Data

US 2023/0018372 A1 Jan. 19, 2023

Related U.S. Application Data

(63) Continuation of application No. 16/945,961, filed on Aug. 3, 2020, now Pat. No. 11,449,024.

(51) Int. Cl.
G05B 19/042 (2006.01)
G05B 15/02 (2006.01)

(52) U.S. Cl.
CPC ......... *G05B 19/0426* (2013.01); *G05B 15/02* (2013.01); *G05B 2219/2642* (2013.01)

(58) Field of Classification Search
CPC ................ G05B 19/0426; G05B 19/02; G05B 2219/2642; G05B 15/02
See application file for complete search history.

(56) References Cited

U.S. PATENT DOCUMENTS

| | | | | |
|---|---|---|---|---|
| 9,087,514 | B2* | 7/2015 | Jonsson | H04L 12/2827 |
| 11,449,024 | B2* | 9/2022 | Ackmann | G05B 15/02 |
| 2004/0260407 | A1* | 12/2004 | Wimsatt | H04L 12/282 |
| | | | | 700/20 |
| 2012/0239807 | A1* | 9/2012 | Davis | G08B 25/007 |
| | | | | 709/224 |
| 2013/0322281 | A1* | 12/2013 | Ludlow | H04W 48/18 |
| | | | | 370/252 |
| 2014/0106735 | A1* | 4/2014 | Jackson | H04W 8/245 |
| | | | | 455/419 |
| 2014/0129032 | A1* | 5/2014 | Harris | G05B 15/02 |
| | | | | 700/275 |
| 2015/0048924 | A1* | 2/2015 | Feldstein | G07C 9/27 |
| | | | | 340/5.51 |
| 2015/0120000 | A1* | 4/2015 | Coffey | H04W 12/50 |
| | | | | 315/86 |

* cited by examiner

*Primary Examiner* — Khiem D Nguyen
(74) *Attorney, Agent, or Firm* — Mark W. Hrozenchik

(57) ABSTRACT

A control system configurable by a configuration application and comprising one or more control processors, one or more gateways, a communication network, a portable electronic device executing the configuration application and one or more controllable devices wherein the controllable device is represented by one or more virtual devices.

17 Claims, 53 Drawing Sheets

FIG. 34

METHOD FOR ESTABLISHING A BUILDING AUTOMATION SYSTEM INCLUDING INSTALLING A PLURALITY OF CONTROLLABLE DEVICES IN A PLURALITY OF ROOMS IN A BUILDING

Related subject matter is disclosed in Applicants' U.S. Provisional Patent Application No. 62/216,971, Matter No. CP00328-00, entitled "Acoustic Sensory Network," co-filed on 10 Sep. 2015, as well as to U.S. Non-provisional patent application Ser. No. 15/261,296, filed on 9 Sep. 2016 (Client Matter No. CP00328-01), and to U.S. Non-provisional patent application Ser. No. 15/376,846, filed on 13 Dec. 2016 (Client Matter No. CP00328-02), the entire contents of all of which are expressly incorporated herein by reference.

PRIORITY INFORMATION

The present application claims priority under 35 U.S.C. § 119(e) to U.S. Provisional Patent Application Ser. No. 62/048,722, filed on Sep. 10, 2014, and claims priority under 35 U.S.C. § 120 as a Continuation application to U.S. Non-provisional patent application Ser. No. 14/850,904, filed on Sep. 10, 2015, and further claims priority under 35 U.S.C. § 120 as a Continuation Applications to U.S. Non-provisional patent application Ser. No. 16/945,961, filed on Aug. 3, 2020, the entire contents of all of which are expressly incorporated herein by reference.

BACKGROUND OF THE INVENTION

Technical Field

Aspects of the embodiments relate generally to control networks, and more specifically to systems, methods, and modes for programming a control network and more specifically for programming a control network comprising one or more lighting, shade, audio-visual, security, and other type of controllable devices.

Background Art

Today, home control network programmers can use software tools for programming lighting systems. For example, programmers programming a system from Crestron Electronics, Inc. of Rockleigh, NJ can use SIMPL Windows software tools, D3 Pro software tools or SystemBuilder software tools to program a lighting system. Such programming environments require a trained user with a laptop to be on-site and are heavily geared towards extreme flexibility. This may be suitable for some end-users, but a different approach may be desired to make installation, set-up, and configuration more user friendly, without losing functionality.

SUMMARY OF THE INVENTION

An object of the embodiments is to substantially solve at least the problems and/or disadvantages discussed above, and to provide at least one or more of the advantages described below.

It is therefore a general aspect of the embodiments to provide systems, methods, and modes for programming a control network and more specifically for programming a control network comprising one or more lighting, shade, and other types of controllable devices that will obviate or minimize problems of the type previously described.

According to a first aspect of the embodiments, a control system is provided configurable by a configuration application and comprising (a) a control processor; (b) a gateway; (c) a controllable device wherein the controllable device is represented by a virtual device; (d) a communication network; and (e) a portable electronic device executing the configuration application.

According to a second aspect of the embodiments, a method for configuring a control system is provided comprising: (a) loading a configuration application on a portable electronic device; (b) discovering and pairing with a control processor; (c) creating one or more rooms on the configuration application; (d) discovering and pairing with a gateway; (e) putting the gateway and one or more controllable devices in acquire mode; (f) adding the one or more controllable devices to the one or more rooms wherein the one or more controllable devices are represented by one or more virtual devices; (g) assigning groups; (h) setting scenes; (i) configuring user interfaces; and (j) setting time of day events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified.

FIG. 34 illustrates a maintenance mode graphical user interface according to an aspect of the embodiments.

DETAILED DESCRIPTION OF THE INVENTION

Figure 1:
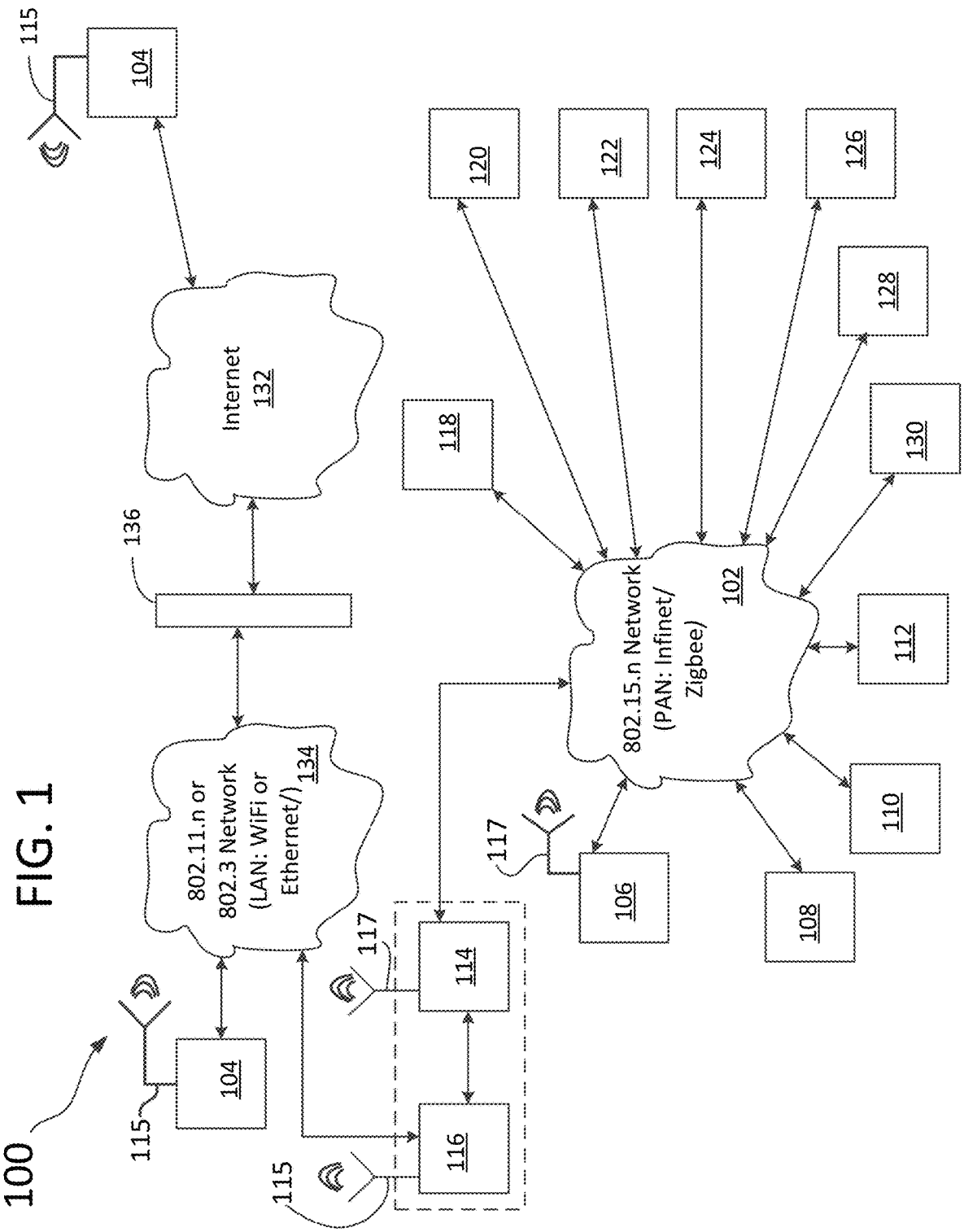
FIG. 1 illustrates a block diagram of a control network for controlling one or more controllable devices in home, business, or enterprise environment according to an aspect of the embodiments.

Aspects of the embodiments can be generally implemented as part of a control network also known as a control system. Hence, an illustrative control network and its operation will be described initially.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Aspects of the embodiments described herein are provided in the context of a control network that incorporates such controllable devices as lighting control devices, audio-video devices, security devices, environmental control devices, and shade control devices, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as control network 100, can be manufactured by Crestron Electronics Inc., located in Rockleigh, NJ, and have been marketed and sold under the registered trademark names of Pyng®, 3-Series, among others.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of a control system for controlling controllable devices such as lighting products, shades, environmental controls, security devices, and the like. However, the embodiments to be discussed next are not limited to these systems but can be applied to other control systems that control other types or classifications of controllable devices, including those described above, and others, such as could be used in manufacturing/production facilities, and the like.

The following embodiments are discussed, for simplicity, with regard to a system and method for controlling controllable devices such as lighting devices, shade devices, environmental devices, security devices, and the like, generally in a home or business enterprise environment. However, the embodiments to be discussed next are not limited to controlling controllable devices in home or business enterprise environments, but also to other systems that contain controllable devices, such as manufacturing or other enterprise entities.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics can be combined in any suitable manner in one or more embodiments.

According to embodiments, the problems described above can be addressed by, for example, an integrated home, business, or enterprise control system that makes use of advanced programming techniques and sophisticated (but easy-to-use) controllable devices to provide the user with the ability to setup automation and pattern-recognition of these controllable devices, in regard to, by way of non-limiting example, environmental, lighting, shades, and security systems, among other controllable devices/systems. The setup can be accomplished, according to aspects of the embodiments, in part autonomously, and in part through use of easy to use graphical user interfaces (GUIs).

Used throughout the specification are several acronyms, the meanings of which are provided as follows:
- 3G Third Generation
- 4G Fourth Generation
- App Application
- ARM Advanced RISC Machine
- ASICs Application Specific Integrated Circuits
- AV Audio/Video
- CAT 5 Category 5 Cable (CAT 5)
- CISC Complex Instruction Set
- CLI Command Line Interface
- CPU Central Processing Unit
- CRT Cathode Ray Tube
- DHCP Dynamic Host Communication Protocol
- EDGE Enhanced Data Rates for Global System for Mobile Communications Evolution
- EGPRS Enhanced General Packet Radio Service
- GPS Global Positioning System
- GSM Global System for Mobile Communications
- GUI Graphical User Interface
- HDD Hard Disk Drive
- HVAC Heating Ventilation and Air Conditioning
- IR Infra-Red
- IrDA Infra-red Data Association
- I/O Input/Output
- IEEE Institute of Electrical and Electronic Engineers
- IMT-SC International Mobile Telecommunications—Single Carrier
- IP Internet Protocol
- IR Infrared
- ISO International Standards Organization
- LAN Local Area Network
- LCD Liquid Crystal Display
- LED Light Emitting Diode
- MAC Media Access Control
- MEMS Microelectromechanical Systems
- MS-DOS Microsoft Disc Operating System
- NFC Near Field Communication
- NIC Network Interface Cards
- NWC Network Controller
- NWI Network Interface
- OCR Optical Character Recognition
- OLED Organic Light Emitting Diode
- OS Operating System
- PAN Personal Area Network
- PC Personal Computer
- PDA Personal Digital Assistant
- PED Portable Electronic Device
- PoE Power-Over-Ethernet
- PRA Pattern-Recognition Algorithm/Application
- PSTN Public Switched Telephone Network
- RAM Random Access Memory
- RCD Remote Control Devices
- RF Radio Frequency
- RFID Radio Frequency Identification
- RISC Reduced Instruction Set Processor
- ROM Read-Only Memory
- TOD Time of Day
- TV Television
- USB Universal Serial Bus
- UWB Ultra Wideband Network
- WAN Wide Area Network The following is a list of the elements of the figures in numerical order:
- 100 Control Network
- 102 IEEE 802.15.4 Communication Network (Infinet, Zigbee)
- 104 Portable Electronic Device (PED)
- 106 Control Point/User Interface/Keypad
- 108 Sensor
- 110 Lighting Control Device (Lighting Device)
- 112 Shade Control Device (Shade Device)
- 114 Gateway Device
- 115 First Antenna (IEEE 802.3 Wi-Fi Antenna))
- 116 Control Processor
- 117 Second Antenna (IEEE 802.15.4 Mesh Network Antenna)
- 118 Audio/Video (AV) Device
- 120 Heating Ventilation and Air Conditioning (HVAC) Device
- 122 Security Device
- 124 Household Appliances
- 126 Control Device
- 128 Industrial Device
- 130 Repeaters
- 132 Internet
- 134 IEEE 802.11/802.3 Communication Network (LAN; WiFi; or Ethernet)
- 136 Router/Firewall
- 202 Central Processor Unit (CPU)
- 204 Nonvolatile Storage
- 206 Main Memory
- 208 Network Interfaces
- 210 Wired I/O Interface
- 212 Personal Area Network (PAN) Interface
- 214 Local Area Network (LAN) Interface
- 216 Wide Area Network (WAN) Interface
- 218 Programmable Relay Ports
- 220 Bus
- 302 Network Interface (NWI)
- 304 Power On/Off LED
- 306 Network Activity Indicator LED
- 308 Activity Indicator LED
- 310 Acquire Button
- 312 Setup Button
- 316 Gateway Central Processing Unit (CPU)
- 318 Bus
- 402 PED Central Processing Unit (CPU)
- 404 Wired I/O Interface
- 406 Location Sensing Circuitry
- 408 User Interface
- 410 Display
- 412 Non-volatile Storage
- 414 Main Memory
- 416 NFC Interface
- 418 Accelerometers
- 420 Camera
- 422 Network Interface
- 424 PAN Interface
- 426 LAN Interface—First Antenna (IEEE 802.3 Wi-Fi Antenna Transceiver, or IEEE 802.15.4 Antenna Transceiver))
- 428 WAN Interface
- 500 Signal Flow Diagram Between Hardware and Software Components of Control Network 100
- 502 Project File
- 504 Crestron Control Application (Crestron App)
- 506 Configuration Application (Configuration App)
- 508 Smart Graphics Project File 510 Smart Object Application (Smart Object App)
512 Control System Application (Control System App)
520 Open Message
522 Request Project Message
524 Send Project Message
526 Display Message
528 Touch Message
530 Get Join #Message 1
532 Get Smart Object Message
534 Return Smart Object Message
536 Return Join #Message
538 Command Message
540 Device Specific Message
542 Feedback Update Information Message
546 Display Feedback Message
600 Method for Installing, Setting Up, and Using Control Network 100
602-608 Method Steps of Method 600
700 Method for Installing Configuration App 506
702-706 Method Steps of Method 700
800 Method for Setting Up Control Network 100
802-812 Method Steps of Method 800
900 Method for Configuration of Devices
902-906 Method Steps of Method 900
1002a-d Windows
1004a,b File Icons
1004c Hard Drive Icon
1004d Folder Icon
1004e Trash Can
1006 Menu
1008 Monitor Screen
1010 GUI
1012 Image
1014 Text File
1016 Pointer
1018 Application/Program
1020 Fields
1022 Buttons
1100 Control System Installation GUI
1200 Control System Configuration GUI
1202 Build Your Home Button
1204 Find Your Devices Button
1206 Configure Shade Groups Button
1208 Setup Lighting and Shading Scenes Button
1210 Configure Automation Rules and Behaviors Button
1212 Maintenance Mode Button
1214 Help Button
1300 Room Configuration GUI
1302 Done Button
1304 Help Button
1306 Edit Box
1308 Add Button
1310 Pre-Named House Room List
1312 Keyboard
1314 Inline Edit Button
1316 Inline Delete Button
1318 Rooms in Your House List
1400 Acquire RF Device GUI
1402 Number of Devices Field
1404 Unassigned Assets List
1406 Configure Button
1408 Room Selection List
1410 Devices in Selected Room List
1412 Add Button
1414 Inline Edit Button
1416 Inline Delete Button
1418 Information Button
1420 Done Button
1500 Shade Group Configuration GUI
1502 Number of Devices Field
1504 Room Selection List
1506 Add Button
1508 Add Shade to Room Field
1510 Fabric/Facing Field
1514 Configure Button
1518 Information Button
1520 Done Button
1600 Shade Group Configuration GUI
1602 Shade Group Configuration Window
1604 Shade Group Window Facing Box
1606 Shade Group Type Box
1608 Shade Group Direction Box
1610 Shade Group Fabric Type Box
1612 Shade Group Save Button
1614 Shade Group Cancel Button
1616 Shade Group Information Button
1700 Intermediate Scene Configuration Menu GUI
1702 Scene Configuration Help Button
1704 Scene Configuration Back Button
1706 Configure Lighting Scene Button
1708 Configure Shade Scene Button
1800 Lighting Scene Configuration GUI
1802 Lighting Scene Configuration Information Button
1804 Lighting Scene Configuration Done Button
1806 Add Button
1808 Lighting Scene Room Selection Window
1810 Selected Room Lighting Scene Window
1812 Lighting Scene Inline Edit Button
1814 Lighting Scene Configure Button
1816 Lighting Scene Delete Button
1900 Good Morning Scene Configuration GUI
1902 Loads
1904 Sliders
1906 Cancel Button
1908 Save Button
1912 Information Button
1914 Recall Time Indicator Field
1916 Off Time Indicator Field
2000 Shading Scene Configuration GUI
2002 Shading Scene Configuration Information button
2006 Add Scene Button
2008 Shading Scene Room Selection Window
2010 Selected Room Shading Scene Window
2012 Shading Scene Inline Editor Tool
2014 Shading Scene Configure (Configure) Button
2016 Shading Scene Delete (Delete) Button
2100 Good Morning Scene Configuration GUI
2102 Shades Field
2104 Sliders
2106 Cancel Button
2112 Information Button
2200 Control Network Automation GUI (Automation GUI)
2202 Information Button
2204 Back Button
2206 Configure Time of Day (TOD) Based Events (Configure TOD Events) Button
2208 Configure User Interface Button
2300 Time Clock-Schedule GUI
2302 Information Button
2304 Done Button
2306 Timed Events Field
2308 New Events Parameter Field 2310 New Event Actions Field
2312 New Time Based Event Field
2400 Configure User Interfaces GUI
2402 Information Button
2404 Done Button
2406 Room Select Field
2408 Selected Room User Interfaces Field
2410 Configure Button
2500 Configuration Overlay GUI
2502 Information Button
2504 Cancel Button
2506 Save Button
2508 Configure Selected Device Field
2510 Selected Device Button Definition Field
2512 Button Display Image
2514 Learn Layout Button
2516 Keypad Color Designation (Pallet) Button
2518 Button Definition Field
2600 Press Installed Button Instruction GUI
2602 Finish Button
2700 Color Pallet GUI
2800 Pairing Virtual Device GUI
3202 Fade Time Field
3300 Macro Definition Screen GUI
3400 Maintenance Mode GUI
3402 Information Button
3404 Done Button
3406 Order Engravings Button
3408 Upload Diagnostics Button
3410 System Devices Field
3412 Configure Button
3500 Order Engravings GUI
3502 Select All Button
3504 Selection None Button
3506 Cancel Button
3508 Save to Control Network Button
3510 Email Button
3512 Name—Location—Model Field
3514 Show More Arrow
3516 Order Amount Checkbox
3600 Lights/Shades Smart Objects Creation GUI
3700 Scene Location Smart Objects Creation GUI
3702 Scene Field
3704 Add New Scene Button
4000 Signal Flow Diagram
4002 Configuration Application Database (Configuration App Database)
4004 PED Database (Database)
4006 Button
4008 Hub
4010 Lighting Function
4012 Configuration Information Update
4014 Signal Flow
4016 Command Signal
4104 Room
4106 Sensor
4108 Light
4110 Keypad Control Device
4202 First Room
4204 First Room Vent(s)
4206 First Room Thermostat
4208 Second Room
4210 Second Room Vent(s)
4212 Second Room Thermostat
4300 Method for Creation of A New Scene
4302-4312 Method Steps of Method 4300
4400 Method for Configuring a Control System
4402-4420 Method Steps of Method 4400
4500 Method for Automatic Creation of All-On/All-Off Scenes in a Lighting Control System
4502-4510 Method Steps of Method 4500
4600 Method for Automatic Configuration Backup in a Control System
4602-4610 Method Steps of Method 4600
4700 Method for Utilization of Virtual Devices in Configuring a Control System
4702-4710 Method Steps of Method 4700
4800 Method for Integration of an AV Control System With a Lighting Control System
4802-4808 Method Steps of Method 4800
4900 Method for Instantaneous Function Creation in a Control System
4902-4914 Method Steps of Method 4900
5100 Scheduler GUI
5102 Play Button
5200 Alternate Embodiment of Configure User Interfaces GUI
5300 Block Diagram of Processing and Memory Components of One or More Electronic Devices That Make Up Control Network 100 [Personal Computer/Laptop/Tablet/Personal Electronic Device (PED)/Server (PC)]
5302 Integrated Display/Touch-Screen (Laptop/Tablet among others)
5304 Internal Data/Command Bus (Bus)
5306 Processor Internal Memory
5308 Processor(s)
5310 Universal Serial Bus (USB) Port
5311 Ethernet Port
5312 Compact Disk (CD)/Digital Video Disk (DVD) Read/Write (RW) (CD/DVD/RW) Drive
5314 Floppy Diskette Drive
5316 Hard Disk Drive (HDD)
5318 Read-Only Memory (ROM)
5320 Random Access Memory (RAM)
5322 Video Graphics Array (VGA) Port or High Definition Multimedia Interface (HDMI)
5324 External Memory Storage Device
5332 Processor Board/PC Internal Memory (Internal Memory)
5334 Flash Drive Memory
5336 CD/DVD Diskettes
5338 Floppy Diskettes
5340 Executable Software Programming Code/Application (Application, or "App")
5356 Universal Serial Bus (USB) Cable FIG. 1 illustrates a block diagram of control network 100 that includes controllable devices, monitoring devices, and active devices according to aspects of the embodiments. Control network 100 comprises Institute of Electrical and Electronic Engineers standard (IEEE) 802.15.4 communication network (communication network) 102, portable electronic device (PED) 104, control point 106 (e.g., keypad), gateway device 114, control processor 116, and one or more controllable devices such as, but not limited to, sensors 108, lighting control devices (lighting device) 110, shade control devices (shade device) 112, audio/video (A/V) devices 118, heating ventilation and air conditioning (HVAC) devices 120, and security devices 122. As those of skill in the art can appreciate, there can be one or more of each of the controllable devices, and control processor 116, PED 104, control point 106, and gateway 114, and even two or more communication networks 102a,b according to aspects of the embodiments. Control network 100 can further include IEEE 802.11/802.3 communication network, which can be a LAN, WiFi, or Ethernet network (from hereon in, 134 shall be referred to as LAN 134), router/firewall 136, and internet 132. As shown in FIG. 1, PED 104 can access control network 100 through internet 132 and/or LAN 134. In the former, a router/firewall 136 can be used to protect control network 100 and direct commands from PED 104 to the remaining components of control network 100, as well as provide feedback information to PED 104 from the devices of control network 100. As those of skill in the art can appreciate, a firewall is a system designed to prevent unauthorized access to or from a private network. Firewalls can be implemented in either hardware or software, or a combination of both. A router is a device that forwards data packets along networks. A router can be connected to at least two networks and are located at gateways. According to further aspects of the embodiments, gateway 114 and control processor 116 can be part of the same device, as the dashed line box around the two indicates. According to further aspects of the embodiments, while ostensible all or substantially all of the controllable devices will be wireless devices, one or more can be connected to gateway 114 and/or control processor 116 by cabling (not shown).

According to further aspects of the embodiments, sensors 108 provide information to the various hardware and software components of the system and method of the aspects of the embodiments that can be used to ascertain the location, movements, and mannerisms of the users of control network 100. That is, sensors 108 can be used in helping to determine patterns of usage, and also to augment decision making capabilities in determining what actions to take (e.g., open shades, close shades, based on occupancy (or lack thereof)) or not to take, as the case may be, according to aspects of the embodiments.

Also shown in FIG. 1 are first antenna 115, and second antenna 117. First antenna 115 is designed to work in the frequency band appropriate for Institute of Electrical and Electronic Engineers (IEEE) standard 802.11n, where n can be one of a, b, g, among other versions of the standard (herein after referred to as "802.11"). As those of skill in the art can appreciate, the IEEE 802.11 standards encompass wireless local area networks (LANs), in this case, those that are referred to as "Wi-Fi" networks. Thus, first antenna 115 is an antenna capable of transceiving Wi-Fi signals; not shown, though part of control processor 116, is a Wi-Fi transceiver, which can process signals for Wi-Fi transmission and reception thereof as well. PED 104 also includes first antenna 115, and is also equipped with a Wi-Fi transceiver, for substantially similar purposes as that of control processor 116.

Second antenna 117 is designed to work in the frequency band appropriate for IEEE standard 802.15.n, where n can be one of 1-6, among other versions of the standard (herein after referred to as "802.15"). As those of skill in the art can appreciate, the IEEE 802.15 standards encompass personal area wireless networks (PANs). In this case, the PAN can be one those that are referred to as "Zigbee" networks, or, according to further aspects of the embodiments, an Infinet® as designed and manufactured by Crestron Electronics, Inc., of Rockleigh, NJ Thus, second antenna 117, which is part of gateway device 114, is an antenna capable of transceiving Zigbee or Infinet signals; not shown, though part of all of the other controllable devices, is suitably designed transceiver, which can process signals for Zigbee/Infinet transmission and reception thereof as well. All of the other controllable devices utilize such wireless communications devices, so all of them will also include second antenna 117, and be also equipped with a suitable transceiver, for substantially similar purposes as that of gateway device 114.

According to aspects of the embodiments, the one or more controllable devices comprise lighting control device (lighting device) 110, which can include devices such as a lighting dimmer, and shade control device (shade device) 112, which can include devices such as a shade motor. It should be understood that the controllable devices are not limited to a dimmer and a shade motor. For example, lighting device 110 can be a switch or a relay panel, and shade device 112 can be a drapery motor or a smart window film. Additionally, those of skill in the art can appreciate that the controllable devices are not limited to lighting control devices and shade control devices. For example, the controllable devices can be: A/V devices 118 that can include one or more of content sources (audio source, video source), content sinks (televisions and the like), video recorders, audio receivers, speakers, projectors, and the like; Lighting devices 110 that can include one or more of lamps, ballasts, light emitting diode (LED) drivers; HVAC devices 120 that can include one or more of thermostats, occupancy sensors, air conditioning units, heating units, filtration systems, fans, humidifiers, and the like; Shading devices 112 that can include one or more of motorized window treatments, dimmable windows, and the like; Security devices 122 that can include one or more of security cameras, monitors, door locks, and the like; Household appliances 124 that can include one or more of refrigerators, ovens, blenders, microwaves, and the like; Control devices 126 that can include one or more of switches, relays, current limiting devices, and the like; and Industrial devices 128 that can include one or more of motors, pumps, chillers, air compressors, and the like.

In addition, control network 100 can comprise one or more control points 106 for receiving user inputs to control each of the one or more controllable devices. Control points 106 can be keypads, touch-panels, remote controls, and thermostats. Additionally, control points 106 can be user interfaces of the controllable devices themselves. Control point 106 can transmit control commands to and through communication network 102 to control each of the other controllable devices of control network 100, as well as communicate information to/from such controllable devices. For example, control point 106 can communicate with each of the controllable devices or with control processor 116 either directly or via one or more of gateways 114 and/or repeaters 130 (repeaters 130 can communicate with additions control networks 100b, and/or communication networks 102b, and so on).

According to further aspects of the embodiments, control point 106 can comprise feedback indicators to provide feedback to the user. The feedback indicators can include both of visual feedback indicators and audible feedback indicators, or just one or the other. Feedback indication can be provided by control point 106 upon receiving a user input, upon requesting feedback, or upon a change in the status of any of the controllable devices 108, 110, 112, 118, 120, 122, 124, 126, 128, and 130, and PED 104.

Such controllable lighting devices 110 and control points 106 can be manufactured by Crestron Electronics Inc., of Rockleigh, NJ For example, one or more controllable lighting devices 110 and control points 106 can comprise the following devices, each available from Crestron Electronics: CLW-DIMEX wireless lighting dimmer, CLW-DELVEX wireless lighting dimmer, CLW-SWEX wireless switch, CLW-DIMSWEX wireless switch/dimmer combination, CLW-LSWEX wireless lamp switch, CLF-LDIMUEX wireless lamp dimmer, CLWI-DIMUEX universal phase dimmer, CLWI-SWEX in-wall switch, CLWI-1SW2EX in-wall 2-channel switch, CLWI-DIMFLVEX 0-10V Dimmer, CLCI-DIMUEX wireless in-ceiling dimmer, CLCI-1DIMFLV2EX wireless In-Ceiling 0-10V dimmer, CLCI-1SW2EX wireless in-ceiling switch, CLC-1DIMFLV2EX-24V wireless in-ceiling 0-10V dimmer.

Other components of control network 100 can also be manufactured by Crestron Electronics Inc. These include one or more controllable shade devices and control points that comprise the following devices: CSC-ACEX infiNET EX® Interface to shade motor, CSC-DCEX infiNET EX® interface to Crestron CSM-QMT30 Shades, CSC-DRPEX, and the CSM-QMT50EX QMT motor.

In addition, the one or more control points 106 can comprise the following devices, also available from Crestron Electronics, Inc.: INET-CBDEX Cameo® Express Wireless Keypad with infiNET EX®, HTT-B2EX battery-powered infiNET EX® 2-button Wireless Keypad, and CLWI-KPLEX on-wall wireless lighting keypad.

As described above, sensors 108 can be included in control network 100 according to aspects of the embodiments. Such sensors can include occupancy sensors, and motion sensors, as well as sensors related to fire and smoke detection, bio-hazard sensors, and the like. The one or more sensors can comprise the following devices, each available from Crestron Electronics, Inc. of Rockleigh, NJ: GLS-OIR-CSM-EX-BATT battery-powered infiNET EX® occupancy sensor.

Control processor 116 can be connected to the various controllable devices via either or both of a wired or wireless connection. The one or more control processors 116 can be a DIN-AP3MEX DIN Rail 3-Series® Automation Processor with infiNET EX®, or an MC3 3-Series Control System® with infiNET EX®, each of which are available from Crestron Electronics Inc. of Rockleigh NJ. Any one or more of these control processors can provide a substantially complete integrated automation solution. According to aspects of the embodiments, the various controllable devices of the facility or enterprise become integrated and accessible through operation of control processor 116. According to further aspects of the embodiments, control processor 116 can be a server, a personal computer (PC), or any other electronic device capable of processing electrical signals. Still further, according to further aspects of the embodiments, control processor 116 further comprises a web x-panel project, to allow for PC based setup. According to still further aspects of the embodiments, control processor 116 can be a device manufactured by Crestron Electronics, Inc., of Rockleigh, NJ, comprising a PYNG-HUB. As shown in FIG. 1, control processor 116 and gateway 114 can be arranged as two separate devices, but, as indicated by the dashed line forming a box around 114, 116, they can be arranged to be one device, or contained within a single enclosure.

According to still further aspects of the embodiments, each of the devices in FIG. 1 can be interconnected with other components in either or both of a wired or wireless manner. For example, PED 104 can connect to internet 132 via a cellular communications interface, or can be connected through a router/firewall device (a direct connection is not shown; however, connection between PED 104 and internet 132 is shown using LAN 134 and router/firewall 136) using conventional Ethernet cables. And, as shown in FIG. 1, PED 104 can be connected to LAN 134 via a wired interface (typically a category 5 type cable, i.e., Ethernet cable), or via a wireless interface such as the Wi-Fi connection that is also shown. According to still further aspects of the embodiments, each of the controllable and controlled devices of FIG. 1, such as sensors 108, control processor 116, and gateway device 114, can use a wireless protocol such as infiNET EX. Other wireless communications protocols can also be used.

Figure 2:
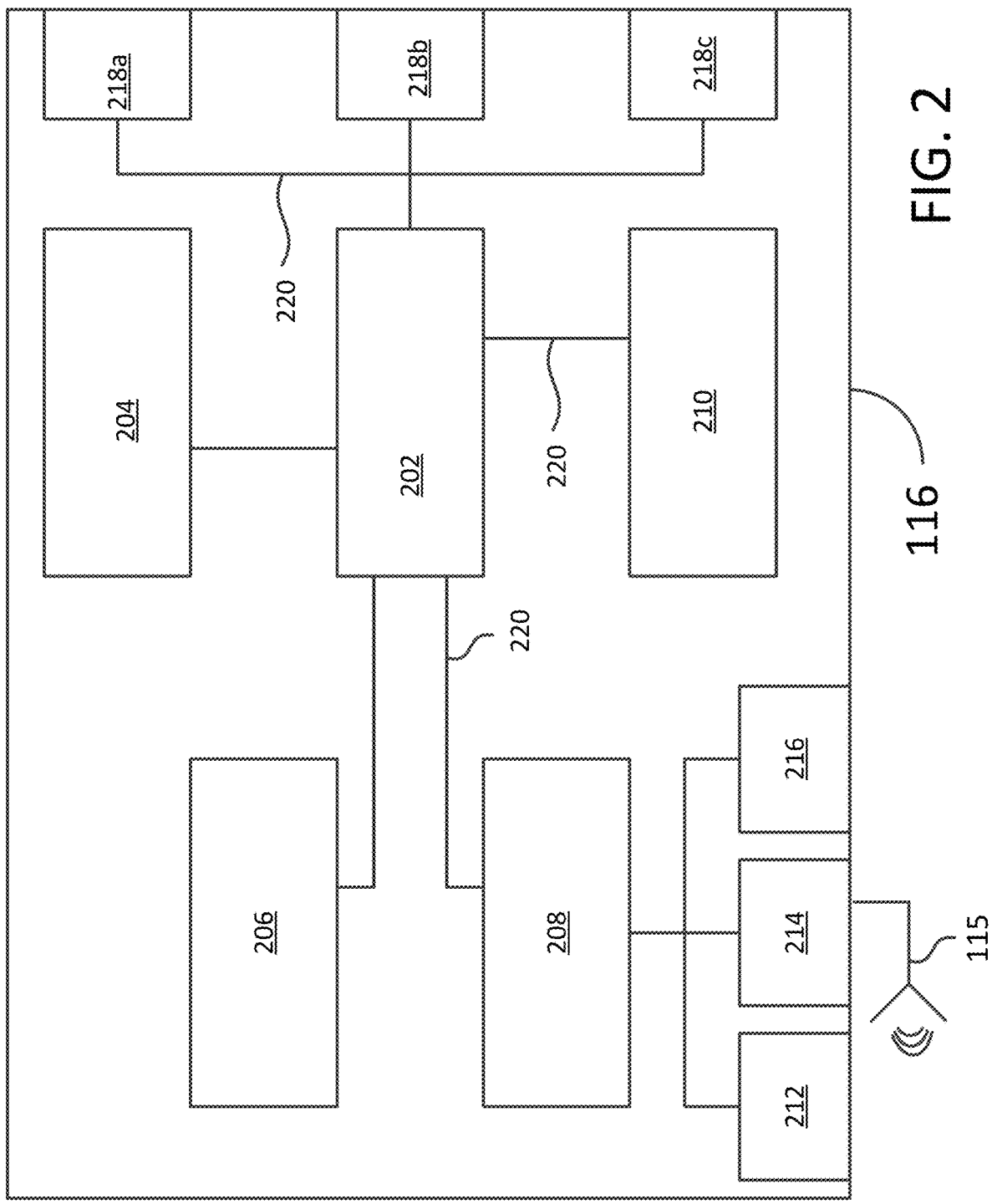
FIG. 2 illustrates a block diagram of a control processor for use in the control network of FIG. 1 according to an aspect of the embodiments.

FIG. 2 is a block diagram of control processor 116 for use with control network 100 according to an aspect of the embodiments. Control processor 116 can be used to control various controllable devices, such as, for example, those described and discussed above that include, among others, controllable devices 108, 110, 112, 118, 120, 122, 124, 126, 128, and 130 (security devices (e.g., door locks), lighting system devices, blinds/drapes, HVAC system devices, and sensors such as motion sensors, among many others). One or more control processors 116 can comprise one or more logic engines for processing control commands.

Control processor 116 can include at least one central processing unit (CPU) 202, as well as internal bus 220, the operation of which is known to those of skill in the art. Aspects of the embodiments of CPU 202 are described in greater detail below. For example, CPU 202 can represent one or more microprocessors, and the microprocessors may be "general purpose" microprocessors, a combination of general and special purpose microprocessors, or application specific integrated circuits (ASICs). Additionally, or alternatively, CPU 202 may include one or more reduced instruction set processors (RISC), video processors, or related chip sets. CPU 202 can provide processing capability to execute and run various applications, and/or provide processing for one or more of the techniques described herein. Applications that can run on control processor 116 can include, for example, software for processing control commands, software for managing a calendar, software for controlling other electronic devices via a control network as noted above, among other types of software/applications.

Control processor 116 can further include main memory 206, which can be communicably coupled to CPU 202, and which can store data and executable code, as known to those of skill in the art. Main memory 206 can represent volatile memory such as random access memory (RAM), but may also include nonvolatile memory, such as read-only memory (ROM) or Flash memory. In buffering or caching data related to operations of CPU 202, main memory 206 can store data associated with applications running on control processor 116.

Control processor 116 can also further include nonvolatile storage 204. Nonvolatile storage 204 can represent any suitable, nonvolatile storage medium, such as a hard disk drive (HDD) or nonvolatile memory, such as flash memory. Being well-suited to long-term storage, nonvolatile storage 204 can store data files such as media, software, and preference information. Nonvolatile storage 204 can be removable and interchangeable, thereby allowing portability of stored files, such as project files, created during programming of control network 100. According to aspects of the embodiments, project files can be used to map user desires into functions; as used thusly, project files are configuration files. These project files describe all the devices control system 100 knows about, what their buttons are configured to do, what types of devices they are, how they operate, and the operating parameters, among other features of each controllable device associated with control network 100. According to further aspects of the embodiments, project files can also be used to keep track of scheduling data, and which users are using the system (e.g., identifiable by PED 104).

Also shown as part of control processor 116 is network interface 208. Network interface 208 provides interface capability with one or more of several different types of network interfaces, including personal area network (PAN) interface 212, local area network (LAN) interface 214, and wide area network (WAN) interface 216. Each of the network interfaces 212, 214, and 216 can provide connectivity for control processor 116. Network interface 208 can represent, for example, one or more network interface controllers (NICs) or a network controller. As those of skill in the art can appreciate, the difference between a LAN and PAN can be less certain, and more one of degree; that is, in some cases, PANs are defined as those interconnections of devices that are within a few meters of each other, while other definitions indicated that devices that are within ten meters or so and are interconnected can be considered to be within a PAN. Regardless of the exact definition, or, if no exact definition should ever exists, control system 100 can make use of each of a WAN, LAN, and PAN, or sometimes two or all three at one time, depending on the circumstances, as those of skill in the art can now appreciate.

According to certain aspects of the embodiments, network interface 208 can include PAN interface 212. PAN interface 212 can provide capabilities to network with, for example, a Bluetooth® network, or a near field communication (NFC) type network. As can be appreciated by those of skill in the art, the networks accessed by PAN interface 212 can, but do not necessarily, represent low power, low bandwidth, or close range wireless connections. PAN interface 212 can permit one electronic device to connect to another local electronic device via an ad-hoc or peer-to-peer connection. However, the connection can be disrupted if the separation between the two electronic devices exceeds the proscribed range capability of PAN interface 212.

Network interface 208 can also include LAN interface 214. LAN interface 214 can represent an interface to a wired Ethernet-based network, but can also represent an interface to a wireless LAN, such as an 802.11x wireless network. The range of LAN interface 214 can generally exceed the range available via PAN interface 212. Additionally, in many cases, a connection between two electronic devices via LAN interface 214 can involve communication through a network router or other intermediary device (not shown in FIG. 2). LAN interfaces can also incorporate IEEE 802.15.4 (e.g., Zigbee) network, or an ultra-wideband network. As those of skill in the art can appreciate, the networks described by IEEE 802.15.4 are mesh-type networks, and operate with a central router/coordinator; in control network 100, the function of such central coordination is performed by one or more control processor 116 and/or gateway 114, according to aspects of the embodiments.

As known by those of skill in the art, Ethernet connectivity enables integration with internet protocol (IP)-controllable devices and allows control processor 116 to be part of a larger managed control network. Whether residing on a sensitive corporate LAN, a home network, or accessing the Internet through a cable modem, control processor 116 can provide secure, reliable interconnectivity with IP-enabled devices, such as touch screens (which can be part of control point 106), computers, mobile devices, video displays, Blu-ray Disc® players, media servers, security systems, lighting, HVAC, and other equipment—both locally and globally.

Control processor 116 can also include one or more wired input/output (I/O) interfaces 210 for a wired connection between control processor 116 and one or more electronic devices. Wired I/O interface 210 can represent a serial port. A serial port, as those of skill in the art can appreciate, is a serial communication physical interface through which information transfers in or out one bit at a time (as opposed to a parallel port). While it is known that interfaces such as Ethernet, FireWire, and the universal serial bus (USB) interfaces, all send data as a serial stream, the term "serial port" usually identifies hardware more or less compliant to the RS-232 standard, intended to interface with a modem or with a similar communication device.

Wired I/O interface 210 can also represent, for example, a Cresnet port. Cresnet provides a network wiring solution for Crestron keypads, lighting controls, thermostats, and other devices that do not require the higher speed of Ethernet. The Cresnet bus offers wiring and configuration, carrying bidirectional communication and 24 VDC power to each device over a simple 4-conductor cable.

One or more infrared (IR) interfaces can also be part of wired I/O interface 210; the IR interface can enable control processor 116 to receive and/or transmit signals with infrared light. The IR interface can comply with an infrared data association (IrDA) specification for data transmission. Alternatively, the IR interface can function exclusively to receive control signals or to output control signals. The IR interface can provide a direct connection with one or more devices such as a centralized audio/video (AV) sources, video displays, and other devices.

Control processor 116 can also include, but not necessarily, one or more programmable relay ports 218*a-c*. Programmable relay ports 218 can be used by control processor 116 to control window shades, projection screens, lifts, power controllers, and other contact-closure actuated equipment. Control processor 116 can include, as programmable relay port 218, a "Versiport" relay port that is manufactured by Crestron Electronics Inc., of Rockleigh, NJ The Versiport relay port can be managed by a DIN-IO8 module (also manufactured by Crestron Electronics Inc.), which is a DIN rail-mounted automation control module that provides eight Versiport 110 ports for interfacing with a wide range of third-party devices and systems. Each "Versiport" can be configured via software to function as a digital or analog sensing input, or as a digital trigger output. When configured as a digital input, the Versiport can sense a contact closure or logic level signal from devices such as motion detectors, partition sensors, alarm panels, 12V triggers, and all types of switches and relays. When configured as an analog input, the Versiport can sense changes in a resistance or DC voltage level, working with everything from temperature and light sensors to water level meters to volume control potentiometers. When operating as a digital output, the Versiport provides a logic level closure signal to trigger control and alarm inputs on a variety of external devices.

Thus, one or more "Versiport" programmable relay ports 218 can enable the integration of occupancy sensors, power sensors, door switches, or other devices by providing a dry contact closure, low-voltage logic, or 0-10 Volt DC signal.

According to further aspects of the embodiments in regard to control processor 116, network interfaces 208 can include the capability to connect directly to a WAN via a WAN interface 216. WAN interface 216 can permit connection to a cellular data network, such as the enhanced data rates for global system for mobile communications (GSM) Evolution (EDGE) (also known as enhanced general packet radio service (GPRS) (EGPRS), or international mobile telecommunications (IMT) single carrier (IMT-SC) EDGE network, or other third generation/fourth generation (3G/4G) cellular telecommunication networks (a detailed discussion of which is both not needed to understand the aspects of the embodiments, and beyond the scope of this discussion). When connected via WAN interface 216, control processor 116 can remain connected to the internet and, in some embodiments, to one or more other electronic devices, despite changes in location that might otherwise disrupt connectivity via PAN interface 212 or LAN interface 214.

By leveraging remote access of control processor 116, a user can control one or more of the controllable devices and/or environment settings in a facility (home, place of business or manufacture, or enterprise location) from substantially anywhere in the world using PED 104. Such control can be accomplished by a dynamic domain name system (DNS) service. Those of skill in the art can appreciate that DNS is a hierarchical distributed naming system used for computers, services, or any resource that is connected to the internet or a private network. According to further aspects of the embodiments, control processor 116 can be configured to utilize dynamic host communication protocol (DHCP) communications that include a hostname prefixed by a model number.

According to aspects of the embodiments, control processor 116 hosts a project file, such as a Crestron Core 3 project file, also referred to as "Smart Graphics [Project] file 508," which is intended to be used by one or more mobile devices (such as PED 104) with a control application (App) such as a Crestron App 504 (located on PED 104). As described above, one or more project files can be created during the installation of control network 100. Crestron App 504 is designed to receive and render Smart Graphics project file 508. Crestron App 504 is responsible for communicating taps and feedback to the user. Additionally, Smart object App 510 can be created for use with a local Crestron Mobile Pro Project as well as with foreign AV processors. The Crestron Mobile Pro project can contain just a Core 3 Smart Object and nothing else. Smart Graphics Project file 508, located on control processor 116, is a collection of items that are meaningful in some way to a control system program, such as Crestron App 504. This collection of items can include things like "buttons," "sliders," or "text" (among other graphical representations). According to further aspects of the embodiments, Smart graphics project file 508 can include "smart object" App 510, which can be a predefined conglomeration of other objects (buttons, slides, among others). For example, a lighting smart object App 510a can comprise a slider to report/set a light level, and a few buttons to raise/lower and turn on/off the lights. According to further aspects of the embodiments, in control network 100, smart object App 510 talks directly to a Pyng-HUB, such as control processor 116. As such, smart object App 510 can be used in or by any smart graphics project file 508, and they will communicate with control network 100 and Crestron App 504, even if the project (i.e., the program currently being executed) is intended to control an external AV processor.

Displayed in one or more of the drawing Figures are graphical user interfaces (GUIs) that can be part of a webpage, or used in providing information or obtaining it from a user when an application such as Configuration Application (Configuration App) 506 is run. As those of skill in the art can appreciate, a GUI is a human-computer interface (i.e., a way for humans to interact with computers) in the form of windows 1002, icons 1004, and menus 1006 that can be manipulated by pointer 1016 associated with use of a mouse (and often to a limited extent by a keyboard as well).

Figure 10:
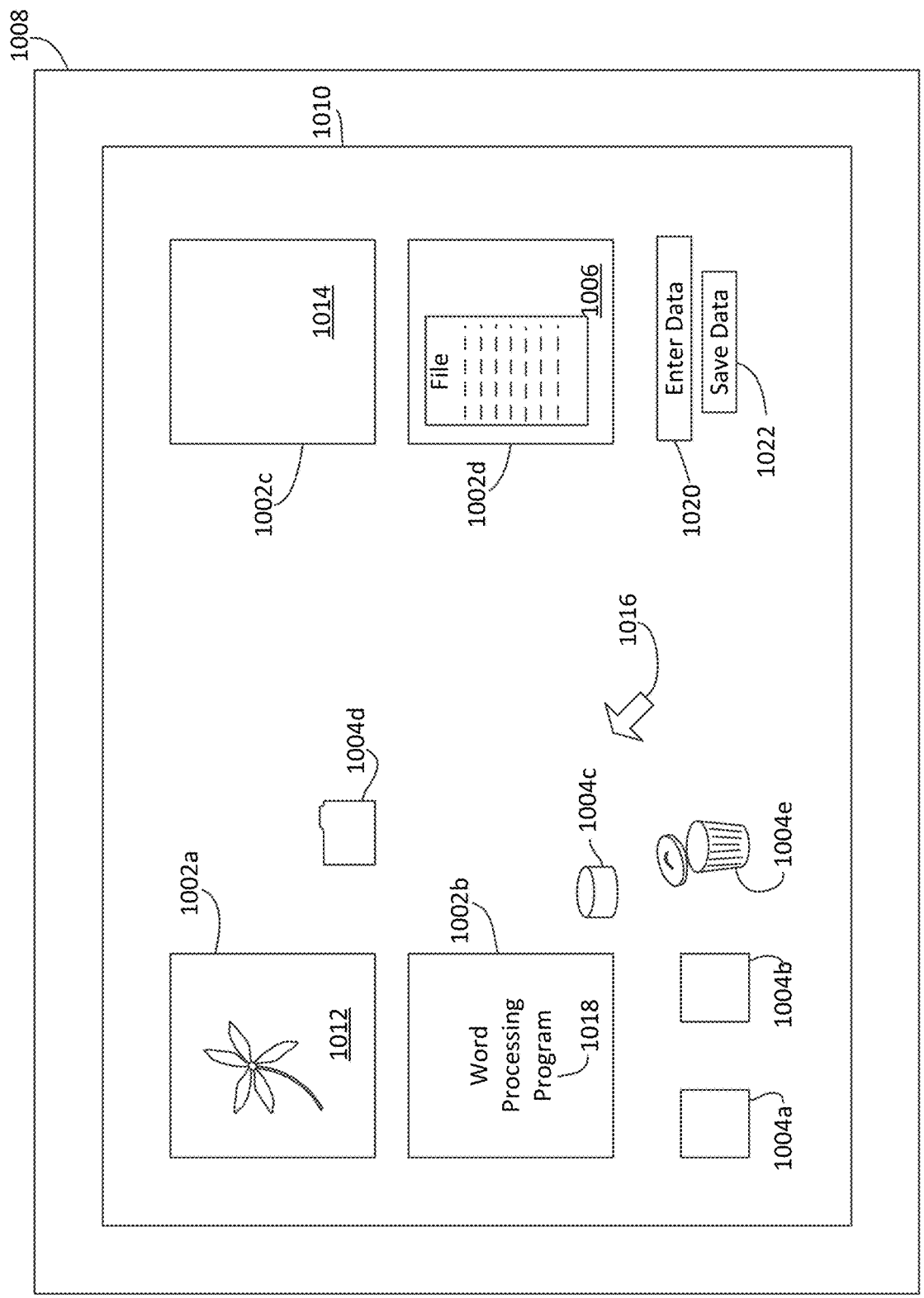
FIG. 10 illustrates an example of a graphical user interface that can be created by one or more software and hardware components of the type used in the aspects of the embodiments described herein.

Referring now to FIG. 10, windows 1002a-d contain portions of monitor screen 1008 that can display its contents (e.g., application/program 1018, icons 1004, text file 1014, or image 1012; see, e.g., windows 1000a-d of FIG. 10) seemingly independently of the rest of monitor screen 1008, in GUI 1010. Note that icons 1004 can themselves be a GUI. One feature of a GUI is the ability for multiple windows 1002 to be open simultaneously. Each window 1002 can display a different application/program 1018, or each can display different files (e.g., text file 1014, image(s) 1012, or other types of files/documents) that have been opened or created with a single application. Menu 1006 of window 1002d is another example of a GUI.

Icon 1004 is a small picture or symbol in GUI 1010 that represents a program (or command), a file, a directory, or a device (such as a hard disk or floppy). Icons 1004 are used both on a desktop and within application programs. Those of skill in the art are familiar with the term "desktop," which represents monitor screen 1008 when either no other programs are open, or open programs have been minimized or less than full screen. A non-limiting, non-exhaustive set of icons 1004 are also shown in FIG. 10, and include small rectangles (to represent files 1004a,b), hard drive icon 1000c, file folders 1004d (to represent directories), trash can 1004e (to indicate a place to dispose of unwanted files and directories) and buttons on web browsers (for navigating to previous pages, for reloading the current page, etc.; not shown in FIG. 10).

Commands are issued in GUI 1010 by using a mouse, trackball, or touchpad to first move pointer 1016 on monitor screen 1008 to, or on top of, icon 1004, menu item 1006, or window 1002 of interest in order to select that object. Then, for example, icons 1004 and windows 1002 can be moved by dragging (moving the mouse with the held down) and objects or programs can be opened by clicking on their icons. In addition, GUI 1010 can include fields 1020 for entering data, and buttons 1022 for saving the entered data.

As those of skill in the art can appreciate, there are several advantages to the use of GUI 1010. One substantive advantage of the use of GUI 1010 is that they make computer operation more intuitive, and thus easier to learn and use. For example, it is much easier for a new user to move a file from one directory to another by dragging its icon with the mouse than by having to remember and type seemingly arcane commands to accomplish the same task.

Adding to this intuitiveness of operation is the fact that GUI 1010 generally provide users with immediate, visual feedback about the effect of each action. For example, when a user deletes icon 1004a representing a file, icon 1004a immediately disappears, confirming that the file has been deleted (or at least sent to trash can 1004e). This contrasts with the situation for a command line interface (CLI), in which the user types a delete command (inclusive of the name of the file to be deleted) but receives no automatic feedback indicating that the file has actually been removed.

In addition, GUI 1010 allow users to take full advantage of the powerful multitasking (the ability for multiple programs and/or multiple instances of single programs to run simultaneously) capabilities of modern operating systems by allowing such multiple programs and/or instances to be displayed simultaneously. The result is a large increase in the flexibility of computer use and a consequent rise in user productivity.

However, as those of the skill in the art can further appreciate, GUI 1010 has become much more than a mere convenience. GUIs 1010 have also become the standard in human-computer interaction, and it has influenced the work of a generation of computer users. Moreover, it has led to the development of new types of applications and entire new industries. An example is desktop publishing, which has revolutionized (and partly wiped out) the traditional printing and typesetting industry.

Referring back to FIG. 1, control network 100 further comprises communication network 102 that provides access with and between devices of control network 100 according to aspects of the embodiments. Communication network 102 can be a PAN, LAN, metropolitan area network, WAN, an alternate network configuration, or some other combination of network types and/or topologies.

According to an aspect of the embodiments, communication network 102 can employ both wired and wireless communication protocols. For example, the controllable devices can form communication network 102 with gateway device 114 (operating in a wireless manner) by communicating over a short range communication protocol such as Crestron infiNET EX wireless protocol. Or, according to a different aspect of the embodiments, gateway device 114, operating in a wired manner, can form a LAN with PED 104 communicating via Ethernet protocols using a wire-based Ethernet capability (it can also do so in a wireless manner). According to a further aspect of the embodiments, control processor 116 or PED 104 can connect via a WAN such as the world wide web to access data stored on a remote server (not shown in FIG. 1).

According to further aspects of the embodiments, communication network 102 can be a public switched telephone network (PSTN). Alternatively, communication network 102 can further include a cable telephony network, an internet protocol (IP) telephony network, a wireless network, a hybrid cable/PSTN network, a hybrid IP/PSTN network, a hybrid wireless/PSTN network, or any other suitable communication network 102 or combination of communication networks. In addition, other network embodiments can be deployed with many variations in the number and type of devices, communication networks, the communication protocols, system topologies, and myriad other details without departing from the spirit and scope of the aspects of the embodiments.

Control network 100 can include one or more gateway devices 114. According to a further aspect of the embodiments, control processor 116 further comprises a built-in gateway. According to still further aspects, control network 100 can comprise an external gateway 114, such as a CEN-RFGW-EX gateway, available from Crestron Electronics, Inc.

According to aspects of the embodiments, gateway 114 of control network 100 provides network devices with an entrance to communication network 102 through control processor 116 and can include software and/or hardware components to manage traffic entering and exiting communication network 102 and conversion between the communication protocols used by the network devices and communication network 102.

Gateway 114 can be configured to operate in both a wired a wireless manner and act as the network coordinator, and can further manage network configurations. Additionally, gateway 114 can be configured to communicate with control processor 116 via a wired interface, such as an Ethernet interface. One such gateway 114 according to an aspect of the embodiments is the CEN-RFGW-EX wireless gateway manufactured by Crestron Electronics, Inc., and which is a two-way radio frequency (RF) gateway\transceiver designed to enable communications and management for a complete infiNET EX wireless network of dimmers, keypads, remote control devices (RCDs), among other types of devices. The CEN-RFGW-EX wireless gateway links the infiNET EX network to a Crestron control system via a wired connection such as Ethernet or Cresnet. infiNET EX dimmers, switches, keypads, thermostats, and other devices, can be linked to control processor 116 via a single CEN-RFGW-EX gateway 114. Additional gateways 114 can be installed to support more devices. Wireless expanders (also not shown in FIG. 1) can be added wherever needed to extend control network 100 by filling in gaps between devices. That is, according to aspects of the embodiments, expanders can reinforce the network when operating in accordance with mesh networks principles.

Figure 3:
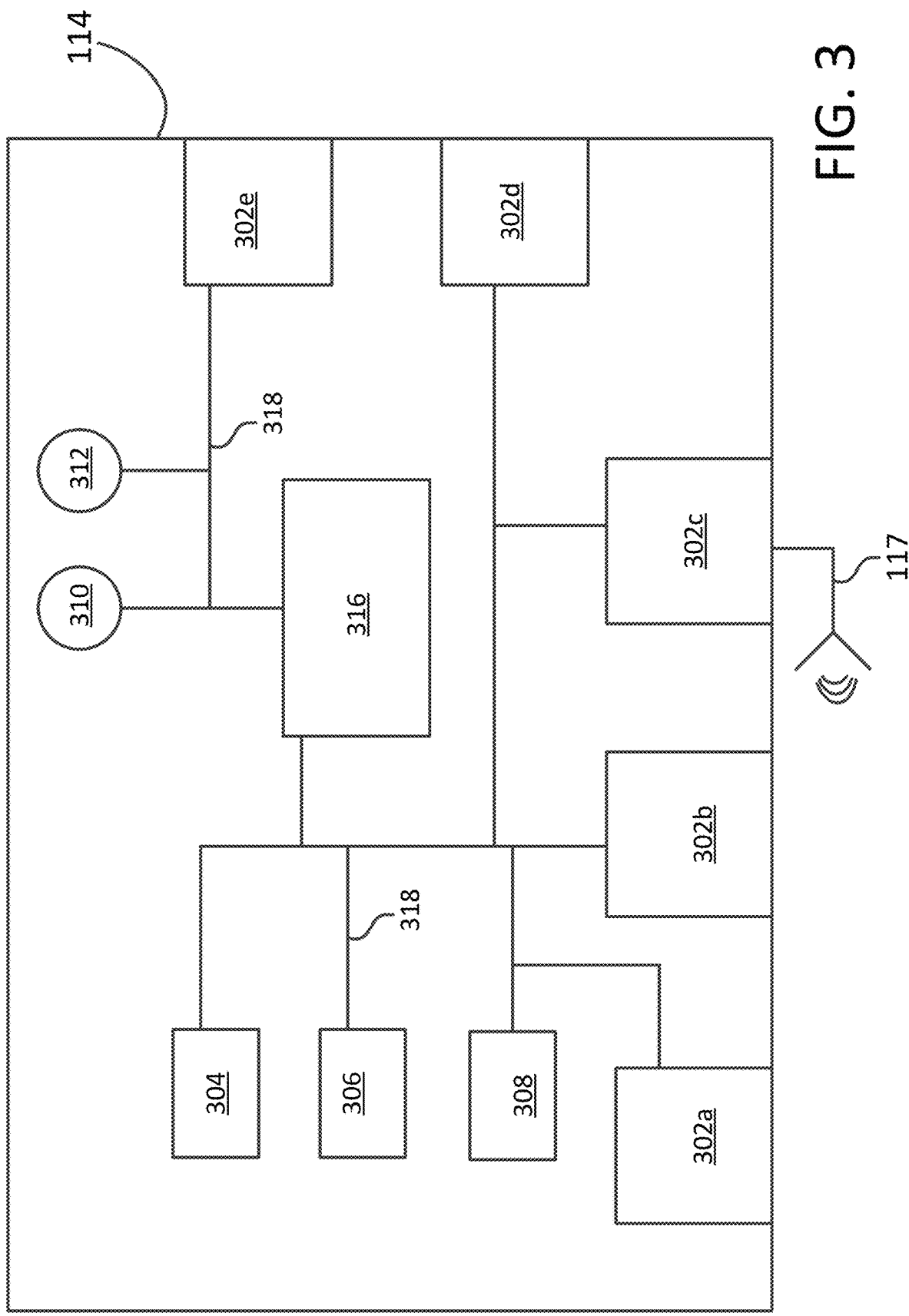
FIG. 3 illustrates a block diagram of a gateway for use in the control network of FIG. 1 according to an aspect of the embodiments.

Attention is now directed towards FIG. 3, which illustrates a block diagram of gateway 114 according to an aspect of the embodiments. Gateway 114 can include one or more network interfaces (NWI) 302 that can provide connectivity for gateway 114 when acting in a wireless manner NWIs 302 can represent, for example, one or more network interface cards (NIC) 302a, or network controller (NWC) 302b. In certain embodiments, network interface 302 can include PAN interface 302c, such as a two-way RF transceiver. PAN interface 302c can provide capabilities to network with, for example, a Bluetooth® network, or an NFC network. As can be appreciated by those of skill in the art, the networks accessed by PAN interface 302c can, but do not necessarily, represent low power, low bandwidth, or close range wireless connections. PAN interface 302c can permit one electronic device to connect to another local electronic device via an ad-hoc or peer-to-peer connection.

One or more of network interfaces 302 can also include one or more LAN interfaces 302d, such as a control network interface. LAN interface 302d can represent an interface to a wired Ethernet-based network, but can also represent an interface to a wireless LAN, such as an IEEE 802.11x wireless network. The range of the LAN interface can generally exceed the range available via the PAN interface. Additionally, in many cases, a connection between two electronic devices via the LAN interface can involve communication through a network router or other intermediary device. LAN interfaces can also incorporate IEEE 802.15.4 (e.g., Zigbee) network, or an ultra-wideband network. As those of skill in the art can appreciate, the networks described by IEEE 802.15.4 are mesh-type networks, and operate with a central router/coordinator; in control network 100, the function of such central coordination is performed by one or more control processor 116 and/or gateway 114, according to aspects of the embodiments. Gateway device 114 further includes gateway central processing unit (CPU) 316, and bus 318. Aspects of the embodiments of processor 316 are described in greater detail below.

In a wired configuration, LAN power-over-Ethernet (PoE) interface 302d can be fashioned using an 8-wire RJ-45 female connection with two LED indicators. According to a further aspect of the embodiments, a fifth type of NWI can be Cresnet interface 302e, which is a 4-pin 3.5 mm detachable terminal block providing an interface for Cresnet proprietary communications on a LAN. The PoE interface can be configured for receiving both an electric power signal and an information signal from a control network. For example, LAN PoE interface 302d can be connected through category 5 cable (CAT 5) to a LAN that contains a power supply, multiple control points, and signal generators. Through LAN PoE interface 302d (or via Cresnet interface 302e), gateway 114 can interface with control network 100. For example, gateway 114 (which can be both wired and wireless) can communicate with control processor 116, such as a PRO3 available from Crestron Electronics, Inc.

Gateway 114 comprises one or more connectors, indicators, and interface buttons, as well as an antenna connection for the supplied antenna. Gateway further comprises LED indicators, such as power on/off LED 304, network activity indicator LED 306, and activity indicator LED 308. Power on/off LED 304 is an indicator that shows that operating power is being supplied to gateway 114 whether from the Cresnet network or a PoE connection. Network LED indicator 306 shows that communication with the Cresnet system is occurring. Activity indicator LED 308 shows that wireless communications are occurring, such as those that involve the elements of the wireless PAN.

Gateway 114 further comprises acquire button 310 and setup button 312. Acquire button 310 and setup button 312 can be recessed push buttons each with an indicator LED. Acquire button 310 can be employed to configure communication with the PAN and setup button 312 can be employed to configure communication with control network 100.

Gateway 114 can be placed in acquire mode via acquire button 310 or some other means. The associated LED can indicate that gateway 114 is in acquire mode. Once gateway 114 has been placed in acquire mode, the joining device can be brought into range and can be placed in the acquire mode to be acquired by gateway 114 through a certain sequence. Such sequence involves the pushing of buttons in a certain, specific order, a detailed discussion of which has been omitted in fulfilment of dual purposes of clarity and brevity. By pushing acquire button 310 a second time (within a predetermined time period), gateway 114 can exit acquire mode as indicated by the LED-illuminated acquire button 310.

Control network 100 can further comprise PED 104. PED 104 can be a smart phone, tablet, remote control, personal digital assistant (PDA), or any other electronic device configured for presenting a user interface, such as a graphical user interface (GUI) and receiving user inputs, such as in the form of selections from a graphic user interface.

Figure 4:
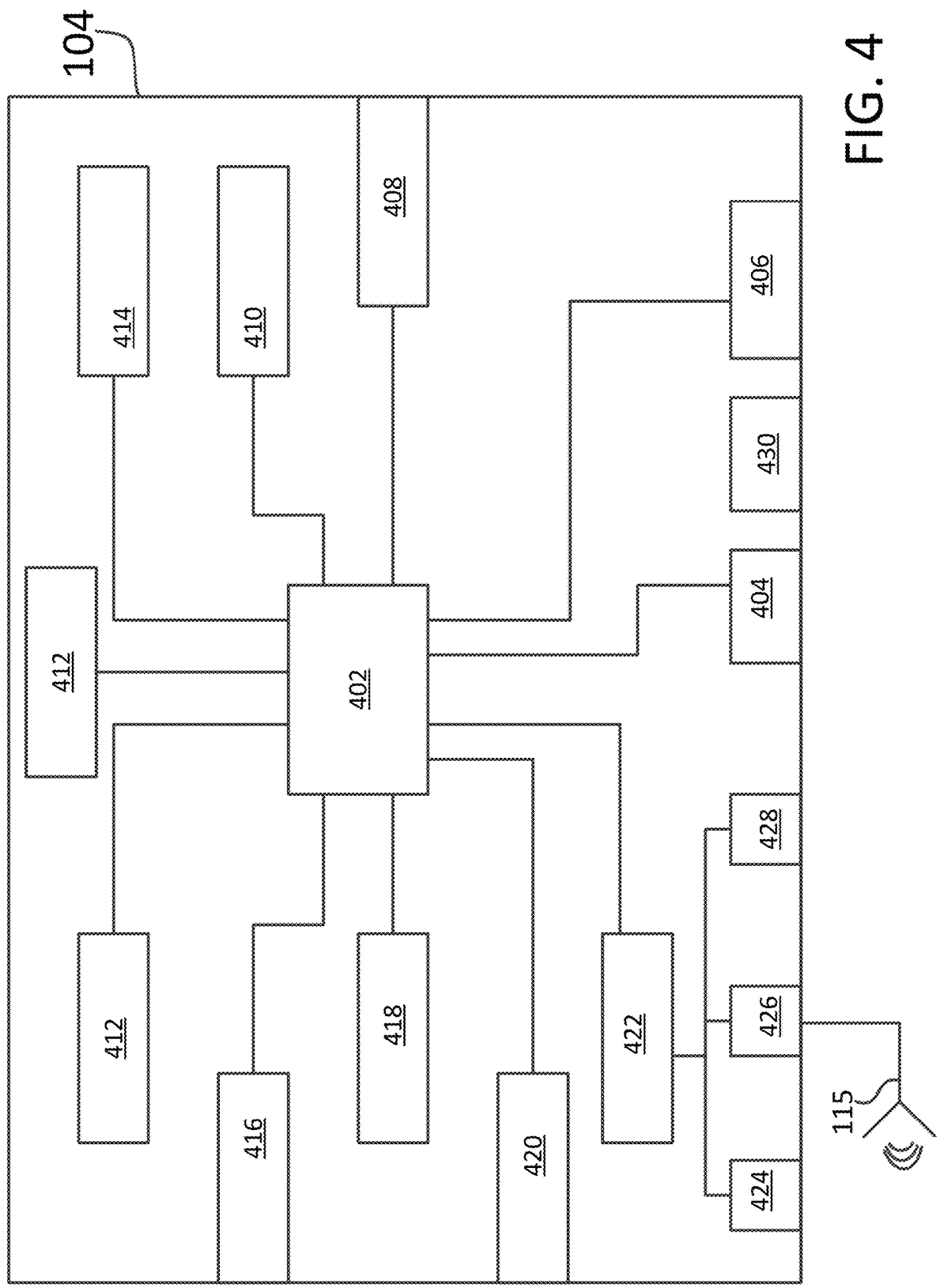
FIG. 4 illustrates a block diagram of a personal electronic device for use with the control system of FIG. 1 according to aspects of the embodiment.

FIG. 4 illustrates a block diagram of PED 104 for use with control system 100 according to aspects of the embodiment. PED 104 can include at least one PED central processing unit (CPU) 402. For example, CPU 402 can represent one or more microprocessors, and the microprocessors can be "general purpose" microprocessors, a combination of general and special purpose microprocessors, or ASICs. Additionally, or alternatively, CPU 402 can include one or more reduced instruction set (RISC), advanced RISC machine (ARM), or complex instruction set (CISC) processors, video processors, or related chip sets. CPU 402 can provide processing capability to execute an operating system (OS), run various applications, and/or provide processing for one or more of the techniques described herein. Applications that can run on PED 104 can include, for example, software for managing and playing AV content, software for managing a calendar, software for controlling telephone capabilities, software for controlling other electronic devices via a control network as noted above, as well as software for controlling various other functions and interconnected devices.

PED 104 further comprises main memory 414, which can be communicably coupled to CPU 402, and which may store data and executable code. Main memory 414 can represent volatile memory such as RAM, but can also include non-volatile memory, such as ROM or flash memory. In buffering or caching data related to operations of CPU 402, main memory 414 can store data associated with applications running on PED 104.

PED 104 can also include nonvolatile storage 412. Nonvolatile storage 412 can represent any suitable nonvolatile storage medium, such as an HDD or nonvolatile memory, such as flash memory. Being well-suited to long-term storage, nonvolatile storage 412 may store data files such as media, software, and preference information. Nonvolatile storage 412 can be removable and interchangeable, thereby allowing portability of stored files such as project files created during programming of control network 100. Those of skill in the art can appreciate that data associated with controlling certain other electronic devices, such as a project file for a control application, can be saved in nonvolatile storage 412.

Display 410 can display images and data for PED 104. As those of skill in the art can appreciate, display 410 is optional. If included in PED 104, however, display 410 can use any type of display technology, such as, but not limited to, a liquid crystal display (LCD), a light emitting diode (LED) based display, an organic light emitting diode (OLED) based display, a cathode ray tube (CRT) display, or an analog or digital television, among other types. According to other aspects of the embodiments, display 410 can function as a touch screen display through which a user can interact with PED 104.

PED 104 can further include user interface 408. User interface 408 can include indicator lights and user input structures, but can also include a GUI on display 410. As those of skill in the art can appreciate, user interface 408 can operate via CPU 402, using memory from main memory 414 and long-term storage in nonvolatile storage 412, among using other types of memory (such as an HDD, not shown in FIG. 4). According to aspects of the embodiments, if display 410 is not included in PED 104, indicator lights, sound devices, buttons, and other various input/output (I/O) devices can allow a user to interface with PED 104. If, however, display 410 is included in PED 104 and uses a GUI, user interface 408 can provide interaction with interface elements on display 410 via certain user input structures, user input peripherals such as a keyboard or mouse, or a touch sensitive implementation of display 410.

As can be appreciated by those of skill in the art, one or more applications can be opened and accessible to a user via user interface 408 and displayed on display 410 of PED 104. One or more of the opened applications can be run on CPU 402 in conjunction with main memory 414, nonvolatile storage 412, display 410, and user interface 408. Instructions stored in main memory 414, nonvolatile storage 412, or CPU 402 (CPU 402 can have its own internal storage, of many different types), of PED 104 can enable a user to install control network 100. As such, those of skill in the art can appreciate that the instructions for carrying out such techniques on PED 104 can represent a standalone application, a function of the OS on PED 104, or a function of the hardware of CPU 402, main memory 414, nonvolatile storage 412, or other hardware of PED 104.

One such application that can be opened and accessible to the user is Configuration App 506 for installing control network 100 according to an aspect of the embodiments. Configuration App 506 can be downloaded from an application marketplace such as from the Google Play application marketplace or the Apple iTunes® application marketplace, among other marketplaces available through the internet, or other networks.

As briefly described above, the project file provides the instructions allowing the control application to communicate with the target control network (control network 100, according to aspects of the embodiments). Further, the project file comprises the menu pages of the control application corresponding to the locations of controllable devices. For example, the control application can display one or more menu pages identified by page IDs for controlling the one or more controllable devices on control network 100 according to the project file. The menu pages comprise selectable elements corresponding to control functions as defined in the project file.

Configuration App 506 displays a series of menu pages comprising selectable elements and graphical elements. As will be described in greater detail below, the one or more of the selectable elements can correspond to initialization functions of the Configuration App 506. PED 104 can transmit signals to control network 100 according to the initialization functions selected by the user. Additionally, control network 100 can communicate with PED 104, such as by providing feedback signals to PED 104. According to an aspect of the embodiments, PED 104 can communicate with control processor 116 running a logic engine via communication network 102. Gateway 114, according to further aspects of the embodiments, can be used to relay commands and return status information to and from sensors 108 and from the other various controllable devices 110, 112, 118, 120, 122, 124, 126, 128, and 130

According to various aspects of the embodiments, PED 104 can include location sensing circuitry 406. Location sensing circuitry 406 can comprise global positioning system (GPS) circuitry, but can also represent one or more algorithms and databases, stored in nonvolatile storage 412 or main memory 414 and executed by CPU 402, which may be used to infer the location of PED 104 based on various observed factors. For example, location sensing circuitry 406 can represent an algorithm and database used to approximate geographic location based on the detection of local 802.11x (Wi-Fi) networks or nearby cellular phone towers.

PED 104 can also include wired input/output (I/O) interface 404 for a wired interconnection between a first electronic device and a second electronic device. Wired I/O interface 404 can represent, for example, a universal serial bus (USB) port, an IEEE 1394 port, or a FireWire® port. However, wired I/O interface 404 can also represent a proprietary connection. Additionally, wired I/O interface 404 interface can permit a connection to user input peripheral devices, such as a keyboard or a mouse. In addition to wired input/output (I/O) interface 404, PED 104 further comprises infrared (IR) interface 430 that can enable PED 104 to receive and/or transmit signals with infrared light. By way of example, IR interface 430 can comply with an infrared data association (IrDA) specification for data transmission.

One or more network interfaces 422 can also be provided in PED 104. One or more of such network interfaces 422 can provide additional connectivity for PED 104. Network interfaces 422 may represent, for example, one or more network interface cards (NIC) or a network controller. In certain embodiments, the network interface 422 may include a personal area network (PAN) interface 424. PAN interface 424 may provide capabilities to network with, for example, a Bluetooth® network, or an NFC network. As should be appreciated, the networks accessed by PAN interface 424 can, but do not necessarily, represent low-power, low-bandwidth, or close range wireless connections. However, as those of skill in the art can appreciate, the connection in PAN interface 424 can be disrupted if the separation between the two electronic devices exceeds the operational range capability of PAN interface 424. PAN interface 424 can permit one electronic device to connect to another local electronic device via an ad-hoc or peer-to-peer connection, such as that defined by the wireless PAN protocol IEEE 802.15.n, communications network 102.

PAN interfaces can also incorporate IEEE 802.15.4 (e.g., Zigbee) network, or an ultra-wideband network. As those of skill in the art can appreciate, the networks described by IEEE 802.15.4 are mesh-type networks, and operate with a central router/coordinator; in control network 100, the function of such central coordination is performed by one or more control processor 116 and/or gateway 114, according to aspects of the embodiments.

Network interface 422 can also include LAN interface 426. LAN interface 426 can represent an interface to a wired Ethernet-based network (e.g., IEEE 802.3), but can also represent an interface to a wireless LAN, such as an IEEE 802.11x wireless network (Wi-Fi). The wireless operating range capability of LAN interface 426 can generally exceed the wireless operating range capability available via PAN interface 424. Additionally, in many cases, a connection between two electronic devices via LAN interface 426 can involve communication through a network router or other intermediary device. PED 104 further comprises a transceiver that can interface with first antenna 115, such as PAN interface 424 or LAN interface 426. LAN 134 is a wired or wireless LAN, such as that defined by IEEE 802.11.n (Wi-Fi), or 802.3 (Ethernet).

According to further aspects of the embodiments, network interfaces 422 of PED 104 can further include the capability to connect directly to a WAN via WAN interface 428. WAN interface 428 can permit a connection to a cellular data network, such as an EDGE network, or another 3G/4G network, among others. When connected via WAN interface 428, PED 104 can remain connected to the internet and, in some embodiments, to another electronic device, despite changes in location that might otherwise disrupt connectivity via PAN interface 424 or LAN interface 426. As will be discussed below in greater detail, wired I/O interface 404 and network interfaces 422 represent high-bandwidth communication channels for transferring user data using the simplified data transfer techniques discussed herein.

PED 104 can also include near field communication (NFC) interface 416. NFC interface 416 can allow for extremely close range communications at relatively low data rates (e.g., about 464 kilo-bits/second (kb/s)), and can comply with such standards as International Standards Organization (ISO) 18092 or ISO 21521, or it can allow for close range communications at relatively high data rates (e.g., about 560 mega-bits/second (Mb/s)), and can comply with the TransferJet® protocol. NFC interface 416 can have a range of between about 2 to about 4 centimeters (cm) (or between about 0.78" to about 1.57"). The close range communication with NFC interface 416 can take place via magnetic field induction, allowing NFC interface 416 to communicate with other NFC interfaces, or to retrieve information from tags having radio frequency identification (RFID) circuitry. As discussed in greater detail below, NFC interface 416 can provide a manner of initiating or facilitating a transfer of user data from one electronic device to another electronic device.

PED 104 can also include camera 420. With camera 420, PED 104 can obtain digital images or videos. In combination with optical character recognition (OCR) software, barcode-reading software, or matrix-code-reading software running on PED 104, camera 420 can be used to input data from printed materials having text or barcode information. Such data can include information indicating how to control another device from a matrix barcode that can be printed on the other device, as described in greater detail below.

According to further aspects of the embodiments, PED 104 can also include one or more accelerometers 418 that can sense the movement or orientation of PED 104. Accelerometers 418 can provide input or feedback regarding the position of PED 104 to certain applications running on CPU 402. According to further aspects of the embodiments, accelerometer 418 can be provided by devices made using microelectromechanical system (MEMS) technology. MEMS devices, which can be defined as die-level components of first-level packaging, can include pressure sensors, accelerometers, gyroscopes, microphones, digital mirror displays, microfluidic devices, among other devices.

According to aspects of the embodiments, control network 100 can be configured to be installed by untrained users executing Configuration App 506 on PED 104. According to further aspects of the embodiments, the control system and associated Configuration App 506 are referred to as Pyng, which are software programs created and manufactured by Crestron Electronics, Inc., of Rockleigh, NJ.

Figure 5:
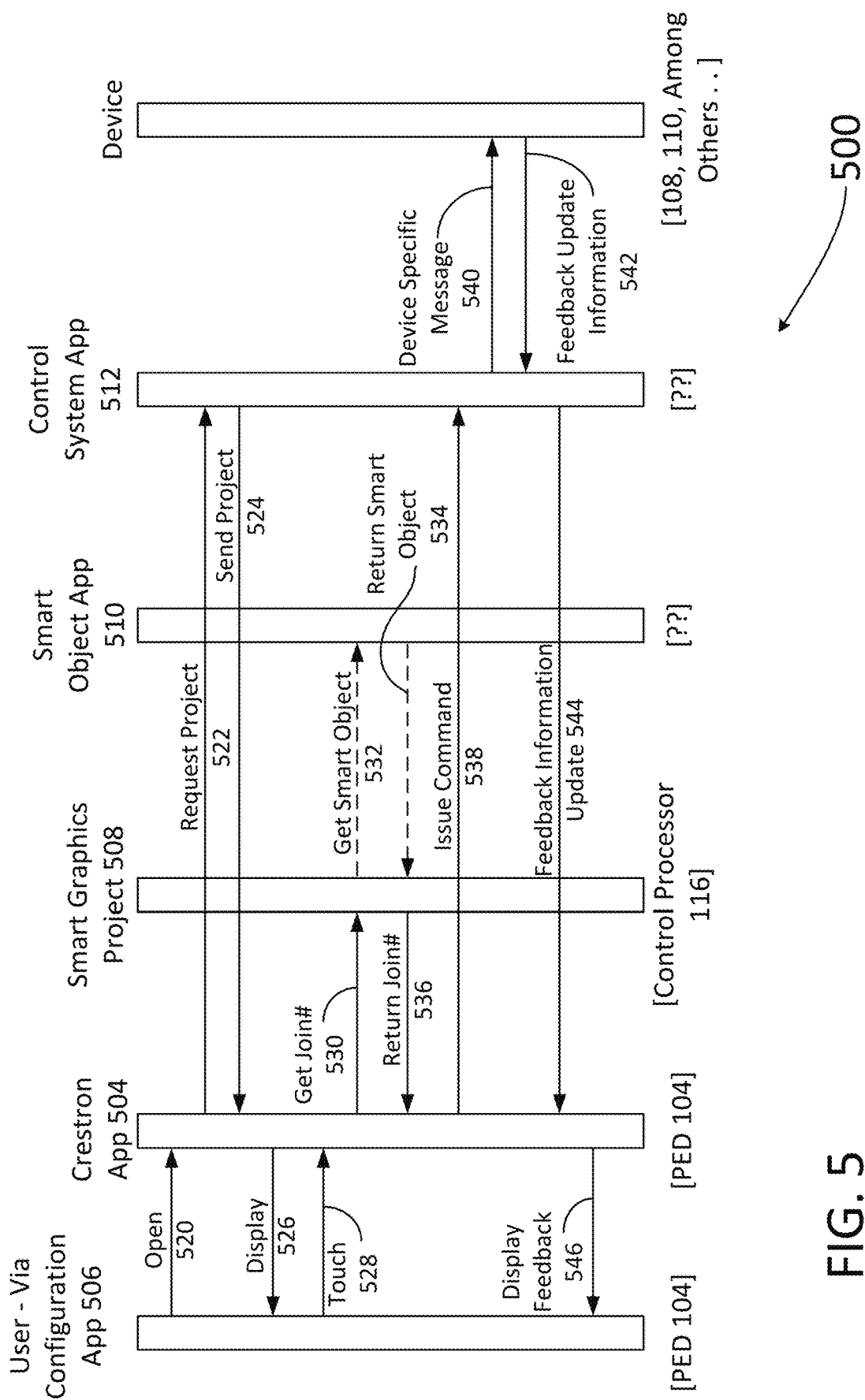
FIG. 5 illustrates a signal flow diagram between different software components of a personal electronic device that implements the system and method for controlling one or more controllable devices in a home, business, or enterprise environment according to an aspect of the embodiments.

Attention is now directed towards FIG. 5. FIG. 5 illustrates signal flow diagram 500 between different software components of PED 104 and other components of control network 100 that implements the system and method for controlling one or more controllable devices in a home, business, or enterprise environment according to an aspect of the embodiments.

FIG. 5 illustrates signal/message flow diagram 500 between a user-operated control device such as PED 104, control processor 116, and controlling and controllable devices such as devices 108, 110, 112, 118, 120, 122, 124, 126, 128, and 130. Signals or messages are generates from PED 104 by operation of Configuration App 506, in PED 104, when the user opens Configuration App 506, and selects some action or activity. A first such message is open message 520, which calls out the selected action or activity, and which proceeds from PED 104, Configuration App 506, to Crestron App 504, which is also located in PED 104. The receipt of open message 520 triggers request project message 522 to go from Crestron App 504 to control system App 512. Control system App 512 can be located in either or both of gateway device 114, control processor 116, or one or more of the control or controllable devices. Control system App 512 responds with send project message 524 back to Crestron App 504, which contains information and data related to the requested action or activity. Crestron App 504 then provides Configuration App 506 with necessary information to cause a display to be generated (display signal 526). Sometime later, the user will make use of the interactive display, and touch the screen of PED 104, to cause some further action or activity, and in response, PED 104 and Configuration App 506 generates touch message 528, which is sent to Crestron App 504.

Crestron App 504 responds to the received touch message 528 and generates get join #message 530, which is sent to smart graphics project file 508. If a smart object was also part of the information needed to complete the touch request (in touch message 528), then optional get smart object message 532 is sent from smart graphics project file 508 to smart object App 510, which returns the smart object in return smart object message 534 to smart graphics project file 508. Smart graphics project file 508 returns both return join #message 536 and return smart object message 534, if requested, in return join #message 536. The user can then issue a command by command message 538 which originates from Crestron App 504 and is sent to control system App 512. Control system App 512 responds to the received command message 538 and sends device specific message 540 to the specific controllable device (108, 110, 112, 118, 120, 122, 124, 126, 128, or 130) that the command was directed towards. The device returns the feedback information in feedback update information message 542 to control system App 512, which returns the feedback information to Crestron App 504 via another feedback update information message 542. Then, Crestron App 504 forwards the feedback information to PED 104 via display feedback message 546, which causes PED to display the feedback information, in a manner known to those of skill in the art.

Figure 6:
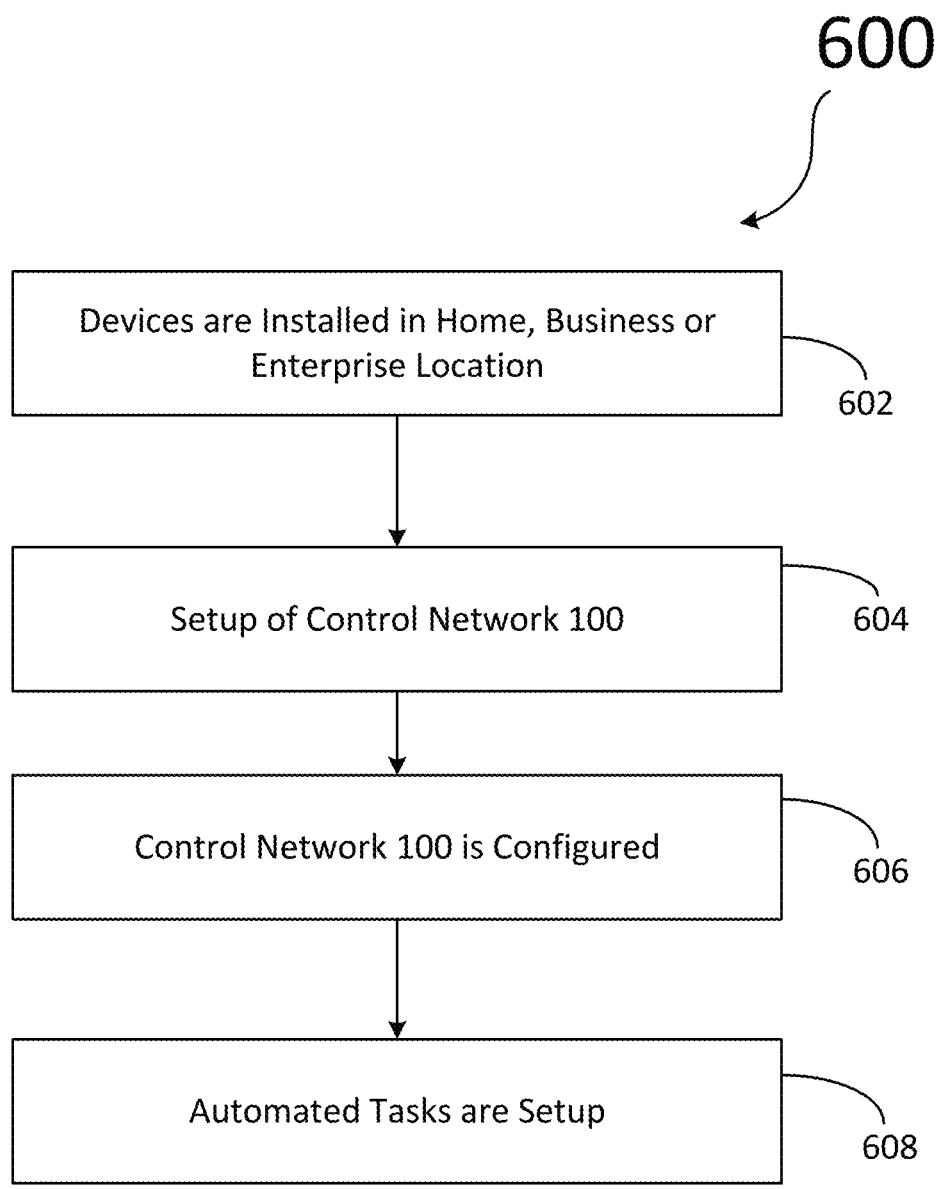
FIG. 6 illustrates a flow diagram of a method for setting up and installing one or more controllable devices in a home, business, or enterprise environment as well as setting up and installing a control network for controlling the one or more controllable devices according to aspects of the embodiments.

Attention is now directed to FIG. 6, which illustrates a flow diagram of method 600 for installing, setting up, and using control network 100 that provides for control of a plurality of controllable devices in a home, business, or enterprise environment, to accomplish a plurality of features, functions, and activities, according to aspects of the embodiments. Method 600 will be described generally, first, then in greater detail as each step is implemented.

Figure 7:
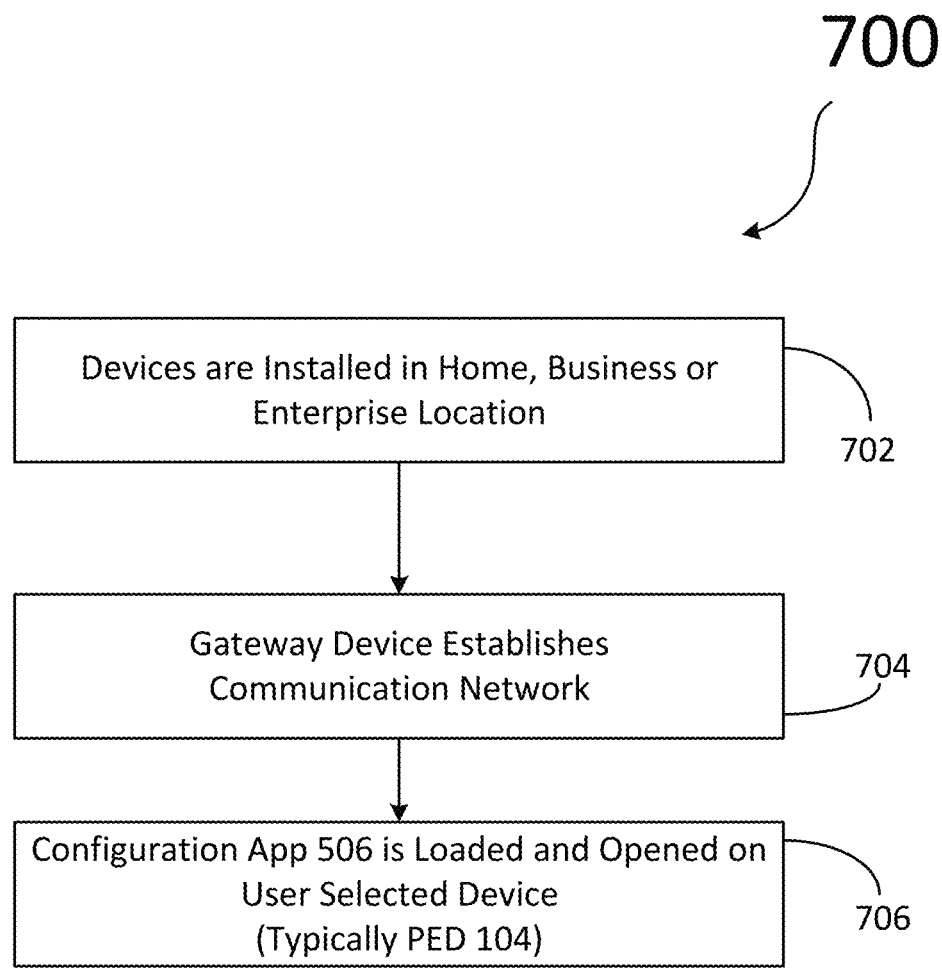
FIG. 7 illustrates a flow diagram of a method for installing and setting up the one or more controllable devices, communications network to communicate between the one or more controllable devices, and installation and setup of a configuration application software program that provides a user interface to the one or more controllable devices and control network according to aspects of the embodiments.

Method 600 begins with step 602 in which one or more controllable devices are installed in a home, business, or other enterprise location, and configuration App 506 is installed (FIG. 7, and method 700, and GUI 1100). In step 604 (FIG. 8, and method 800, GUIs 1200-1400), control network 100 is setup. In step 606 (FIG. 9, and method 900, as well as GUIs 1500-2100), control network 100 and the controllable devices (108, 110, 112, 118, 120, 111, 124, 126, 128, and 130) are configured. Then, in step 608 (GUI 2200, among others), automated tasks and scenes are setup.

Configuration App 506 installation method (Method) 700 begins with step 702 in which one or more controllable devices (108, 110, 112, 118, 120, 111, 124, 126, 128, and 130) are installed in a home, business, or other enterprise location. In step 704, gateway device 114 establishes one or more communication networks 102. As those of skill in the art can now appreciate, and as described in detail above, one or more gateway devices 114a-n can create or establish one or more communication networks 102a-n. However, for the purposes of this discussion only, and not to be taken in a limiting manner, only one such gateway device 114 shall be considered to be included in control network 100 and only one such communication network 102 shall be considered to be established by the one gateway device 114.

Following establishment of communications network 102, the user can load Configuration App 506 onto PED 104 (also part of step 706). As those of skill in the art can now appreciate, Configuration App 506 does not necessarily need to be loaded onto PED 104, but can be loaded onto a plurality of different devices such as a remotely located PC, CP 116, among other types of devices. In step 706, the user powers on and installs Configuration App 506; once Configuration App 506 is installed, control system installation GUI 1100 as shown in FIG. 11 opens up, and the user is invited to press button 1102 to start the setup process, in which Configuration App 506 begins to search for control processors 116 to make subsequent screens load faster, and to enable an auto-discover process; the user therefore does not have to necessarily know any network information such as an IP address or a randomly generated hostname.

Figure 11:
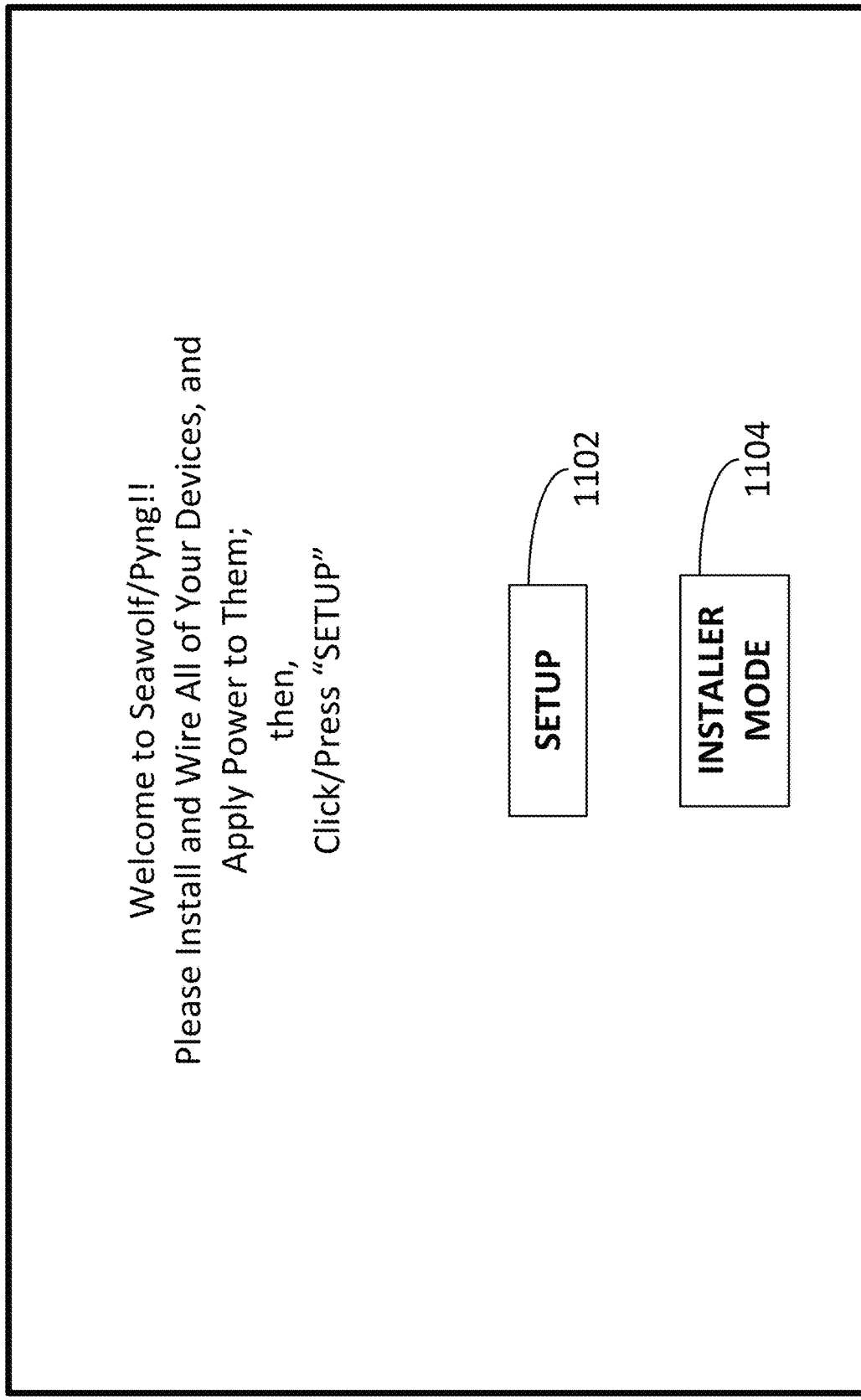
FIG. 11 illustrates a graphical user interface that can be used to configure automation rules and behaviors using the configuration application and other software and hardware components described above in regard to at least FIG. 6 according to aspects of the embodiments.

According to aspects of the embodiments, a commissioning tool is opened (this happens in a background operation, and is not visibly apparent to the user) and defaults to an "End User Mode." However, another option is available to the user in which an "Installer Mode" can be access by clicking on "Installer Mode" button 1104 (as shown in control system installation GUI 1100, FIG. 11). Although not typically used, if a user were to enter "Installer Mode," a password would need to entered, if control system 100 were previously configured. By default, prior to the user setting a personal password, the assigned serial number of control system 100 is the password until changed. Since this discussion is focused on an initial installation, control system 100 would not be already configured, and "Installer Mode" can be entered automatically. If control network 100 has not been used before, i.e., the use is an initial use, Configuration App 506 will cause the commissioning tool to enter "installer mode." If, however, control network has been setup, then Configuration App 506 will cause the commissioning tool to go to "end user mode."

Figure 8:
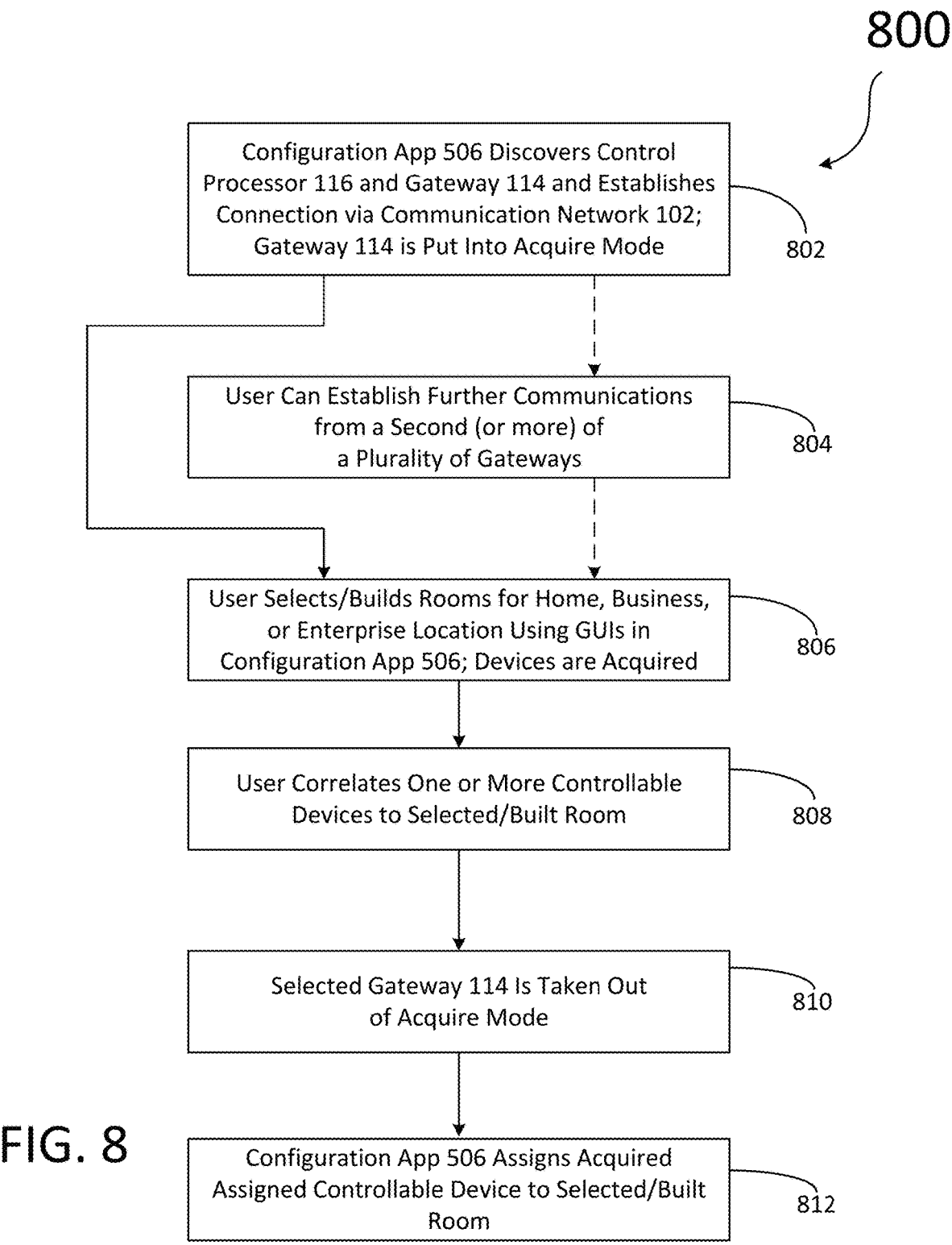
FIG. 8 illustrates a flow diagram of a method for setting up the control network including acquisition and definition of rooms and acquisition and assignment of controllable devices to the rooms according to aspects of the embodiments.
Figure 12:
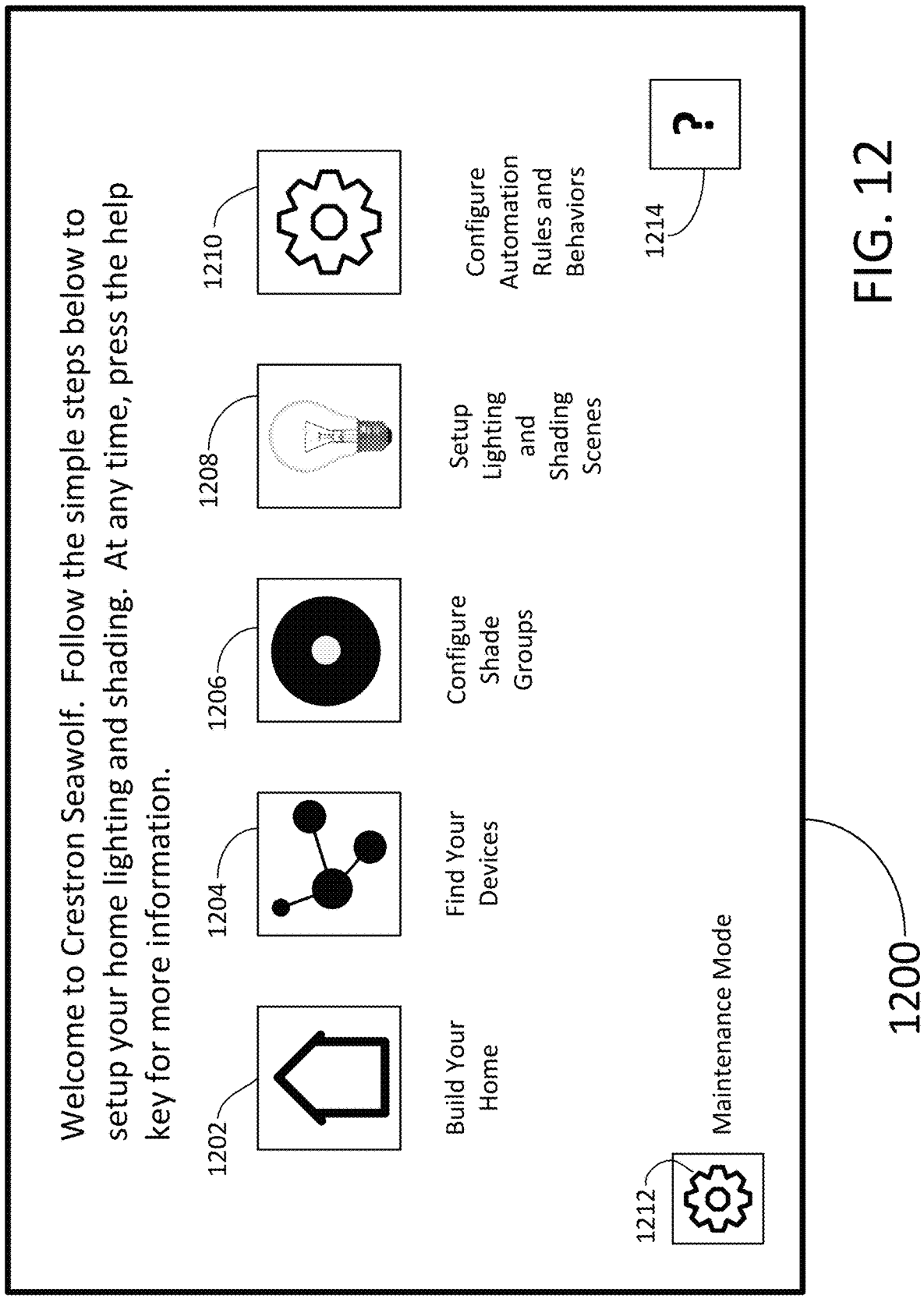
FIG. 12 illustrates a graphical user interface that can be used to configure automation rules and behaviors using the configuration application and other software and hardware components described above in regard to at least FIG. 6 according to aspects of the embodiments.

Once Configuration App 506 has been loaded onto PED 104 (or some other usable device), method 600 proceeds to step 604, wherein control network 100 can be setup; attention is now directed to FIG. 8, and control network 100 setup method 800. Upon being loaded onto PED 104, Configuration App 506 automatically finds communication network 102 (or one of a plurality of communication networks 102*a-n*) as well as LAN 134, establishes communications with a selected communication network 102 including LAN 134, and discovers one or more control processors 116 over a selected communication network, such as LAN 134 or communications network 102 (method step 802). Control system configuration GUI 1200, as shown in FIG. 12, is then displayed on PED 104 according to aspects of the embodiments, and displays the message "Please wait while we find your processor."

Control system configuration GUI 1200 includes several buttons that facilitate the setup and configuration of control network 100 and more particularly the setup and configuration of the one or more controllable devices. These setup and configuration buttons include "Build Your Home" button 1202, "Find Your Devices" button 1204, "Configure Shade Groups" button 1206, "Setup Lighting and Shading Scenes" button 1208, and "Configure Automation Rules and Behaviors" button 1210. Control system configuration GUI 1200 further includes "Help" button 1214, which can be pressed at any time to provide guidance and assistance to the user, and "Maintenance Mode" button 1212, that can perform maintenance on control network 100 according to aspects of the embodiments. As those of skill in the art can appreciate, such "maintenance" items includes status information such as time of day, status feedback from dimmers or shades (low battery level, firmware version, compatibility issues between newly installed/configured devices). In addition, this is where a user can configure a connection to the internet/cloud. PED 104 with Configuration App 506 thereafter establishes a bidirectional communication link with the selected control processor 116. For purposes of this discussion only, and not to be taken in a limiting manner, establishment of control network 100 will include only one such control processor 116, although, according to aspects of the embodiments, there can be more than one control processor 116 (see optional method step 804; however, as can be typically the case, there is only one control processor 116). Configuration App 506 can automatically discover and connect to the more than one control processor 116. According to an aspect of the embodiments, however, such connections are done one at a time; that is, Configuration App 506 connects to only one control processor 116 at a time, but can, according to further aspects, connect to others. In addition, gateway 114 is discovered, along with control processor 116, and gateway 114 is put into acquire mode.

In optional method step 804 (indicated by the dashed flow arrow lines to and from optional step 804), the user can choose from a second or more of a plurality of gateways 114 to connect to, if there are more than one to choose from. The selected gateway(s) 114 can be integrated with control processor 116, or can be additional standalone gateway(s) 114, and each of which can have their own established communications network 102*n*.

Figure 13:
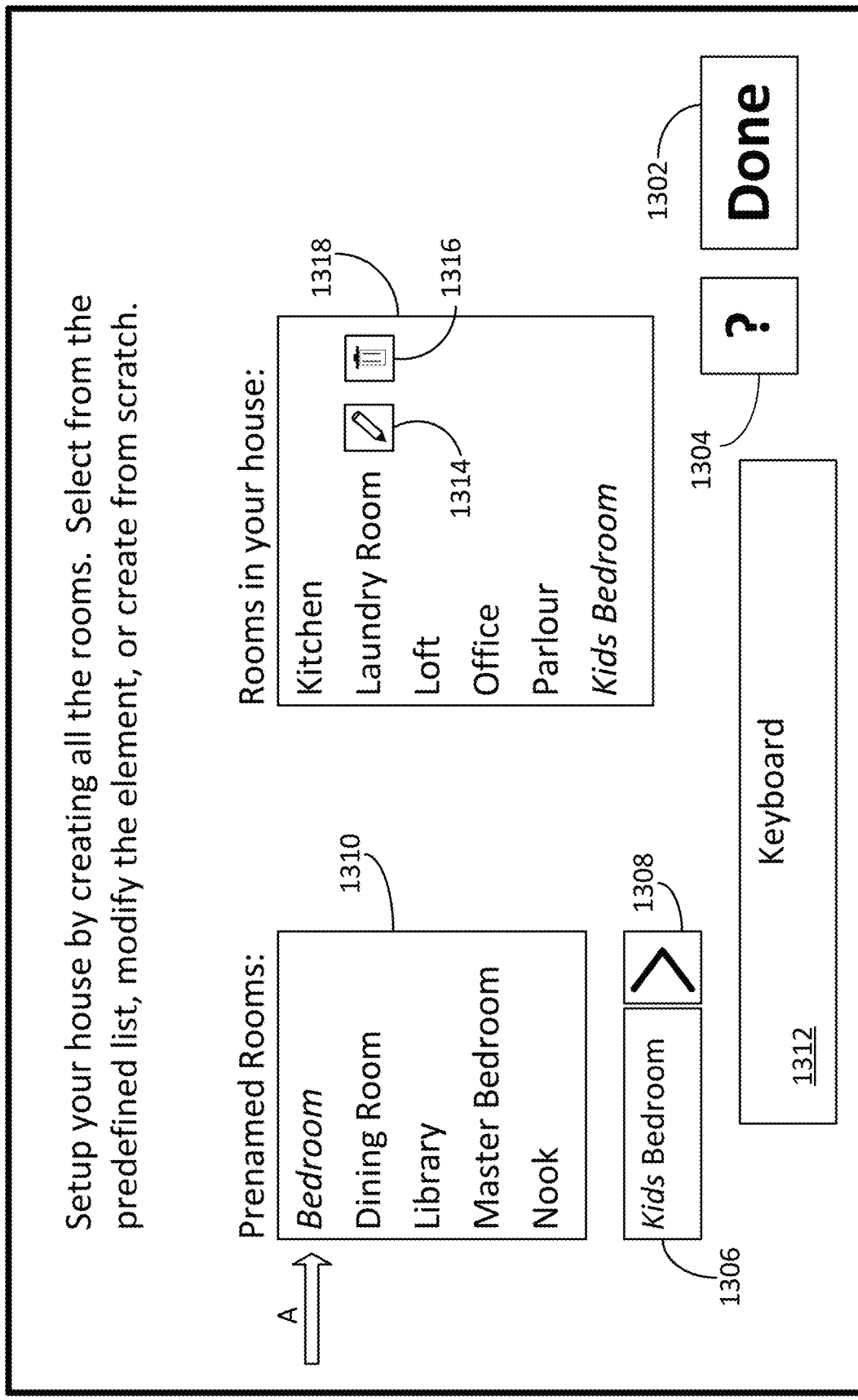
FIG. 13 illustrates a graphical user interface that can be used to configure automation rules and behaviors using the configuration application and other software and hardware components described above in regard to at least FIG. 6 according to aspects of the embodiments.

Following either of optional step 804, or step 802, in method step 806, the user can begin the process of selecting rooms and adding controllable devices (108, 110, 112, 118, 120, 111, 124, 126, 128, and 130) to each room. In method step 806, the user can select a room for configuration using Configuration App 506. Configuration App 506 displays on PED 104 one or more menu pages, in the form of graphical user interfaces (GUI), at least one of which includes a room selection/building feature. A message can appear on Control system configuration GUI 1200 that requests the user to continue the configuration process by pressing "Build Your Home" button 1202. The room selection/building feature allows a user to select from a list of common rooms in a house, or the user can create one or more custom rooms as needed. For example, there can be a list of such common rooms as kitchen, bathroom(s), master bedroom, mud room, laundry room, entrance foyer, and so on. An example of GUI that illustrates such a list is shown in FIG. 13. Using Room Configuration GUI 1300 of FIG. 13, in method step 806, the user selects a room to add controllable devices to. As part of the process of building rooms, Configuration App 506 directs gateway 14 to complete the acquiring of all of the controllable or controlling devices that can be found.

As discussed above, once gateway device 114 is put into acquire mode, all of the one or more controllable devices (108, 110, 112, 118, 120, 111, 124, 126, 128, and 130) are then acquired by gateway device 114. While gateway device 114 can acquire controllable devices without further user intervention (e.g., by communicating with them using communication network 102), it might also be the case that one or more of the controllable devices may have to be physically put into acquire mode prior to being acquired by gateway device 114. That is, the user may have to push a button, or send a separate command, such that the controllable device can be acquired by gateway device 114. Configuration App 506 alerts the user to any controllable devices that cannot be acquired by gateway device 114 without user intervention. The action of acquiring is the action of the selected gateway device 114 transmitting, to each known controllable device, transmissions that cause the controllable device to be active and controllable. Once acquired, the controllable devices can then be correlated, as discussed below in method step 808.

Referring now to FIG. 13, a user would encounter Room Configuration GUI 1300 as shown therein; the user can select from one of a plurality of predefined rooms as shown in Pre-named House Rooms list 1310, which lists all the rooms that have been predefined for the home, business, or enterprise location within which control network 100 is being installed. As shown in FIG. 13, the user has selected "Bedroom" (indicated by arrow A, and which is now italicized. Note: in FIG. 13, several actions are shown, but compressed into one Figure). Once selected, "Bedroom" shows up in Edit box 1306; at or about the same time, Keyboard 1312 opens and allows the user to edit "Bedroom." In this case, the user has edited "Bedroom" to become "Kids Bedroom" (wherein the edited part is shown in italics in FIG. 13, Edit box 1306). Once the user has completed editing to his or her satisfaction, the user can click (or press) Add button 1308, and the re-titled room, "Kids Bedroom," is added to Rooms in Your House list 1318. In general, both Pre-named House Rooms list 1310 and Rooms in Your House list 1318 can be organized alphabetically. In addition, once a room has been added to Rooms in Your House list 1318, it can be further edited (through use of Inline Edit button 1314, which returns the room to Edit box 1306, and Keyboard 1312), or deleted (through use of Inline Delete button 1316 (which asks for confirmation of deletion prior to making the deletion permanent)). According to further aspects of the embodiments, the list of current rooms in the home (Rooms in Your House list 1318), also can show the number of controllable devices that have been assigned to that room; since FIG. 13 illustrates a new installation, no controllable devices have been assigned to any rooms at this point. Room Configuration GUI 1300 also contains Help button 1304. After all rooms have been added to Rooms in Your House list 1318, and/or edited as desired, Done button 1302 can be pressed to save all the information for the current configuration of rooms of the house (or business, or enterprise location). This completes method step 806, and returns the user from Room Configuration GUI 1300 to control system configuration GUI 1200.

Upon returning to control system configuration GUI 1200, the user has navigated method 800 from method step 806 to method step 808, in which the user can now correlate or assign one or more controllable devices to a selected or built room according to aspects of the embodiments. In method step 808, the user can begin the process of assigning one or more controllable devices to each selected or built room. The actual step of "assigning" occurs once one or more controllable devices have been correlated with the current selected built room (step 808). Correlation means that the user wants the particular controllable device to be associated with a particular selected or built room, but control network 100 has not yet fixed the controllable device to the room for the purposes of command and control. In other words, it is similar to putting boxes with televisions (TVs) or stereos in a room but not yet hooking them up; the user knows where they should be located, and "puts" them there (in actuality, the physical devices have already been installed, but control network 100 has not yet been configured to command and control them), but has not yet plugged power cords and/or audio/video (AV) cables into the new TVs or stereos.

In method step 808, the user begins the process of correlating one or more controllable devices to the selected (or built) room (for purposes of this discussion, it will be considered that the user selects a room from a list of commonly available rooms in a typical home, business, or enterprise location), by pressing or clicking Find Your Devices button 1204. Configuration App 506 displays on PED 104 (or other such similar device) control system configuration GUI 1200 to assign rooms to control network 100. The user continues the process of correlating controllable devices to the selected room until all of the controllable devices the user desires to controlled by controls located in the selected room, have all been correlated. According to aspects of the embodiments, the process of correlation can include a subset of controllable devices located in the selected room, wherein the subset can be all of the controllable devices physically located in the selected room, or the subset can be less than all of the controllable devices located in the selected room, or the subset can include additional controllable devices that are not physically located in the selected room, but which are desired to be controlled by a control device located in the selected room; this latter option can be referred to as establishing "virtual devices" and is described in greater detail below. According to further aspects of the embodiments, un-assigned assets can be viewed as separable according to specific functionality. By way of non-limiting example, un-assigned devices could be a light and its corresponding keypad. The light can be in a room different than that of the keypad that controls the light. This allows the two devices to be functionally independent when configured at a later time. By further way of a further non-limiting example, such a light-keypad combination can be a CLW-Dimex light/keypad combination device as manufactured by Crestron Electronics, Inc., of Rockleigh, NJ.

Figure 14:
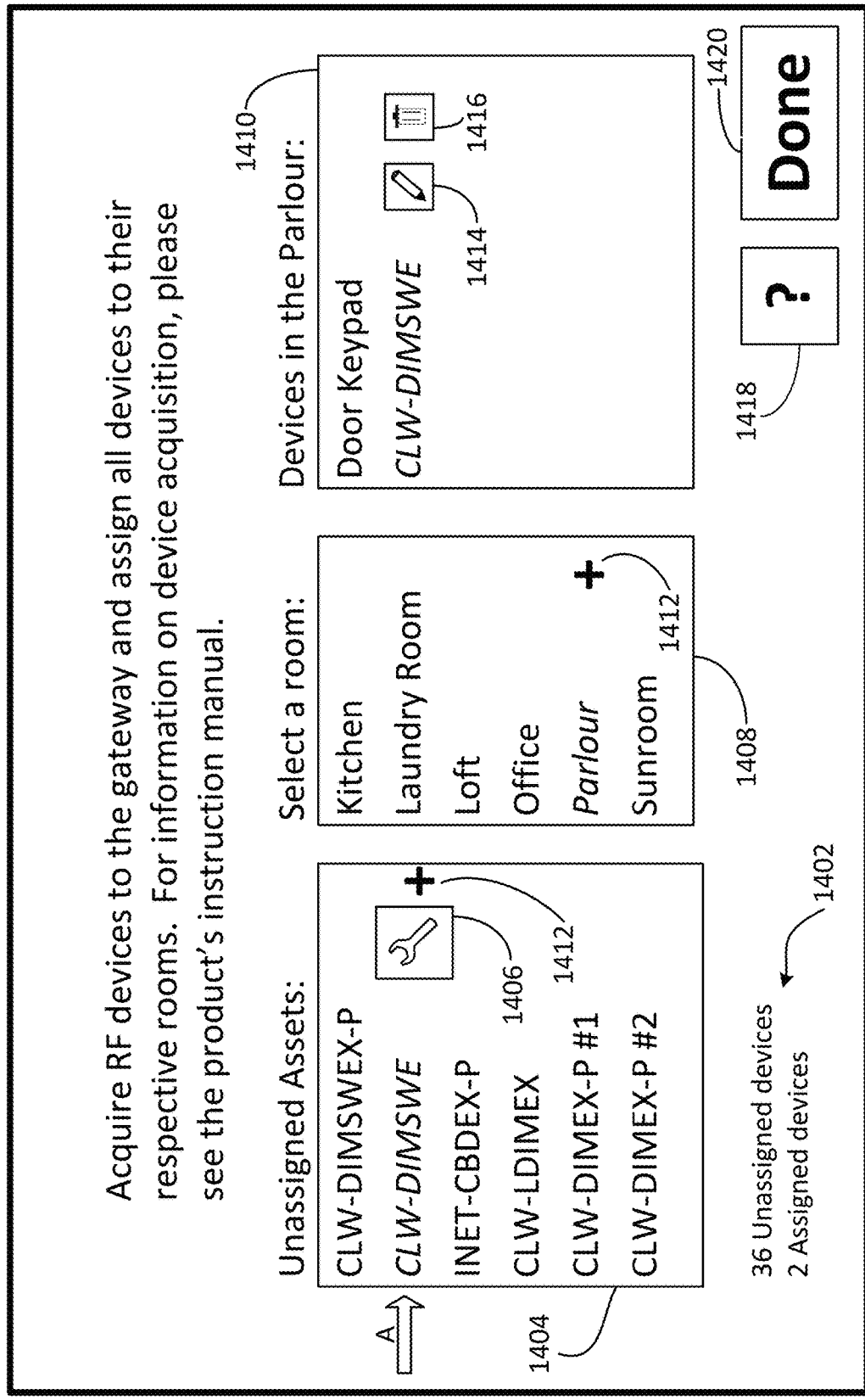
FIG. 14 illustrates a graphical user interface that can be used to configure automation rules and behaviors using the configuration application and other software and hardware components described above in regard to at least FIG. 6 according to aspects of the embodiments.

Once Find Your Devices button 1204 is pressed or clicked, the user is taken to Acquire RF Device GUI 1400, as illustrated in FIG. 14 according to aspects of the embodiments. Acquire RF Device GUI 1400 includes Number of Devices field 1402, Unassigned Assets list 1404, Configure button 1406, Room Selection list 1408, Devices in Selected Room list 1410, Add button 1412, Inline Edit button 1414, Inline Delete button 1416, Information button 1418 and Done button 1420.

Upon display of Acquire RF Device GUI 1400, the user can start the process of assigning controllable devices. A message can be displayed, not shown, that alerts the user that the process of controllable device correlation/discovery can begin, and it can take the user some time to make the manual pairing of the devices as desired. As described above, it is possible that more than one gateway device 114 can be associated with control network 100, so the user may be asked to choose from a plurality of gateway devices 114. Unassigned Assets list 1404 shows all of the controllable devices that have been acquired by control network 100, but which have not yet been correlated to a room. It is possible that some of the controllable devices can have multiple outputs; these will show up as multiple entries in the lists, but with a number at the end of its respective description (e.g., CLW-DIMEX-P #1 and CLW-DIMEX-P #1, as shown in Unassigned Assets List 1404). Once a device is selected by the user, Configure button 1406 is added to Unassigned Assets list 1404, as shown in FIG. 14; note that in FIG. 14, similar to that of FIG. 13, selected items are italicized to indicate the status of being selected or acted on for purposes of this discussion.

Room Selection list 1408 shows all of the rooms in the house. The user can scroll down the list, if there are more rooms than can fit in the field (which is a feature that those of skill in the art can appreciate), and when a room is selected ("Parlour" in this case), the name is highlighted (shown as italicized in FIG. 14), and Add button 1412 appears in Room Selection list 1408. In addition, Devices in Selected Room list 1410 appears, also as shown in FIG. 14. In the example of FIG. 14, "Parlour" was selected, and Devices in Selected Room list 1410 is labeled "Devices in Parlour"; in this case, two devices are shown, "door keypad," and "CLW-DIMSWEX."

The Devices in Selected Room list 1410 shows all the controllable devices currently associated with the selected room. The devices are ordered initially in alphabetical order according to device name, which can be changed by the user following a prompt (e.g., change CLW-DIMSWEX to "Lights—Chuck's Room." When a new device is added to Devices in Selected Room list 1410, it is automatically highlighted, and added to the bottom of the list. This is accomplished by clicking on Add button 1412. In the example shown in FIG. 14, the unassigned controllable device CLW-DIMSWE has been selected from Unassigned Assets list 1404 (indicated by arrow A, and the italicized name), and has shown up in Devices in Selected Room list

1410. Although not shown in FIG. 14, in addition to the model name of the selected device, model numbers and serial numbers can also be shown in Devices in Selected Room list 1410. As with Room Configuration GUI 1300, there are Inline Edit button 1414, and Delete button 1416, which operate in a substantially similar manner as described above in regard to FIG. 13.

Also shown in Acquire RF Device GUI 1400 is Number of Devices field 1402. This field indicates the total number of controllable devices that have been assigned, and the total number of controllable devices that have not been assigned. In FIG. 14, two devices have been assigned to the parlour, and this is the first room controllable devices have been assigned to; the number of assigned devices is 2 and there are 36 additional controllable devices waiting to be assigned.

Referring back now to FIG. 8, once the user has correlated all of the one or more controllable devices to the one or more selected/built rooms, gateway 114 can be taken out of acquire mode in method step 810, either through being selected on Configuration App 506, or through some other process, such as a physical action (e.g., pushing a button).

Figure 28:
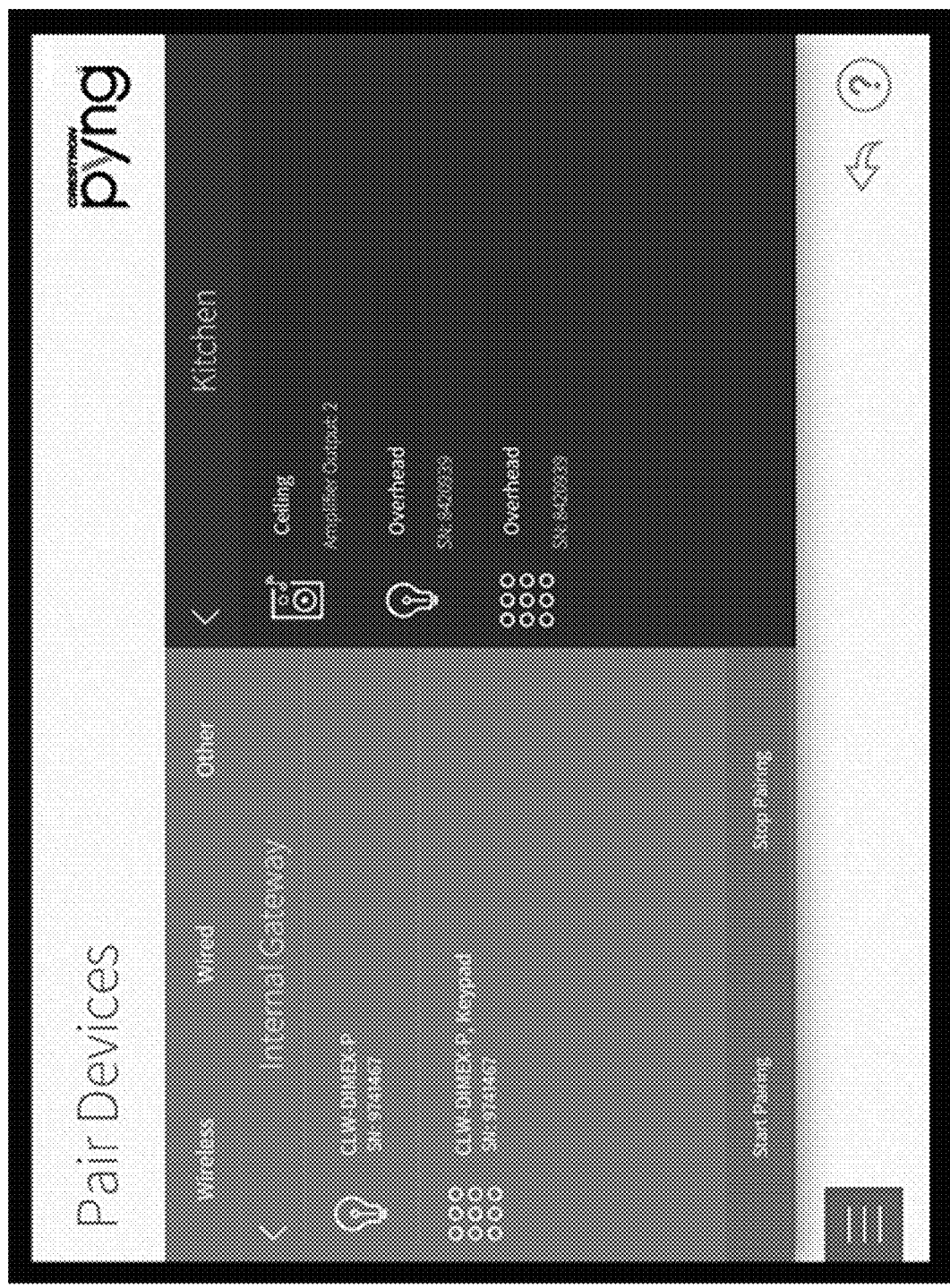
FIG. 28 illustrates a pair virtual devices graphical user interface according to aspects of the embodiments.

As described above, in some circumstances, according to aspects of the embodiments, a physical controllable device and the controlling device can be treated as two separate virtual devices. Attention is now directed to FIG. 28, which illustrates Pairing Virtual Device GUI 2800 with two virtual devices, CLW-DIMEX-P (the physical lights), and CLW-DIMEX-P Keypad (the physical keypad for the light); but because they have been separated out, they can be treated as virtual devices. Both of the light and its corresponding keypad have not yet been assigned to a room, and as such are located on the left side of Pairing Virtual Device GUI 2800. For example, this situation can arise in the case that a first light is in a first room, but the keypad that controls the light is in a second room, or perhaps the light is outside the building and the controlling device is inside the building (such as a foyer and exterior front door light). In this case, the acquired controllable device will show up in Configuration App 506 as two separate virtual devices. This allows a user to associate the controlled load with the proper room in the house as opposed to assigning it to the room where the physical controllable device is located. If this feature was not present, an "All-on" button in the foyer may switch on all exterior lights.

According to further aspects of the embodiments, acquired controllable devices can be automatically grouped as a single device depending on the type of controllable device. Configuration App 506, in method step 812, inventories all controllable devices in a room (and does this for all rooms), and combines functions of certain controllable devices. According to further aspects of the embodiments, Configuration App 506 can use the model numbers of the set of controllable devices assigned to a selected room to determine which functions to group together for that room. For example, in a room configuration in which multiple occupancy sensors overlap to cover the room, Configuration App 506 can recognize that multiple occupancy sensors are assigned to the same room, and can automatically combine the functions of those occupancy sensors into a single virtual device. According to aspects of the embodiments, this action can occur without notice to the users such that Configuration App 506 will logically OR the occupancy sensor for occupancy (if any one shows an occupant, the entire room is designated as being occupied) and logical NAND for vacancy (such that unless all sensors show vacancy, the room remains designated as being occupied).

Following completion of method 800, with method step 812, method 600 returns to method step 606, wherein components of network 100 can be configured according to aspects of the embodiments. In method step 606, Configuration of Devices method (method) 900 begins with Configure Shades method step 902, according to aspects of the embodiments.

Figure 9:
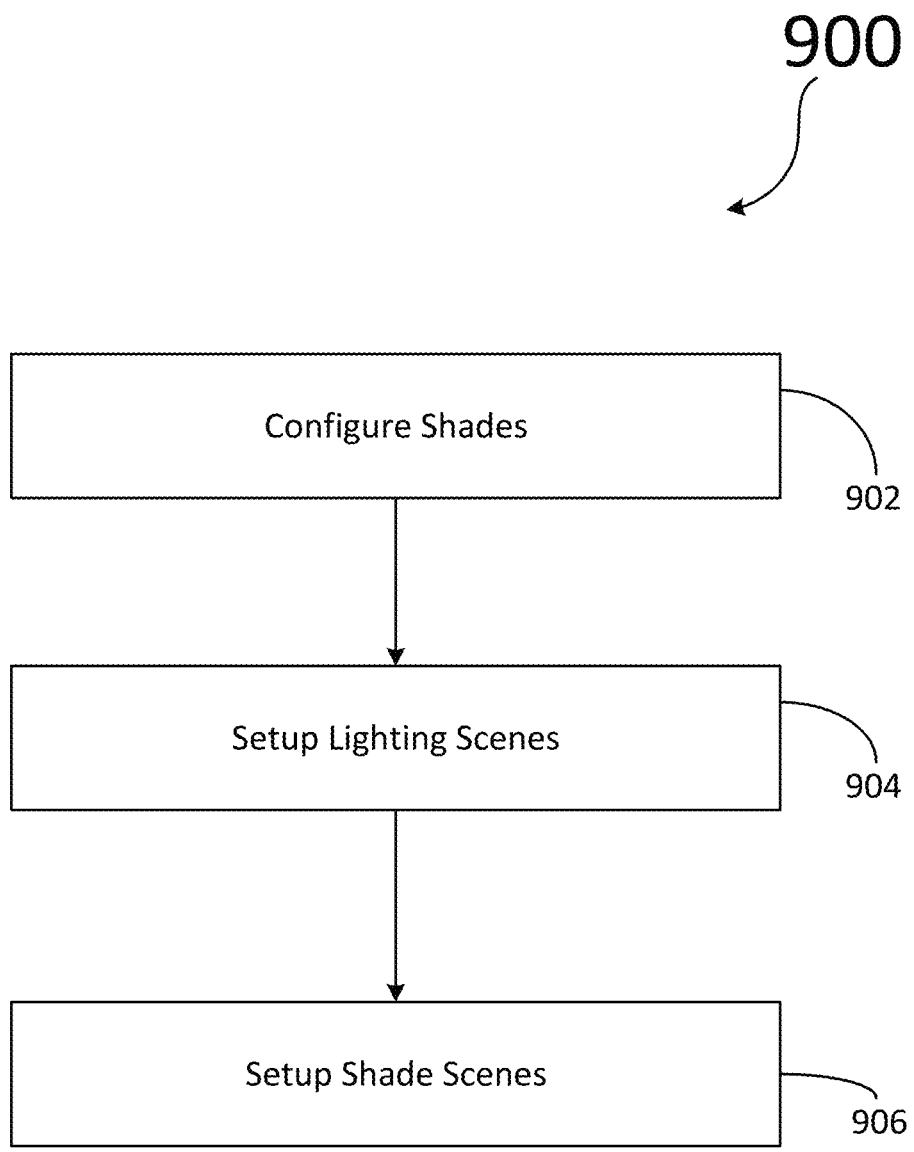
FIG. 9 illustrates a flowchart of a method for setting up one or more automatic tasks in one or more controllable devices in the control network of FIG. 1 according to aspects of the embodiments.
Figure 15:
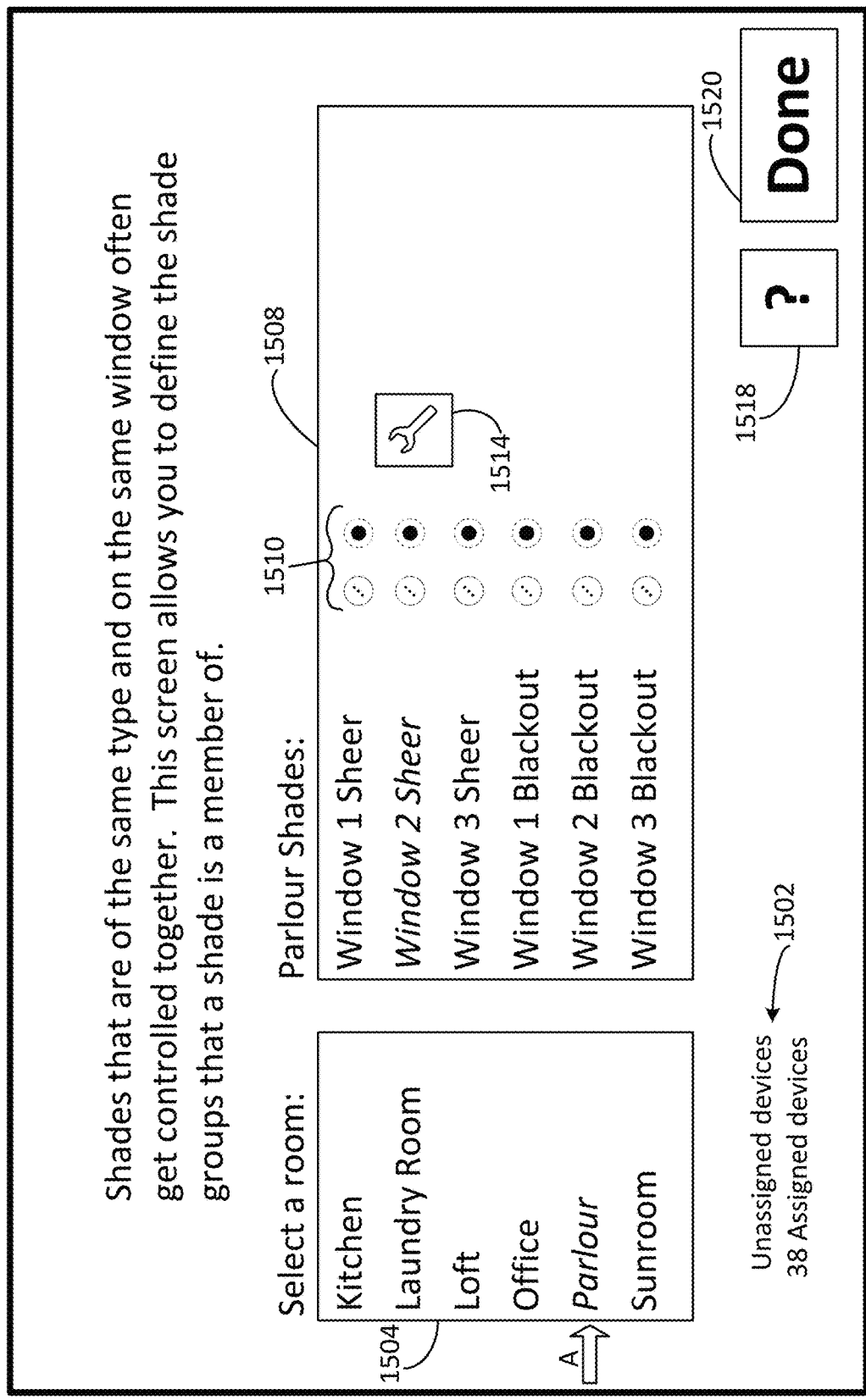
FIG. 15 illustrates a graphical user interface that can be used to configure automation rules and behaviors using the configuration application and other software and hardware components described above in regard to at least FIG. 6 according to aspects of the embodiments.
Figure 29:
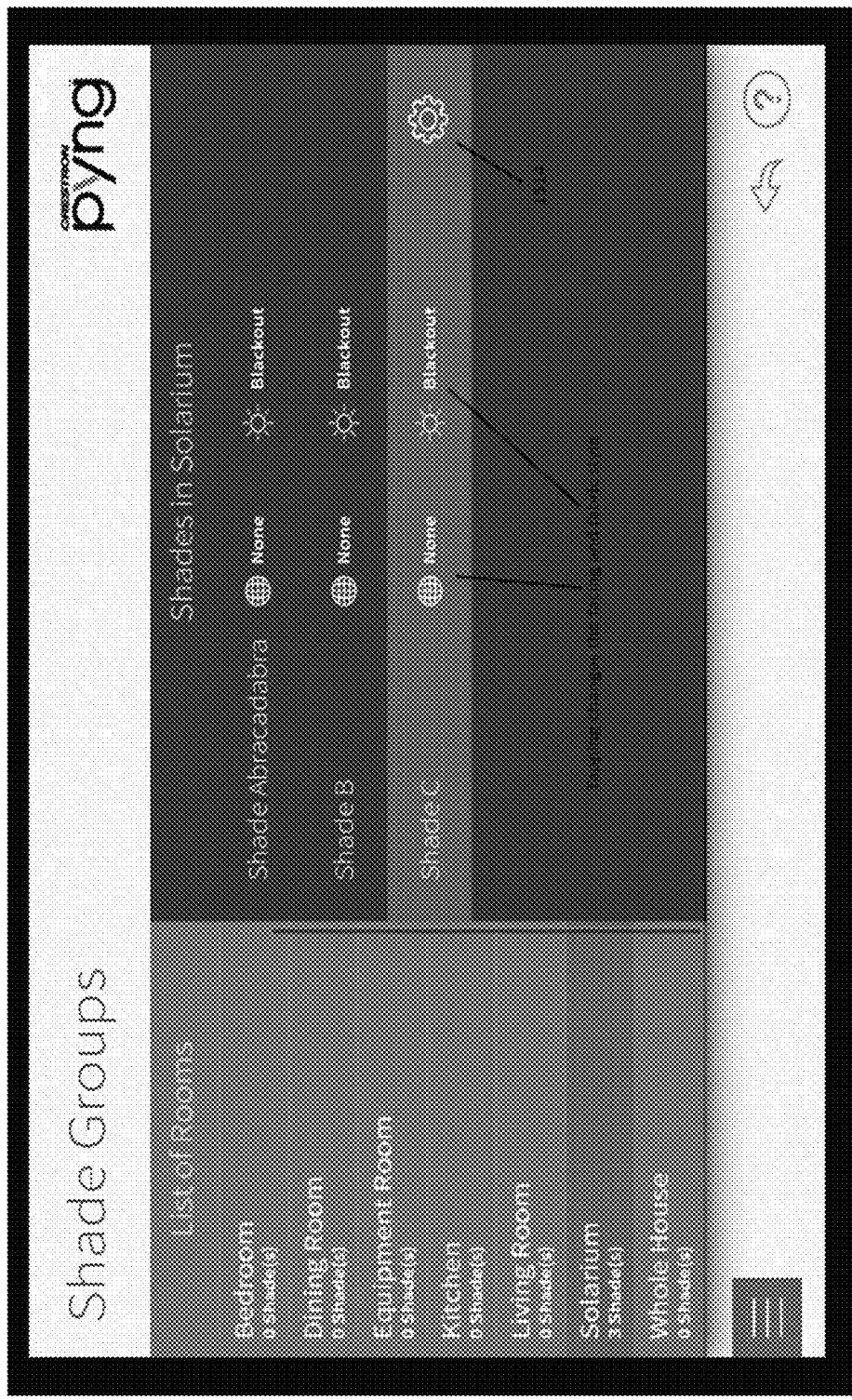
FIG. 29 illustrates an alternate embodiment of the graphical user interface of FIG. 15 according to an aspect of the embodiments.

Referring now to FIGS. 9, 12, and 15, method 900 begins when the user, upon returning to Control System Configuration GUI 1200, presses Configure Shade Groups button 1206. Shade Group Configuration GUI 1500, shown in FIG. 15, illustrates an example of Configuration App 506 creating smart scenes that function on one or more room levels according to aspects of the embodiments. Control network 100 with Configuration App 506 can assign shades to different shade groups (an alternate embodiment of GUI 1500 is shown in FIG. 29). A shade group can be broken into at least two different categories: fabric type, and (direction of) facing. For example, the facing options can include none, north, east, south, and west, the latter four indicating the four major points of the compass. Fabric options (note that this does not mean the different manufactured types of fabric, but categories of fabric) include none, transparent sheer, translucent sheer, and blackout. According to aspects of the embodiments, if different groups have not been defined for a shade, the individual shade will show up, but only in subsequent screens, according to its given name. According to further aspects of the embodiments, the set of valid shade groups include North Transparent Sheers, South Transparent Sheers, East Transparent Sheers, West Transparent Sheers, Transparent Sheers, North Translucent Sheers, South Translucent Sheers, East Translucent Sheers, West Translucent Sheers, Translucent Sheers, North Blackouts, South Blackouts, East Blackouts, West Blackouts, Blackouts, North Shades, South Shades, East Shades, West Shades, or No Group. However, as those of skill in the art can appreciate, the list of valid shade groups could be expanded, and as such the above list should not be considered as limiting, but only one example thereof.

Attention is again directed towards FIG. 15; once Shade Group Configuration GUI 1500 appears due to pressing/clicking of Configure Shade Groups button 1206 (of FIG. 12), the user can then select a room within which to configure the shades in Room Selection list 1504. As shown in Shade Group Configuration GUI 1500 of FIG. 15, the user has selected Parlour (indicated by the italics, and arrow A). Selecting Room Selection list 1504 brings up and displays the shades in that room in Add Shade to Room field 1508. In FIG. 15, several operations are illustrated as having already occurred, although those of skill in the art can appreciate that upon opening of Shade Group Configuration GUI 1500 Add Shade to Room field 1508 would not have opened in Shade Group Configuration GUI 1500, and neither would have Add button 1506 appeared (not shown), until a room was selected. Also shown in FIG. 15 are Information button 1518, and Done button 1520, both of which perform substantially similar functions as similarly named buttons in other GUIs and therefore, in fulfillment of the dual purposes of clarity and brevity, a detailed description thereof has been omitted.

Figure 16:
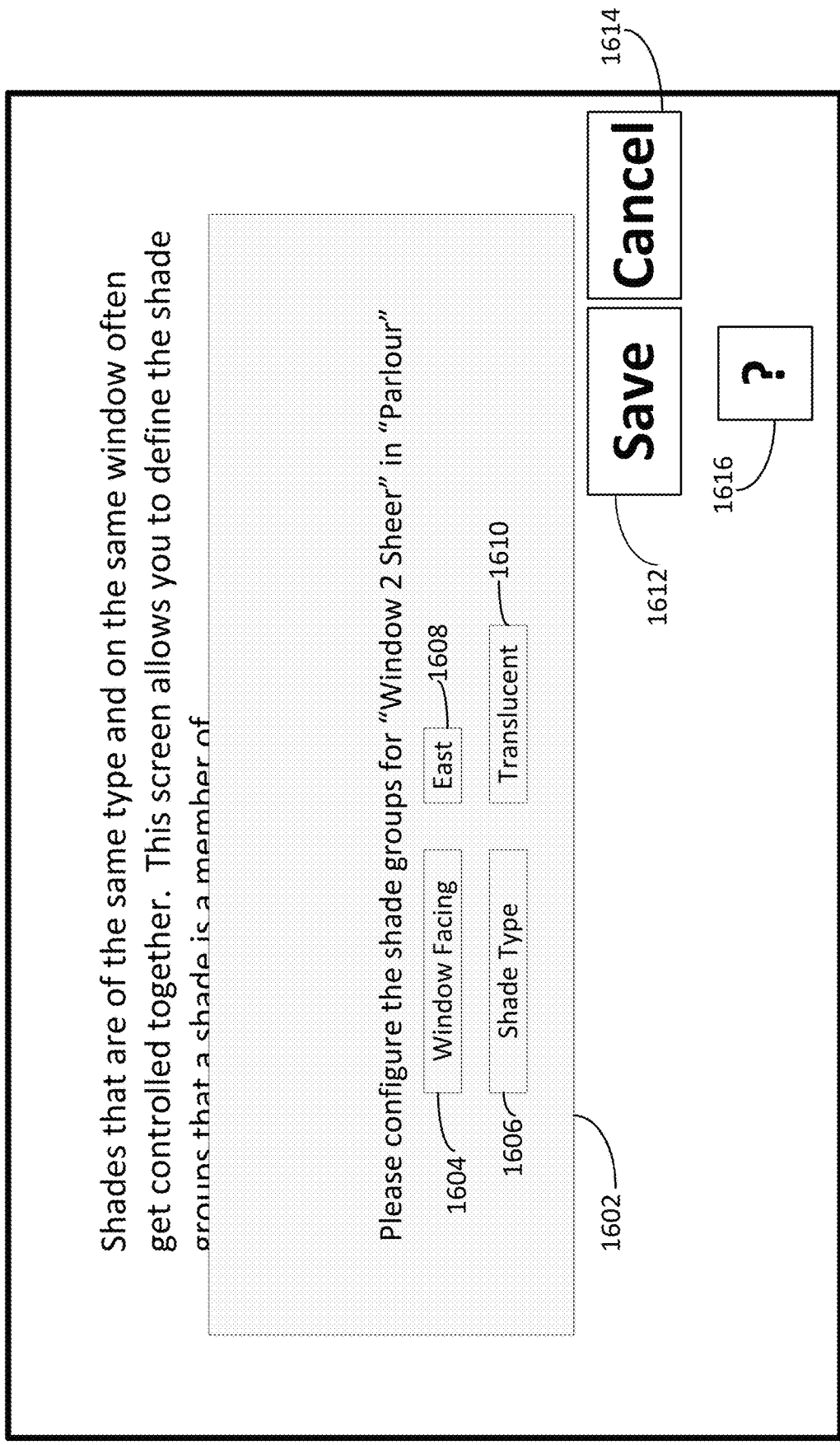
FIG. 16 illustrates a graphical user interface that can be used to configure automation rules and behaviors using the configuration application and other software and hardware components described above in regard to at least FIG. 6 according to aspects of the embodiments.
Figure 30:
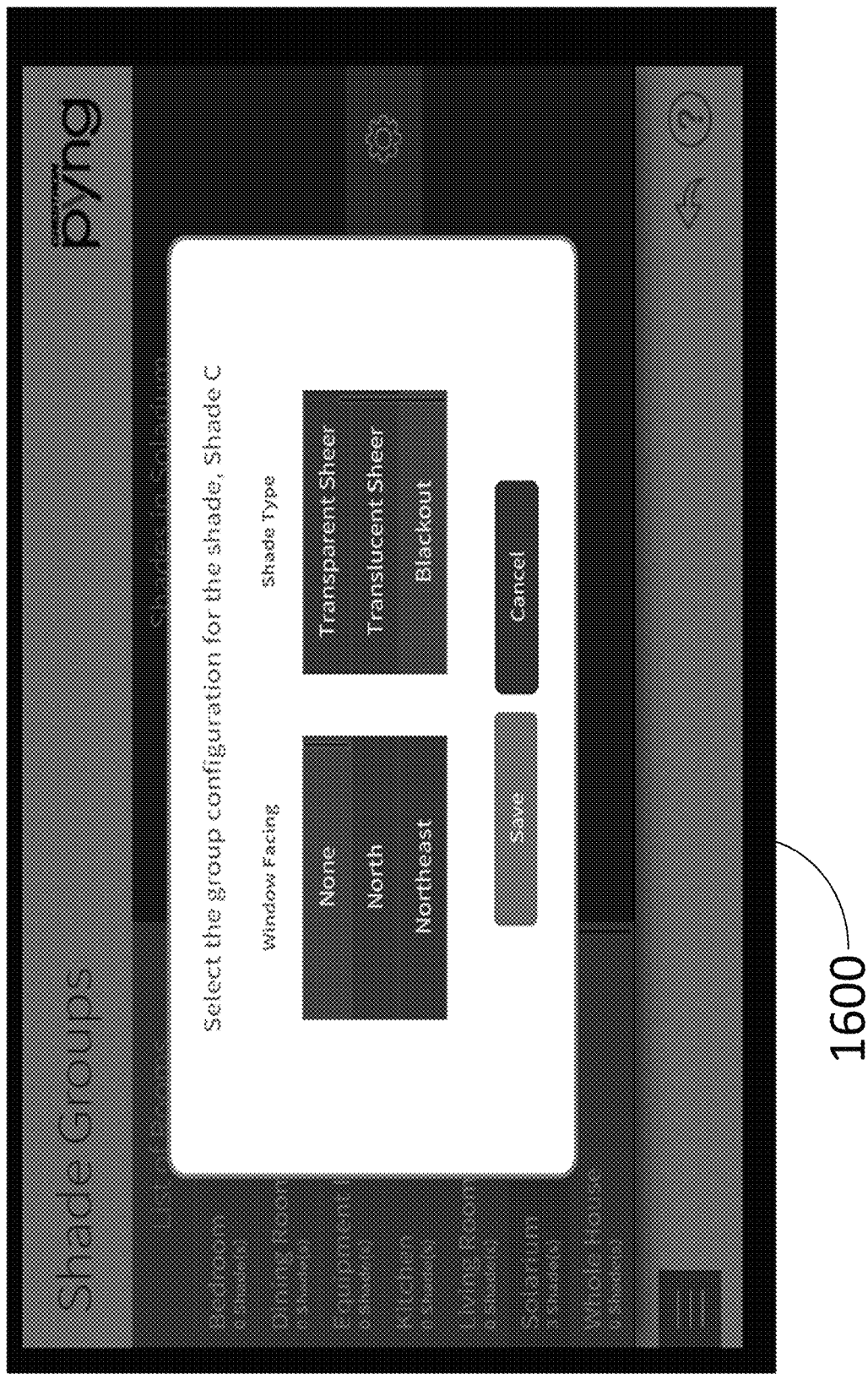
FIG. 30 illustrates an alternate embodiment of the graphical user interface of FIG. 16 according to an aspect of the embodiments.

Further shown in Shade Group Configuration GUI 1500 are all of the shades that are presented as part of the selected room, in this case, the parlour room. In FIG. 15, however, the user wants to configure one of the shades, "Window 2 Sheer." To accomplish configuration, the user clicks, or presses Configure button 1514; also shown are Fabric/Facing buttons 1510, and Information button 1518 and Done button 1520, each of which performs a substantially similar function as the similarly named button in other GUIs and therefore, in fulfillment of the dual purposes of clarity and brevity, a detailed description thereof has been omitted. Once Configure button 1514 is clicked or pressed, Shade Group Configuration GUI 1600 opens, as shown in FIG. 16. An alternate embodiment of Shade Group Configuration GUI 1600 is shown in FIG. 30 according to aspects of the embodiments. Referring to both FIGS. 16 and 30, Shade Group Configuration GUI 1600 has a quick-look type feature that indicates what facing and type are selected. Clicking on the facing or type icon scrolls to the next facing or type in order to more quickly adjust shade groups. Also shown in Shade Group Configuration GUI 1500 is Number of Devices field 1502. This field indicates the total number of controllable devices that have been assigned, and the total number of controllable devices that have not been assigned. In FIG. 15, 38 devices have been assigned to the parlour, and this is the total number of assignable device; the number of unassigned devices is therefor 0, and thus there are no additional controllable devices waiting to be assigned.

FIG. 16 illustrates Shade Group Configuration GUI 1600 according to aspects of the embodiments. Shown in FIG. 16 are Shade Group Configuration window 1602, Shade Group Window Facing box 1604, Shade Group Type box 1606, Shade Group Direction box 1608, and Shade Group Fabric Type box 1610. In Shade Group Direction box 1608, the user can change the direction of the shade, and in Shade Group Fabric Type box 1610, the user can change the type of shade (in this case, translucent). In addition, also part of Shade Group Configuration GUI 1600 is Shade Group Save button 1612, Shade Group Cancel button 1614, and Shade Group Information button 1616. To complete the configuration of the shade groups, the user can click or press on Shade Group Save button 1612; this returns method 900 to method step 904, wherein the user can now configure lighting scenes. As those of skill in the art can appreciate, configuring, or setup of shade scenes can occur before or after configuring (or setup) of the lighting scenes, and therefore method step 904 can be "configure shade scenes" instead of "configure lighting scenes."

Figure 17:
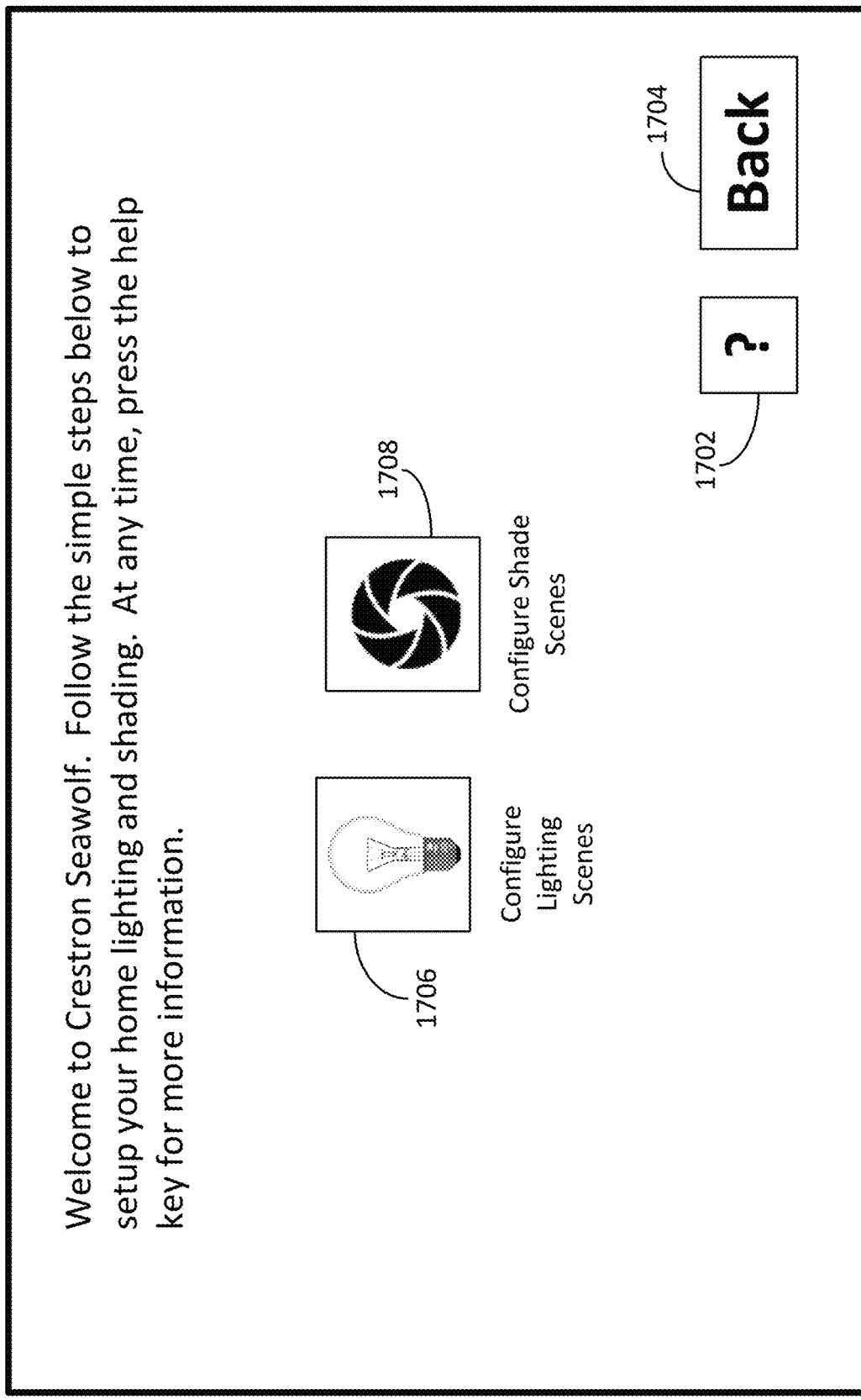
FIG. 17 illustrates a graphical user interface that can be used to configure automation rules and behaviors using the configuration application and other software and hardware components described above in regard to at least FIG. 6 according to aspects of the embodiments.

According to further aspects of the embodiments, the steps of configuring scenes is split between configuring lighting scenes (method step 904) and configuring shade scenes (method step 906). Shown in FIG. 17 is Intermediate Scene Configuration Menu GUI 1700 that allows the user to select which type of scene they intend to configure. Intermediate Scene Configuration Menu GUI 1700 includes Scene Configuration Help button 1702, Scene Configuration Back button 1704, Configure Lighting Scene button 1706, and Configure Shade Scene button 1708. Clicking on Setup Lighting and Shading Scenes button 1208 brings a user from Control System Configuration GUI 1200 to Intermediate Scene Configuration Menu GUI 1700. From there, the user can select to configure lighting scenes, by clicking/pressing Configure Lighting Scenes button 1706, or click/press Configure Shade Scenes button 1708 to configure shade scenes. The configuration of lighting scenes will be discussed first, and then configuration of shade scenes. According to further aspects of the embodiments, "All-On" and "All-Off," as shown in FIG. 18, are included by default.

Figure 18:
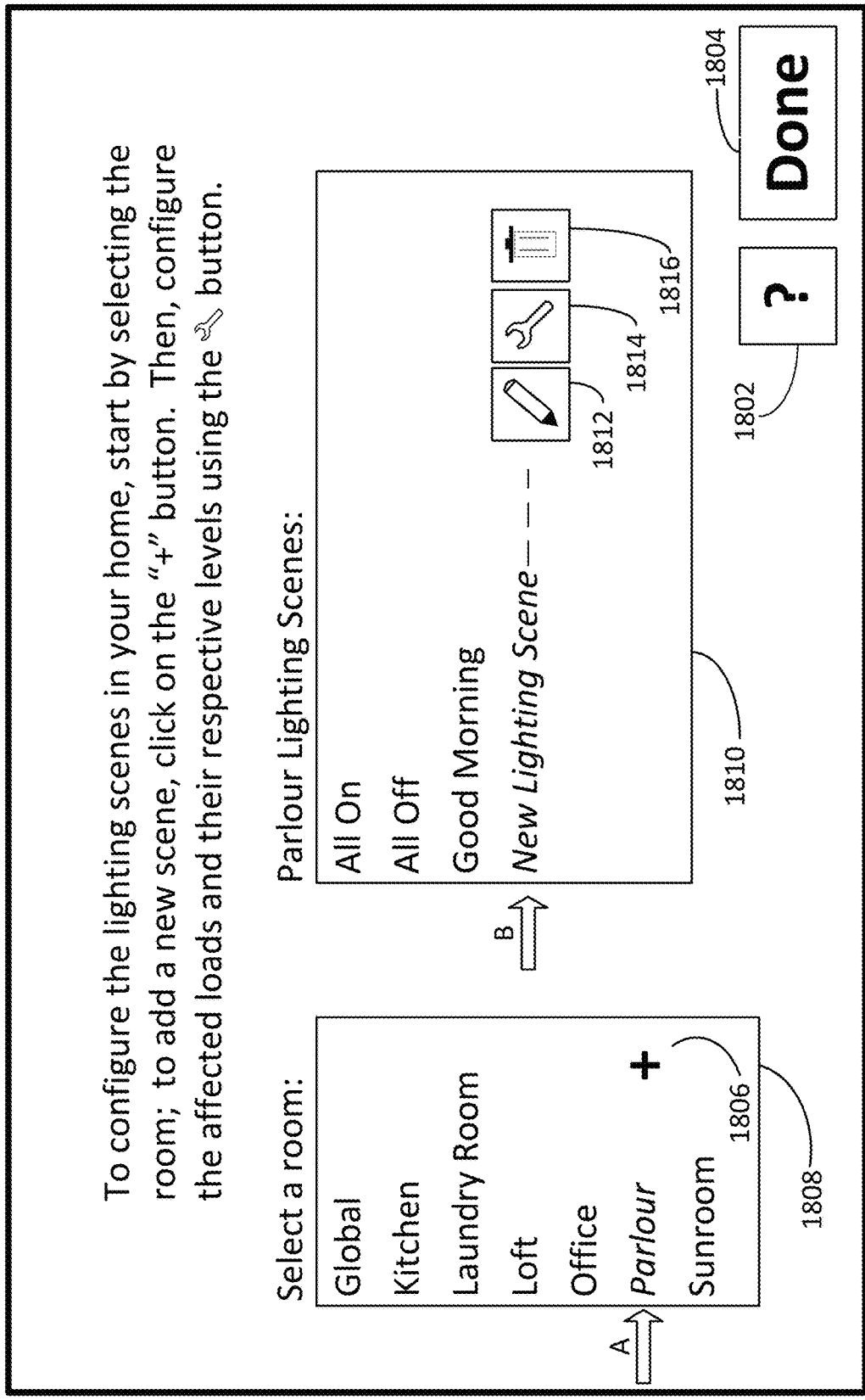
FIG. 18 illustrates a graphical user interface that can be used to configure automation rules and behaviors using the configuration application and other software and hardware components described above in regard to at least FIG. 6 according to aspects of the embodiments.
Figure 31:
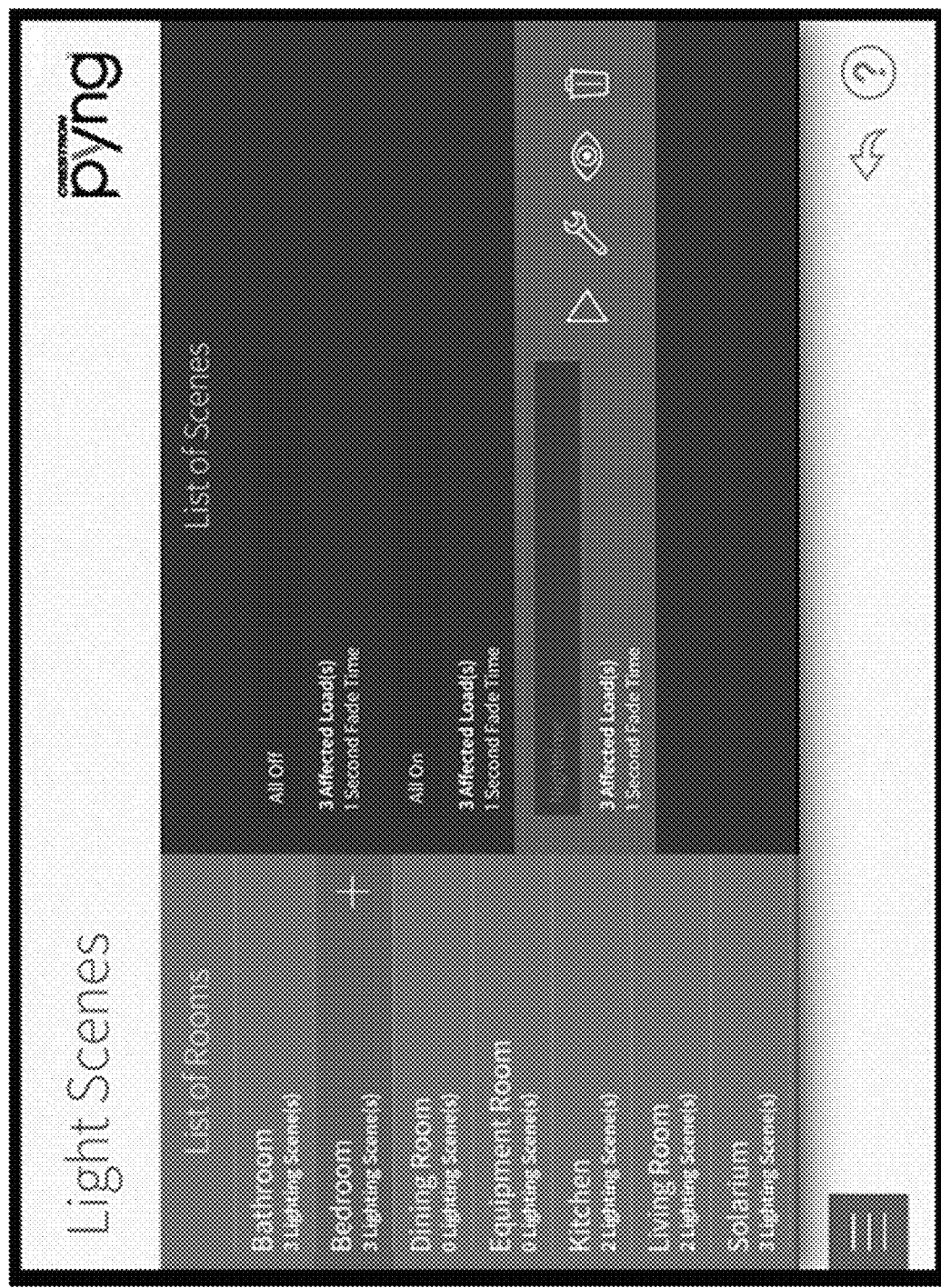
FIG. 31 illustrates an alternate embodiment of the graphical user interface of FIG. 18 according to an aspect of the embodiments.

Upon clicking or pressing Configure Lighting Scene button 1706, the user is presented with Lighting Scene Configuration GUI 1800 (this begins the process associated with method step 904), as shown in FIG. 18 (FIG. 31 illustrates an alternate embodiment of FIG. 18 according to aspects of the embodiments). Lighting Scene Configuration GUI 1800 includes Lighting Scene Room Selection window 1808, Add button 1806, Selected Room Lighting Scene window 1810, Lighting Scene Configuration Information button 1802, Lighting Scene Configuration Done button 1804, Lighting Scene Inline Edit button 1812, Lighting Scene Delete button 1816, and Lighting Scene Configure button 1814. In FIG. 31, Lighting Scene Configuration GUI 1800 also includes a Play button, shaped like a triangle, which allows a user to recall the scene, and a Visibility button (shaped like an eye), which allows the selected scene to show up in other rooms, according to further aspects of the embodiments According to aspects of the embodiments, a special room can be created by default in every project and will show up at the top of the room list. The special room can be called "Whole Home" (or "Global" in the appropriate Figures). According to further aspects of the embodiments, the "Whole Home" room can, by default, include the following lighting scenes: All Off (Turns off all loads in the system); and "All On" (Turns on all loads in the system). According to further aspects of the embodiments, the "Whole Home" room can include the following shade scenes: "All Open" (Opens all shades in the system); and "All Close" (Closes all shades in the system). The default scenes in the "Whole Home" room cannot be renamed or deleted, though they may be modified. According to still further aspects of the embodiments, control network 100 includes the feature of linked scenes. That is, a linked scene is one in which scenes located in other rooms can be "linkable" to another room in order to display that scene on a touchscreen. One aspect of the embodiments includes that linked scenes may not be deleted in foreign rooms, only unlinked. According to further aspects of the embodiments, the linking of scenes can also be referred to as what scenes are visible, or "scene visibility." That is, when a user is looking at a GUI that includes a set of scenes, the GUI includes the set of scenes that are "visible" to the user.

As discussed above, clicking on Configure Lighting Scene button 1706 in Intermediate Scene Configuration Menu GUI 1700 brings the user to Lighting Scene Configuration GUI of FIG. 17. According to an aspect of the embodiments, control network 100 can include a feature in that all rooms, by default, include the following scenes: "All On" (Turns on all lights in the room to 100%); "All Off" (Turns off all lights in the room). According to aspects of the embodiments, default scenes cannot be renamed or deleted, but they may be modified.

Referring now to FIG. 18, a user can configure a lighting scene by performing the following steps. First, the user selects a room in Lighting Scene Room Selection window 1808. This is indicated by the italicized word "Parlour" and arrow A. The user clicks on "Parlour" and the Add button 1806 appears, and then, Selected Room Lighting Scene window 1810 is opened, and labelled "Parlour" and the user can create a scene. As shown in FIG. 18, the "All On" and "All Off" scenes are present, and the user has already created a new scene called "Good Morning." By clicking on Add button 1806, a "New Lighting Scene" is opened in the "Parlour" Selected Room Lighting Scene window 1810 (indicated by arrow B, and the italics); however, the user is not going to edit a new scene, but will instead edit the already established "Good Morning." scene. The user can edit and define the scene using Lighting Scene Inline Edit button 1812, Lighting Scene Configure button 1814, and Lighting Scene Delete button 1816.

In Selected Room Lighting Scene window 1810, a scrolling list is generated, and which shows the name of the scene as well as a subtext that indicates how many loads it affects. Subtext is the smaller font text that appears under a larger font text when the larger field the larger font text resides in within the GUI is "selected" by a mouse pointer, or press by a user in an interactive display. According to aspects of the embodiments, the selected scene can be renamed inline, configured, or deleted. If the scene is deleted, the Configuration App 506 prompts the user to verify deletion if loads are associated with the scene. According to aspects of the embodiments, pressing Lighting Scene Configure button 1814 can bring up the scene configuration overlay. In the scene configuration overlay, the overlay is broken down between room selection and scene configuration. Room selection configures which loads show up during the scene configuration, and by default only the containing room is selected. According to aspects of the embodiments, only one room can be selected by a user and configured at a time. A room is selected by the user, and the scenes housed in that room are shown. The user then selects a scene on which to perform actions. For example, by clicking/pressing on "Good Morning," the user is taken from Lighting Scene Configuration GUI 1800 to Good Morning Scene Configuration GUI 1900, as shown in FIG. 19.

Figure 19:
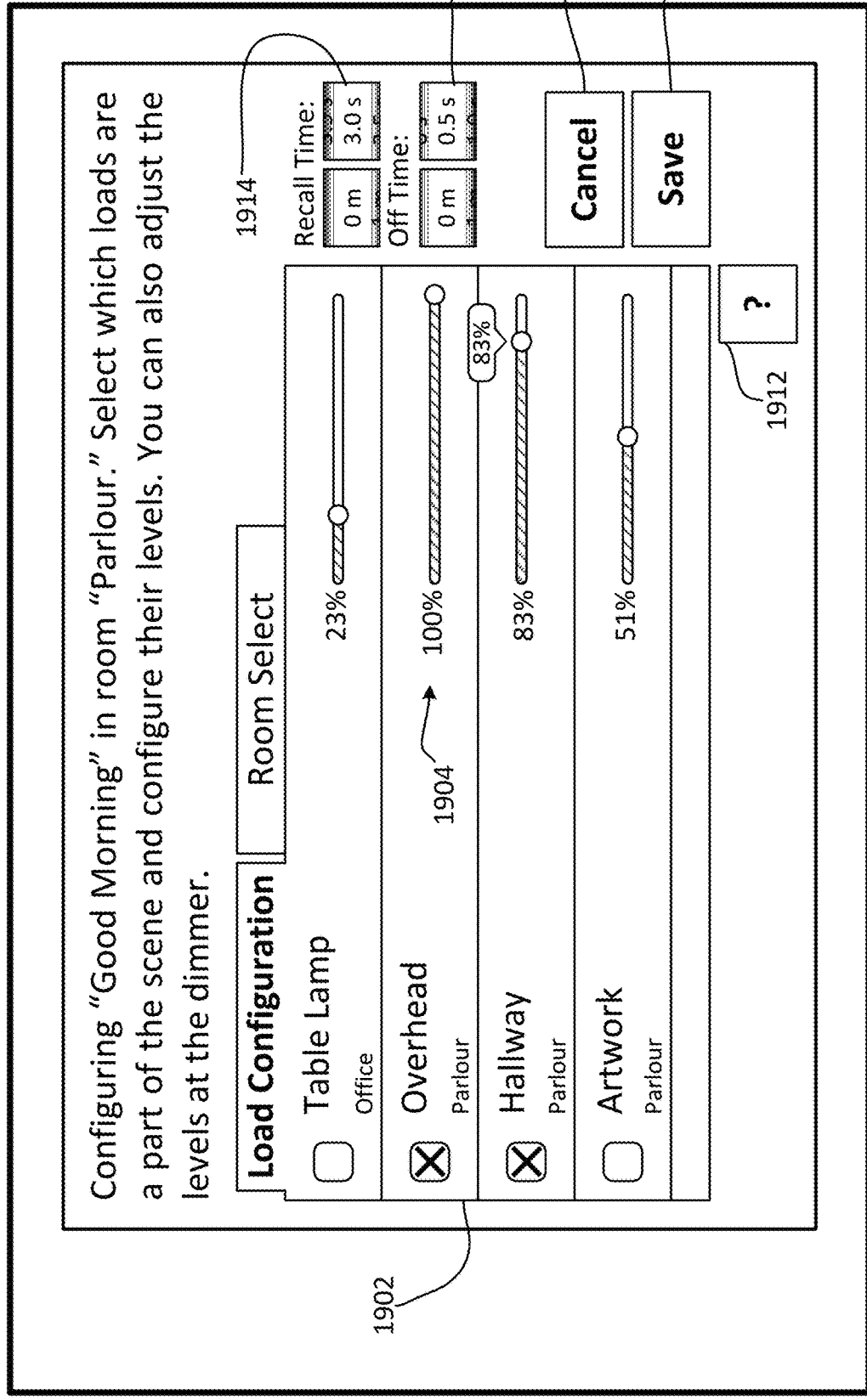
FIG. 19 illustrates a graphical user interface that can be used to configure automation rules and behaviors using the configuration application and other software and hardware components described above in regard to at least FIG. 6 according to aspects of the embodiments.

Referring now to FIG. 19, and GUI 1900, the scene configuration allows loads to be included in the scene via a checkbox to the left of the scrolling list, which shows the different loads available to that selected room (loads 1902). According to aspects of the embodiments, the scene configuration scrolling list includes the load name (Table Lamp, Overhead, among others) as well as the containing room. The containing room (in this case, "Parlour") can be displayed in more than one room's loads are present in the scrolling list. As shown in Good Morning Scene Configuration GUI 1900 in FIG. 19, all the levels can be edited via sliders 1904 shown to the right of the named load. The current level can be displayed as well. Also, part of Good Morning Scene Configuration GUI 1900 is Cancel button 1906, Save button 1908, and Information button 1912. Further, there is Recall Time Indicator field 1914, and Off Time Indicator field 1916. The latter two fields are described in greater detail below. An alternate embodiment of Good Morning Scene Configuration GUI 1900 is shown in FIG. 32 according to aspects of the embodiments.

According to aspects of the embodiment, the load levels are live, meaning that as the user changes the load level (e.g., from 25% to 80%), the brightness of the load will change, so that the user can see the effect of the change. According to further aspects of the embodiments, if loads are modified locally or by an existing scene, they shall change in the scene configuration screen. That is, if a user goes up to the load and manually changes the lighting intensity, it is reflected on the configuration screen of Good Morning Scene Configuration GUI 1900. As shown in FIG. 19, there are indicators to the left and right sides of the sliders that indicate full on, and full off. Loads that are not part of the scene can have their sliders "dimmed" to indicate that they are not being configured. Once configuration is complete, the user can press Lighting Configuration Save button 1908 to exit the overlay and add/configure more scenes. According to further aspects of the embodiments, all loads within the containing room can be selected to be a part of the scene.

Figure 32:
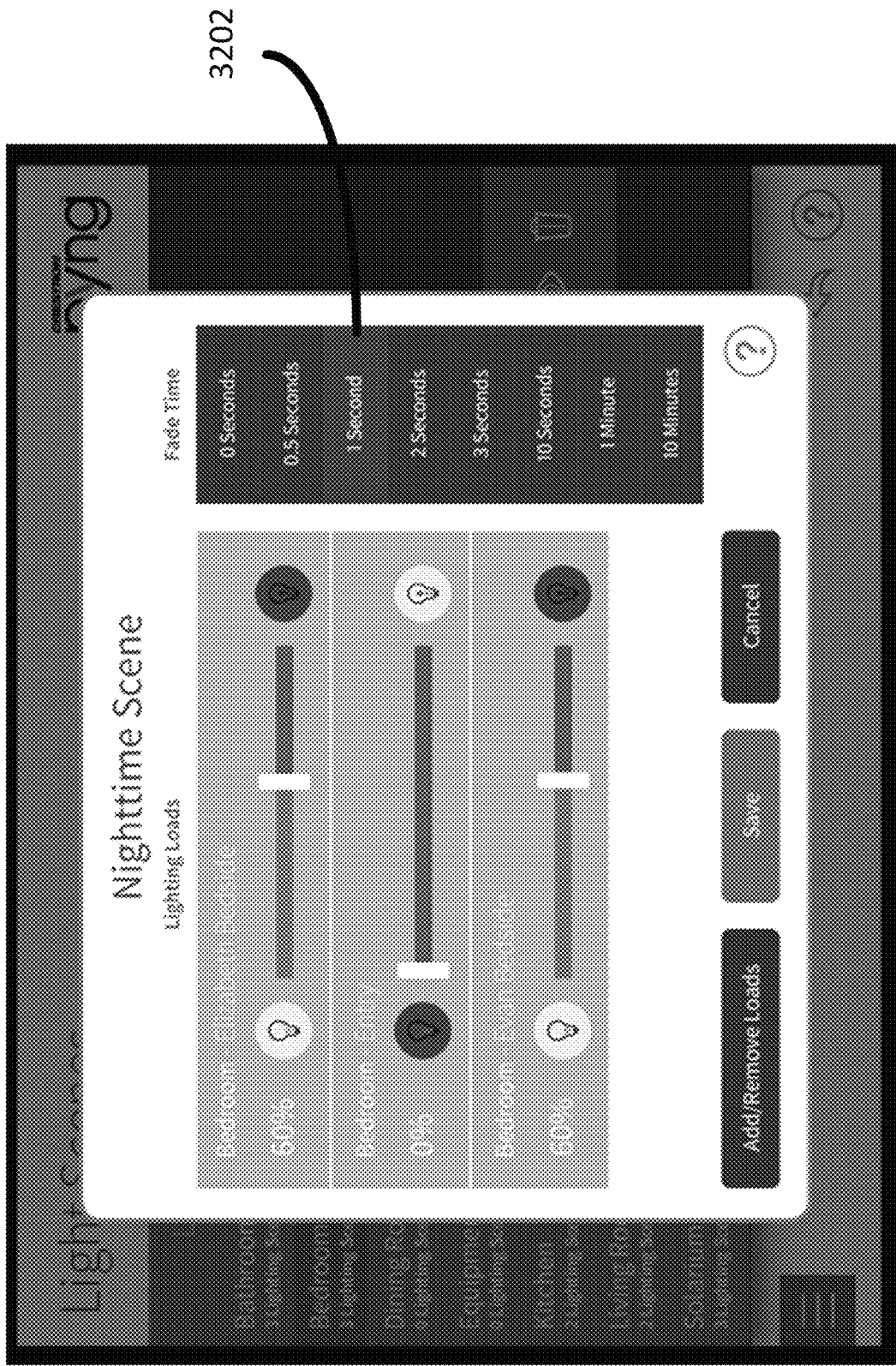
FIG. 32 illustrates an alternate embodiment of the graphical user interface of FIG. 19 according to an aspect of the embodiments.

As can be seen in FIGS. 19 and 32, there are some differences between the two. In the former, there are Recall Time Indicator field 1914 and Off Time Indicator field 1916; Recall Time Indicator field 1914 is a time it takes for the lights to turn off, and Off Time Indicator field 1916 is a fade time, or the time it takes for the lights to turn or fade-to-off.

In the latter Figure, there is Fade Time field 3202. The time shown in Fade Time field 3202 is the time that it will take to get the loads to the scene level. So, if the selected time is 10 minutes, when the user taps a button to recall that scene, it will take 10 minutes to get there via a slow fade according to aspects of the embodiments.

Following configuration of all lighting scenes (step 904) method 900 can proceed to step 906, to configure the shade scenes. As those of skill in the art can appreciate, setup and configuration of lighting and shade scenes can take place interchangeably; that is, shade scenes can be configured first, or second. According to further aspects of the embodiments, however, a difference between configuration of lights and shades is that the scene recall for shades does not have an associated recall time, as the shades operate at a substantially fixed speed. According to further aspects of the embodiments, however, the operating speed of shades can be made variable.

Following the saving of the setup of lighting scenes, the user is returned to Intermediate Scene Configuration Menu GUI 1700. From there, the user can select to configure shade scenes, by clicking/pressing Configure Shade Scenes button 1708 to configure shade scenes. Upon clicking or pressing Configure Shade Scenes button 1708, the user is presented with Shade Scene Configuration GUI (GUI) 2000 (this begins the process associated with method step 906).

Shading Scene Configuration GUI 2000 includes Shading Scene Room Selection window 2008, Add Scene button 2006, Selected Room Shading Scene window 2010, Information button 2002, Shading Scene Inline Editor tool 2012, Shading Scene Delete (Delete) button 2016, and Shading Scene Configure (Configure) button 2014.

Figure 20:
FIG. 20 illustrates a graphical user interface that can be used to configure automation rules and behaviors using the configuration application and other software and hardware components described above in regard to at least FIG. 6 according to aspects of the embodiments.

Referring now to FIG. 20, a user can configure a shading scene by performing the following steps. First, the user selects a room in Shade Scene Room Selection window 2008. This is indicated by the italicized word "Parlour" and arrow A. The user clicks on "Parlour" and then Add Scene button 2006 appears, and then, Selected Room Lighting Scene window 2010 is opened, and labelled "Parlour" and the user can create a scene. As shown in FIG. 20, the "Full Open" and "Full Closed" scenes are present, and the user has already created a new scene called "Good Morning." By clicking on Add Scene button 2006, a "New Shade Scene" field is opened in the "Parlour" Selected Room Shading Scene window 2010 (indicated by arrow B, and the italics); however, in this example, the user is not going to edit a new scene, but will instead edit the already established "Good Morning." scene. The user can edit and define the scene using Shading Scene Inline Editor tool 2012, Configure button 2014, and Delete button 2016.

Figure 21:
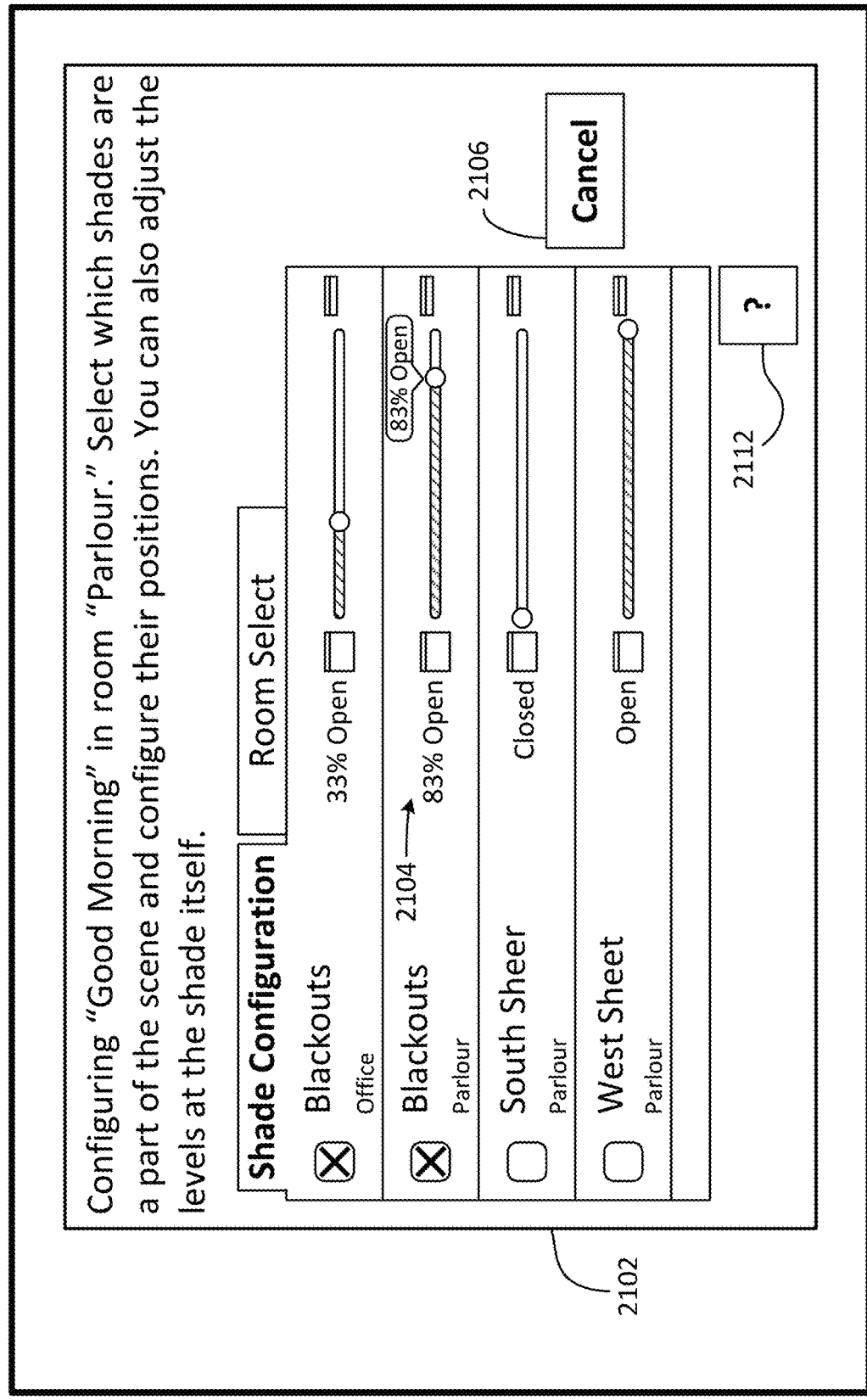
FIG. 21 illustrates a graphical user interface that can be used to configure automation rules and behaviors using the configuration application and other software and hardware components described above in regard to at least FIG. 6 according to aspects of the embodiments.

In Selected Room Shade Scene window 2010, a scrolling list is generated that shows the name of the scene as well as a subtext that indicates how many shades it affects. According to aspects of the embodiments, the selected scene can be renamed inline, configured, or deleted. If the scene is deleted, Configuration App 506 prompts the user to verify deletion if shades are associated with the scene. According to aspects of the embodiments, pressing Configure button 2014 can bring up the scene configuration overlay, which is shown in FIG. 21, as Good Morning Scene Configuration GUI 2100. In the scene configuration overlay, the overlay is broken down between room selection and scene configuration. Room selection configures which shade show up during the scene configuration, and by default only the containing room is selected. By way of a non-limiting example, if all the rooms are selected in the room selection, then all of the shades in the system are available for configuration within the scene. By clicking/pressing on "Good Morning," in FIG. 20, the user is taken from Shading Scene Configuration GUI 2000 to Good Morning Scene Configuration GUI 2100, as shown in FIG. 21. In addition, according to further aspects of the embodiments, all room by default can includes the shade scenes of "Open" (all shades are fully open) and "Closed" (all shades are fully closed). According to still further aspects of the embodiments, a default condition exists in which default scenes can be modified, but not renamed or deleted.

Referring now to FIG. 21, Good Morning Scene Configuration GUI 2100 allows shades to be included in the scene via a checkbox to the left of the scrolling list, which shows the different shades available to that selected room (Shade fields 2102). According to aspects of the embodiments, Shade field 2102 includes the shade name ("Blackouts," "South Sheer," among others) as well as the containing room. The containing room (in this case, "Parlour," can be displayed in more than one room's shades are present in the scrolling list. As shown in Good Morning Scene Configuration GUI 2100 in FIG. 21, all the positions can be edited via sliders 2104 shown to the right of the named shade. The current position can be displayed as well. Also, part of Good Morning Scene Configuration GUI 2100 are Cancel button 2106, and Information button 2112.

According to aspects of the embodiment, the shade levels are live, meaning that as the user changes the shade position (e.g., from 25% open to 80% open), the position of the shade will change, so that the user can see the effect of the change. According to further aspects of the embodiments, if the shades are modified locally or by an existing scene, they can also change in Good Morning Scene Configuration GUI 2100 (FIG. 2100). While most currently available shade systems do not include manual configuration, it is possible, according to further aspects of the embodiments, that is, if a user manually changes the shade position, it is reflected on the configuration screen of Good Morning Scene Configuration GUI 2100. As shown in FIG. 21, there are indicators to the left and right sides of the sliders that can indicate one or more of fully open, fully closed, percentage of open and percentage of closed. Shades that are not part of the scene can have their sliders "dimmed" to indicate that they are not being configured. According to further aspects of the embodiments, icons can be provided on either or both sides of the sliders that can be pressed to raise or lower the shade. Further still, there can be a drape icon in the event that the motor is a CSM-DRPEX, as manufactured by Crestron Electronics, Inc., of Rockleigh, NJ.

Once configuration is complete, the user can press a button to exit the overlay and add/configure more scenes. According to further aspects of the embodiments, all shades within the containing room can be selected to be a part of the scene.

Following configuration of all shading scenes (step 906) method 900 is completed. Following the saving of the setup of shading scenes, the user is returned to Intermediate Scene Configuration Menu GUI 1700. From there, the user can select Scene Configuration Back button 1704 to return to Control System Configuration GUI 1200. As those of skill in the art can appreciate, and as discussed above, the user can choose to configure shades first, and then lighting; in which case, upon returning to Intermediate Scene Configuration Menu GUI 1700, the user press or click Configure Lighting Scene button 1706, and proceed to GUIs 1800 and 1900, as described above, and configure the lighting scenes. Then, upon returning to Intermediate Scene Configuration Menu GUI 1700, the user can select to configure shade scenes, by clicking/pressing Configure Shade Scene button 1708 to configure shade scenes. Upon clicking or pressing Configure Shade Scene button 1708, the user is presented with Shading Scene Configuration GUI 2000 (this begins the process associated with method step 906).

Following completion of either or both of shades and lighting configuration, method step 606, method 600 proceeds to method step 608, wherein automated tasks can be setup. In this case, the user can press/click Configure Automation Rules and Behaviors button (button) 1210, and this brings the user to Control Network Automation GUI (Automation GUI) 2200.

Figure 22:
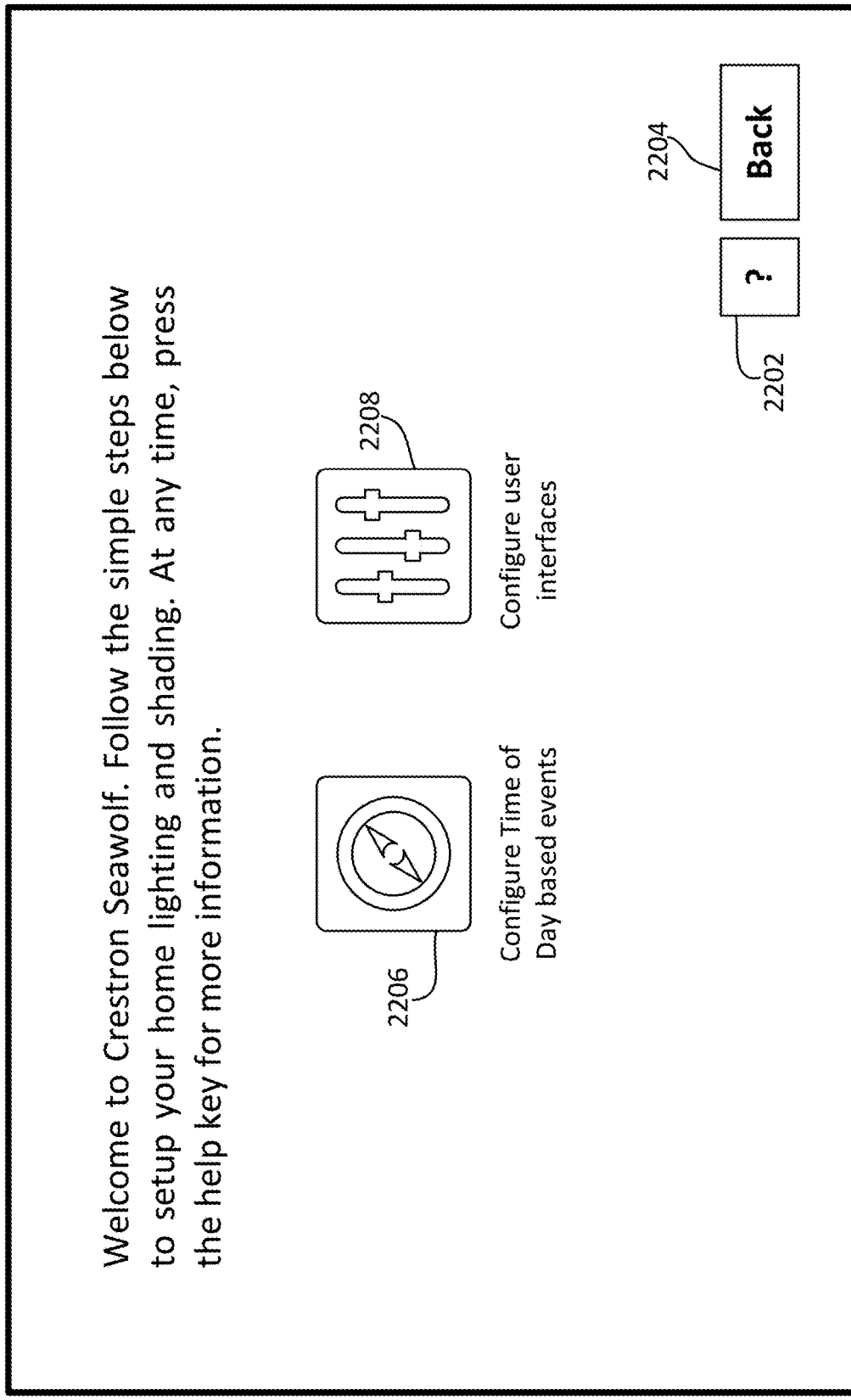
FIG. 22 illustrates a graphical user interface that can be used to configure automation rules and behaviors using the configuration application and other software and hardware components described above in regard to at least FIG. 6 according to aspects of the embodiments.

Automation GUI 2200 is shown in FIG. 22, to which attention is now directed. In FIG. 22, Automation GUI 2200 includes Information button 2202, Back button 2204, Configure Time of Day (TOD) Based Events (Configure TOD Events) button 2206, and Configure User Interface button 2208.

Figure 33:
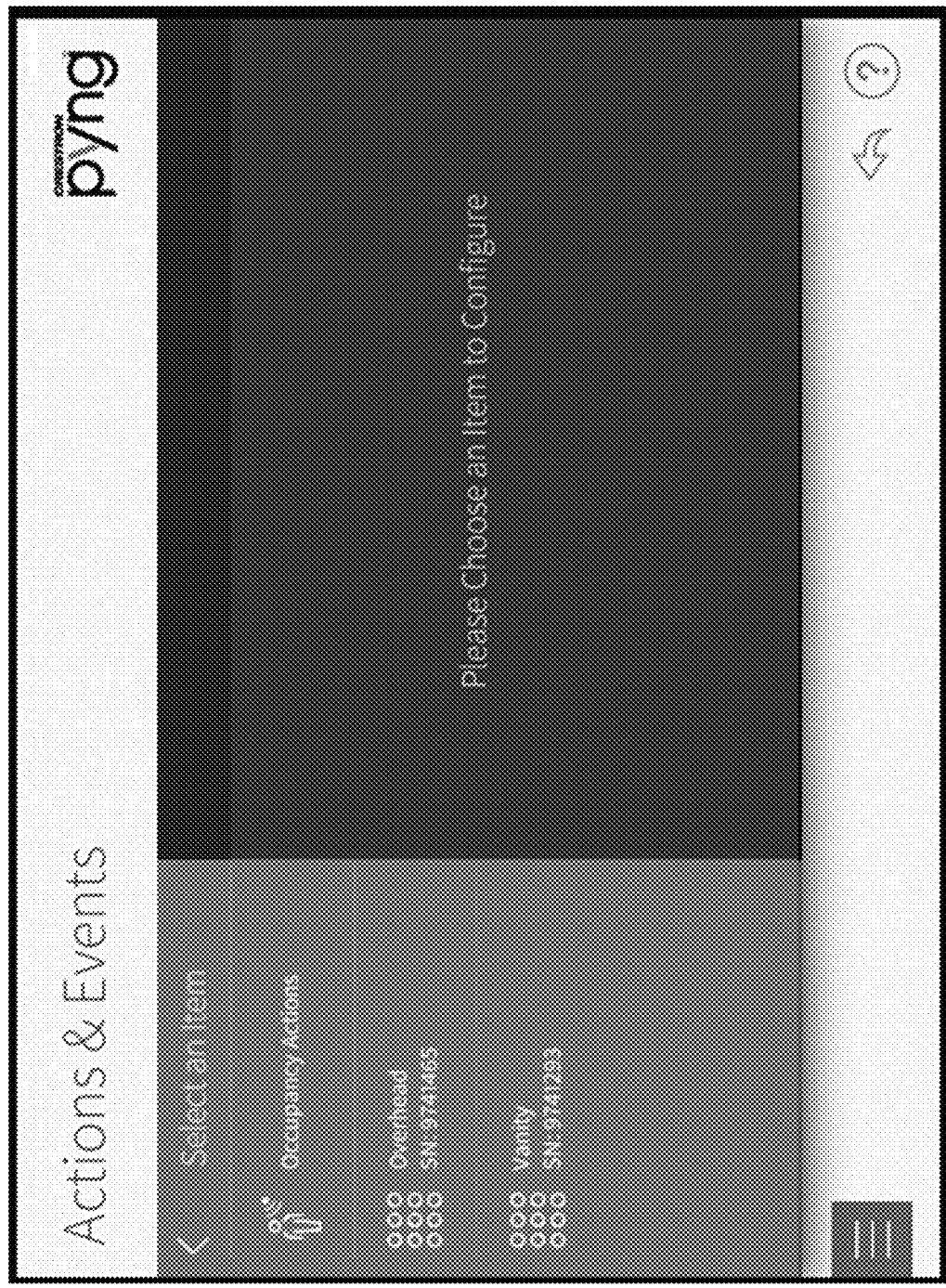
FIG. 33 illustrates a macro definition screen graphical user interface according to an aspect of the embodiments.

As shown in Automation GUI 2200, there are two options with regard to automation: the first is scheduled automation, using Configure TOD Events button 2206, and the second is configuration of the user interfaces, using Configure User Interface button 2208. According to further aspects of the embodiments, sensors can also be configured, as well as macros that define events that touch multiple subsystems. Some macros are shown in FIG. 33, which illustrates Macro Definition Screen GUI 3300. According to aspects of the embodiments, a macro is a conglomeration of scenes; a macro could, for example, turn off the lights, lower the shades, adjust the climate set points, and turn on the music to Pandora. Macros show up by name in the user interfaces. Similarly, sensors show up in the "user interfaces" section. Regardless of how many occupancy sensors there might be in a room, all that can be seen is "Occupancy actions."

Figure 23:
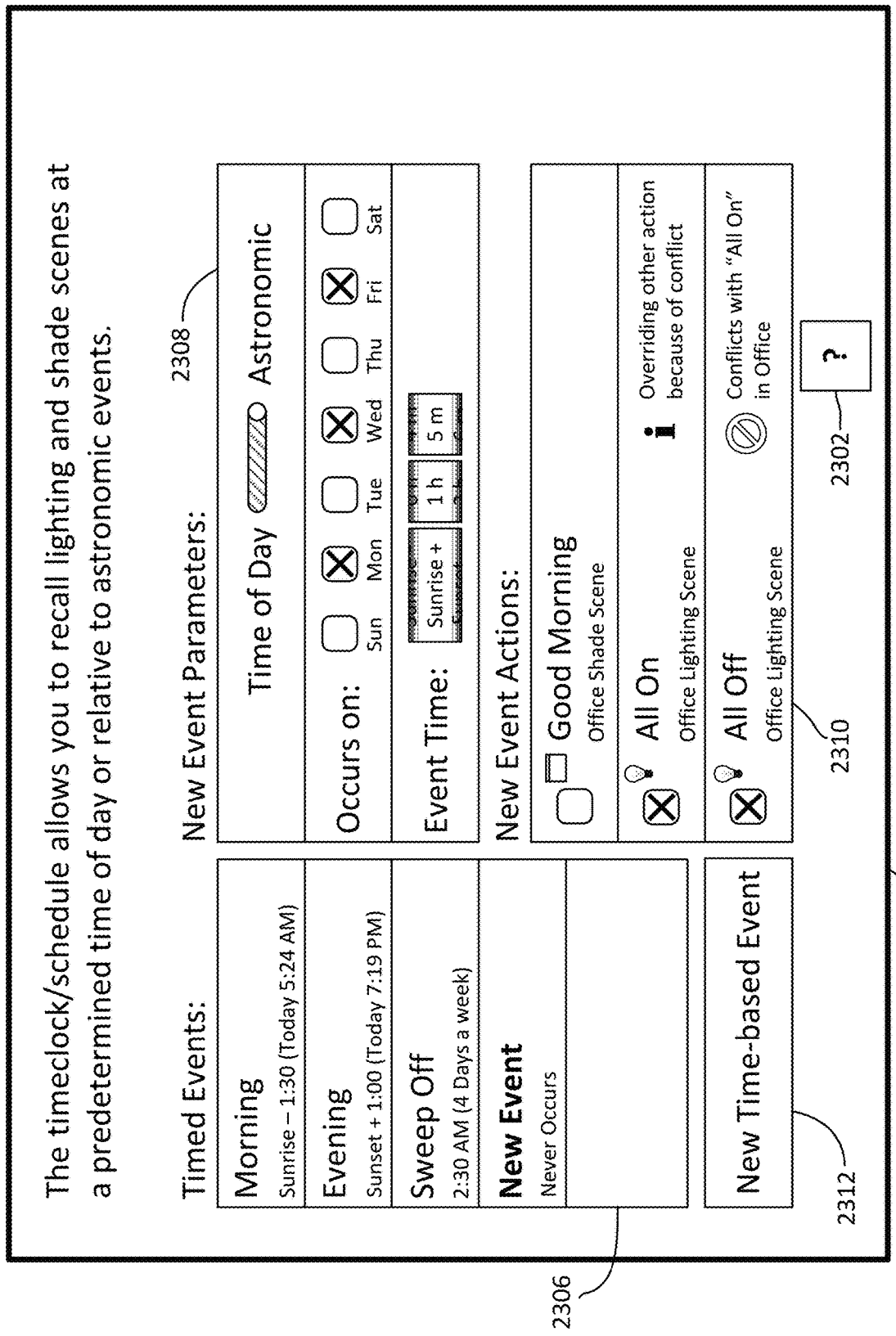
FIG. 23 illustrates a time clock-schedule graphical user interface according to aspects of the embodiments.

Referring back to FIG. 22, pressing or clicking on Configure TOD Events button 2206 opens up Time Clock-Schedule GUI 2300 as shown in FIG. 23; Time Clock-Schedule GUI 2300 includes Information button 2302, Done button 2304, Timed Events field 2306, New Events Parameter field 2308, New Event Actions field 2310, and New Time Based Event field 2312. Time Clock-Schedule GUI 2300 allows the user to configure the recalling of scenes (both lighting and shading) based on the time of day. According to aspects of the embodiments, the time setting can be configured as an on-the-clock time of day, or as a time relative to sunrise/sunset. Further, events can be configured to occur on specific days of the week.

Figure 51:
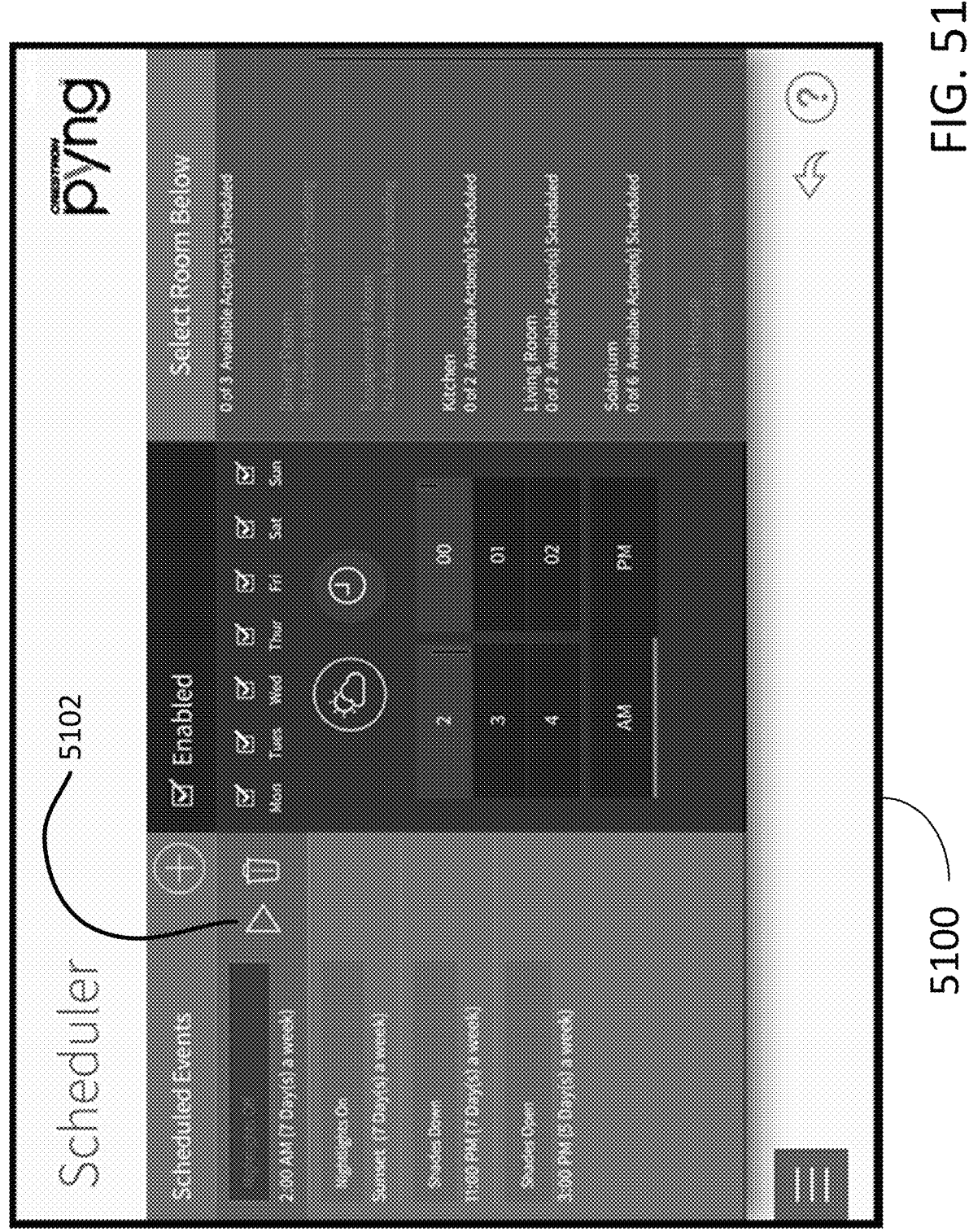
FIG. 51 illustrates an alternate version of a time clock-schedule graphical user interface substantially similar to that as shown in FIG. 23 according to aspects of the embodiments.

As can be seen in FIG. 23, Time Clock-Schedule GUI 2300 has 3 main areas associated with the configuration: timed events list (Time Events field 2306), the new event parameters pane (New Events Parameter field 2308), and the new event actions list (New Event Actions field 2310). Each of the three main areas will be discussed in turn. In FIG. 51, which illustrates an alternate version of Time Clock-Schedule GUI 2300 substantially similar to that as shown in FIG. 23 according to aspects of the embodiments, there are three columns, that contain substantially similar information, albeit arranged in a somewhat different manner.

The timed events list shows all the timed events in control network 100 according to aspects of the embodiments. The timed events list allows the user to configure the recalling of scenes (including lighting, shading, audio/video, and climate events, among others) based on the time of day. These events can be configured as an on-the-clock time of day, or as a time relative to sunrise/sunset, and in addition events can be configured to occur on specific days of the week. Events can also be enabled/disabled via Scheduler GUI 5100, shown in FIG. 51. This exists so that if the user wants certain things to happen during a certain time of the year (for example, Christmas), the user can have those events setup, but they do not need to be disabled when they are no longer required. According to aspects of the embodiments, this is advantageous in that the user does not need to recreate identical events the next time they are needed.

New events can be added by pressing/clicking on New Events Parameter field 2308. Clicking on an event in Timed Events field 2306 brings up the relevant parameters in New Event Parameter field 2308. In addition, as with other GUIs described above, clicking on an event name can also cause the inline rename and delete buttons to be added to the list item, although this is not shown in FIG. 23. The list can be ordered by event name, or, as those of skill in the art can appreciate other criteria can be used to order the list. In addition, subtext can be added that indicates the type/time of the event.

Referring now to New Events Parameter field 2308, a user can use this field to configure whether the event is time-of-day based ("Time of Day"), or based on the sunrise/sunset ("Astronomic") using the sliding button shown at the top of field 2308. In addition, the user can configure on which days the event occurs.

In New Event Actions field 2310, the user can specify which actions will occur when the timed event triggers. According to aspects of the embodiments, this is a freeform list of all lighting and shading scenes present in control system 100. According to an aspect, the list can be ordered alphabetically by room, sub-ordered by lighting scenes and shade scenes, and then again alphabetically by scene name. By way of example only, the global scenes can be presented to appear first (as shown in FIG. 23, there is the global scenes of "Good Morning," "All On," and "All Off.") In addition, icons can augment the scene names to more quickly identify which type of scene is being recalled. Scenes selected in the list can be recalled from bottom to top. According to still further aspects, if two scenes are selected that control the same loads or shades, the system can flag the conflict and allow the user to resolve it. If the conflict is unresolved, the topmost scene that controls the light/shade will take precedence upon recall. When the user is satisfied with the creation and definition of the events and scene selection, including times, Done button 2304 can be clicked/pressed, and control reverts back to Automation GUI 2200 according to aspects the embodiments.

According to still further aspects of the embodiments, use of Scheduler GUI 5100 includes the use of Play button 5102, which enables the user to test the scene live.

When the user returns to (or first/initially encounters) Automation GUI 2200, the Configure User Interfaces button 2208 can be selected, and this then causes Configure User Interfaces GUI 2400 to open. Configure User Interfaces GUI 2400 includes Information button 2402, Done button 2404, Room Select field 2406, Selected Room User Interfaces field 2408, and Configure button 2410.

In Configure User Interfaces GUI 2400, users can select particular user interfaces and modify them, to some extent, to personalize preferences and operating methodology, according to aspects of the embodiments. However, prior to discussing FIG. 24 and Configure User Interfaces GUI 2400 in detail, several concepts will be addressed first that pertain to configuration of the user interfaces.

As those of skill in the art can appreciate, user interfaces, broadly referred to as "control point 106" in FIG. 1, are the points that the user can use to interface with the various controllable devices. According to aspects of the embodiments, user interfaces 106 can also be programmed, to some extent, so that the user has a more personalized interface, but also one that can be easier to operate than conventional controllable device interfaces because key user operating points and other features can be programmed into the user interface.

Programming of the user interface includes several overarching concepts, each of which are addressed in turn. According to aspects of the embodiments, control network 100 and Configuration App 506 supports a fixed number of button models, and in each model, support is provided for a limited set of actions and/or feedback (in this case, the terms are interchangeable), which include: scene, rooms, load, master raise/lower, external functions, engraving, and remote mode. Each will be described in turn.

The first action/feedback to be described is "scene." According to aspects of the embodiments, a scene is intended to recall lighting and/or shade scenes, and corresponds to a single action (Always Recalls Only). According to aspects of the embodiments, this means that there is no state stored in the button model. That is, each button corresponds to one action, and one action only. According to further aspects of the embodiments, a different configuration of the buttons could include that a second press of the button turns the lights off, after the first press turns them on. The single action/recall-only configuration of the button means that every time you press the button, no matter the current state of the system, the result is that the loads are at the scene level as previously defined. When a user holds the button on configured user interface 106, nothing shall occur, but when a double tap (within a predetermined time period) occurs, a substantially immediate jump can occur to the scene level/position as programmed to the user interface button. According to further aspects of the embodiments, feedback is on if all loads/shades are exactly at their scene level/position, and feedback can blink while any loads are fading, or any shades are blinking on their way to the scene level/position. According to aspects of the embodiments, feedback information can be shown on a display (an LED, in some cases) of the keypad associated with the button. According to further aspects of the embodiments, while feedback is a property of the action, e.g., feedback can be listed for a scene button, there can be some keypads that do not have any location to display feedback, and in those cases the feedback is ignored.

The second action/feedback to be described is "room." According to aspects of the embodiments, the room action/feedback controls all of the shades and/or lights in one or more rooms. According to further aspects of the embodiments, only lights can be controlled, and not shades, or only shades can be controlled, and not lights. However, according to further aspects of the embodiments, both lights and shades can be controlled in the room action/feedback.

According to aspects of the embodiments, a toggle action can turn on the lights to 100%, or turns off the lights, depending on the feedback status. For shades, a toggle action can move the shades to full open, or full closes, or can be programmed to cause different operations. Double tapping a button can cause the lights to go full on, and in shades will do nothing; however, as those of skill in the art can appreciate, these programming features can be changed so that a double tap can force shades to fully open, and have no effect on lights; other scenarios are also possible according to further aspects of the embodiments. According to aspects of the embodiments, feedback is on if any load or any shade is open, regardless of the level of on or open. Further, the provided feedback can blink while any lights are fading, or any shades are blinking on the way to their intended position.

The third action/feedback to be described is "load" (load can refer to either or both of lights and shades). According to aspects of the embodiments, the load action/feedback is intended to control a single load in a room. For example, therefore, the load can refer to control of either lights or shades, but not both. According to further aspects of the embodiments, however, such mixed devices can be included the load action/feedback.

According to aspects of the embodiments, a toggle action turns a light on to 100%, or turns the light off, depending on the feedback state. According to further aspects of the embodiments, a toggle action can move shades to (full or partially) open or to closed, depending on feedback state. A double tap can force lights to full on, but for shades, will do nothing. According to further aspects of the embodiments, a double tap can be reconfigured to indicate that shades become fully open, and that no action occurs for lights. Further still, feedback is on if all loads are on, or all shades are open to any position. In addition, feedback can blink while any lights are fading, or any shades are moving on their way to the intended or targeted position.

Attention is directed to FIG. 51, which illustrates Scheduler GUI 5100 according to an aspect of the embodiments. Scheduler GUI 5100 provides the user with load buttons that have a particular directional aspect. That is, a load button can therefore be configure such that a load button can always only turn the load on, or it can always only turn the load off. In addition, Scheduler GUI 5100 provides for timeouts to be associated with the button; in this mode, the loads associated with the button will turn on with a button press, but will turn off automatically after the timeout. According to aspects of the embodiments, this is particularly useful in closets/pantries.

The fourth action/feedback to be described is "master raise/lower." According to aspects of the embodiments, master raise/lower refers to control of a collection of either lights or shades, but not both, within one room. According to further aspects of the embodiments, master raise/lower can refer to control of both lights and shades within a room, or can apply to more than one room, in any combination of applying to lights and/or shades. The lights or shades are configured by selecting from a list of room lights/shades. Feedback indicators can blink while the lights are fading, or shades are traveling.

The fifth action/feedback to be described is "external function," but this is not shown as an option in any of the GUIs pictured in any of the Figures. According to aspects of the embodiments, an external function can control custom functionality using a foreign program, such as, by way of non-limiting example, the "Custom Function" SIMPL module, as manufactured by Crestron Electronics Inc., of Rockleigh, NJ.

According to aspects of the embodiments, the external functions can be assigned to a selectable list of numbers from 1-99 to indicate the function. Other amounts can also be used. Further, the external function action/feedback provides a free-form notes field to indicate notes about the button's purpose. Feedback can be driven by way of the input state of the SIMPL module. The output of the SIMPL module can be high (i.e., a logic level "1") when the button is pressed and low (i.e., a logic level "0") when the button is idle. Further still, custom functions can be shared across the program. For example, a custom function assigned to number 1 can always trigger the same action no matter which keypad it is pressed from. In addition, all feedbacks can be linked. According to further aspects of the embodiments, an application included in control processor 116 (e.g., SIMPL App), responds, in a sub-routine-like fashion, to the output of the SIMPL module logic signal to perform a further action. The button that is assigned the external function will look at the feedback for the condition of its LED.

Figure 52:
FIG. 52 illustrates an alternate version of graphical user interface 2400 of FIG. 24 according to an aspect of the embodiments.

The sixth action/feedback to be described is "engraving." According to aspects of the embodiments, engravings can be populated automatically. However, engravings are editable, so that a user can personalize them. According to aspects of the embodiments, changing the engraving in Configuration App 506 using Configure User Interfaces GUI 2400/5200 (GUI 5200 is shown in FIG. 52) modifies the picture of the device, which is then sent to Crestron Electronics, Inc., and engraving can be performed engrave on real buttons and sent to the user.

Engravings apply to each of scenes, rooms, master raise/lower and external functions. For scenes, an engraving can have the scene name stripped of "filler" words. If multiple scenes are being recalled, the one that affects the most loads or shades will be the name that is used, and takes precedence over the other engravings. In regard to the master raise/lower action/feedback, if master raise/lower is being used on a split button, the up and down arrow can be populated. In addition, if the master raise/lower is being used on a large button, the words "raise" or "lower" can be used. In regard to the external function action/feedback, an engraving can take "FCN #" as the name, where "#" corresponds to the number of the external function.

The seventh action/feedback to be described is "remote mode." According to aspects of the embodiments, when a dimmer is being configured, it can be put into the remote mode, which will use the same programming style as a keypad. Further, dimmers that can be programmed as keypads will show up in the user interface configuration view. Further, because loads are named, but not dimmers/switches, the word "dimmer" or "switch" can be appended to the end of the load name when being displayed in the user interface configuration view. According to further aspects of the embodiments, the words dimmer or switch do not need to be added to the load name, as the names are not tied to the function of the button. The name is simply what the user wants to call the button. Devices that have multiple outputs can use the "first" load as the name. According to further aspects of the embodiments, however, if the first load is unassigned, the second load name can be used. Alternatively, if no loads have been named, the model number shall be used.

Figure 24:
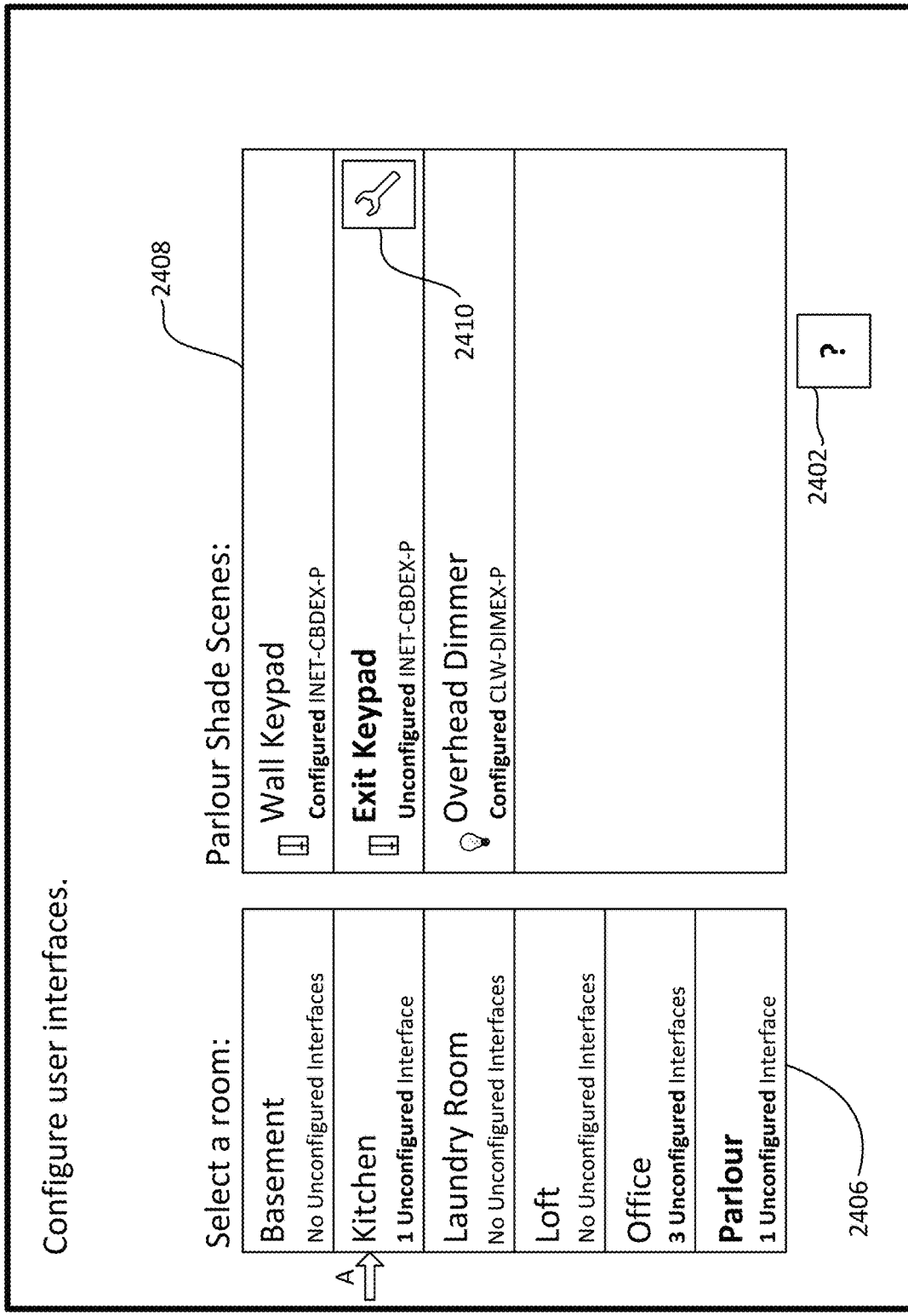
FIG. 24 illustrates a configure user interfaces graphical user interface according to aspects of the embodiments.

Attention is now directed towards FIG. 24, wherein Configure User Interfaces GUI 2400 is shown. As can be seen in Configure User Interfaces GUI 2400, there are two main parts to the interface: Room Select field 2406 and Selected Room User Interface field 2408. In addition, there is Information button 2402, Done button 2404, and Configure button 2410. In regard to both Information button 2402 and Done button 2404, these comprise functions substantially similar to those of other information and done buttons previously discussed above. Configure button 2410 is described in greater detail below. Further, there is also available an inline edit button and delete button, both of which comprise substantially similar functions as similarly named buttons described above (but which are not shown in FIG. 24).

According to aspects of the embodiments, Room Select field 2406 shows a list of rooms, sorted alphabetically by name. If there are any unconfigured interface devices within the room, this is shown by the "subtext," (or smaller type font) listed below each room's name. According to aspects of the embodiments, what is shown is how many customizable items there are in total, rather than how many have been done. This a function of the order of operations; substantially all or all dimmers can appear configured at the start because they do not enter into remote mode until after they have been given an explicit action.

For example, in FIG. 24, arrow A indicates subtext for the kitchen room as there being one unconfigured interface device. According to aspects of the embodiments, dimmers in local mode can be considered as configured, while dimmers in remote mode with no buttons can be considered to be "unconfigured." In addition, user interface devices with one or more buttons configured are considered to be configured. When a user selects a room, such as, for example, the parlour room, all user interfaces for that room are shown in Selected Room User Interfaces field 2408.

In Selected Room User Interfaces field 2408 there is shown a list of interface devices for the selected room(s), along with their "configured" status—i.e., whether they are presently configured, or unconfigured. According to further aspects of the embodiments, the model number for each interface device can be provided as well. When a user selects an interface device for configuration, options for configuring the buttons of the interface device or deleting previously provided interface device programming appear over the list item. The latter would be provided for by selecting none, the former by Configure button 2410. In case of the latter, programming a new configuration, when Configure button 2410 is pressed or clicked, the user is taken to FIG. 25, and Configuration Overlay GUI 2500; note that the user is shown, or taken to, in FIG. 25, the particular Configure Selected Device field 2508 for the device that is selected (or for which Configure button 2410 is pressed in relation too), in FIG. 24, Room Select field 2401). As those of skill in the art can appreciate, there can be numerous variations of Configuration Overlay GUI 2500 depending on the type of user interface. However, for purposes of this discussion, the following example provides sufficient detail to enable understanding of the aspects of the embodiments.

Figure 25:
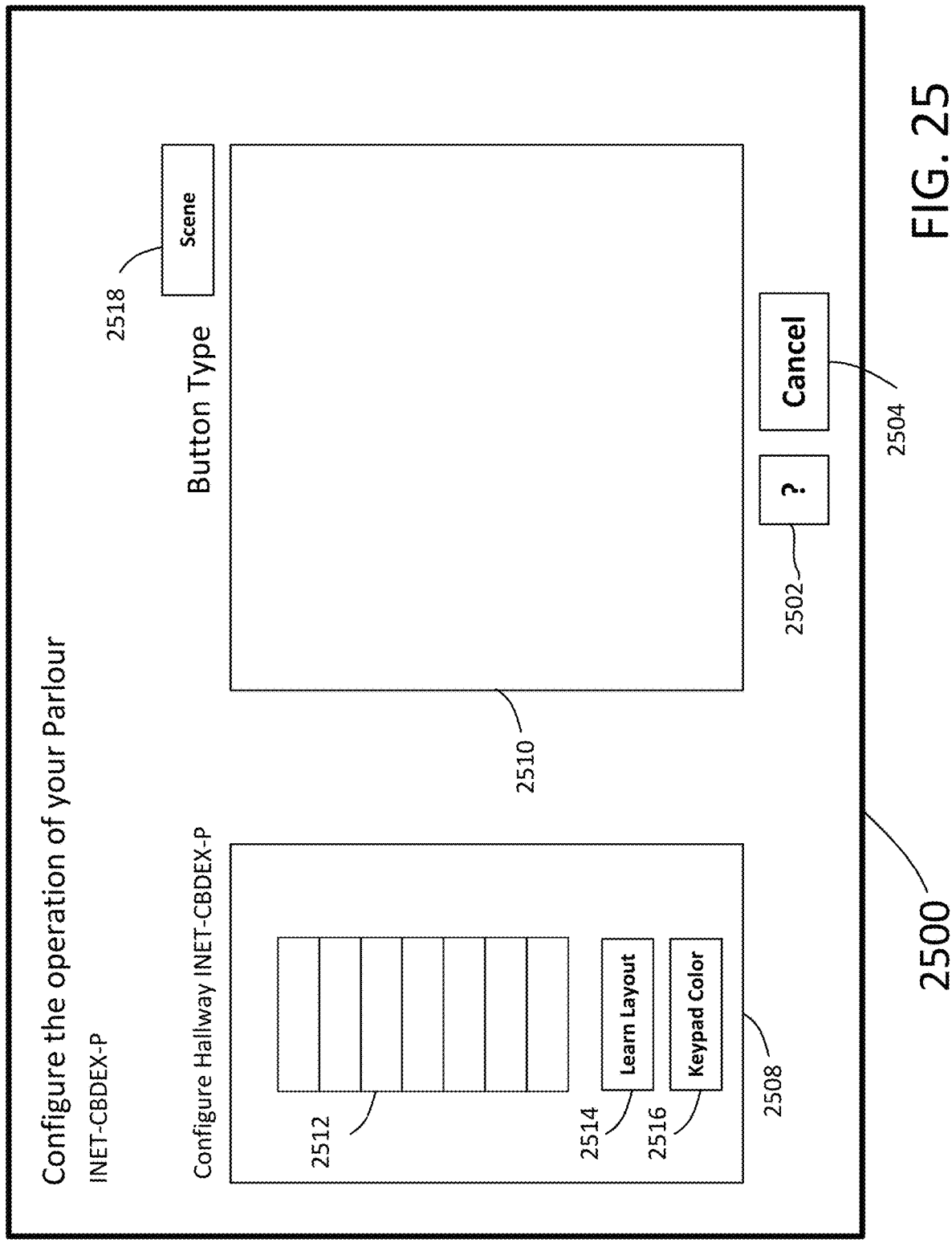
FIG. 25 illustrates a configuration overlay graphical user interface according to aspects of the embodiments.

Configuration Overlay GUI 2500, shown in FIG. 25, includes the following components: Information button 2502, Cancel button 2504, Save button 2506 (each of buttons 2502, 2504, and 2506 perform substantially similar functions to other similarly identified buttons, and therefore, in fulfillment of the dual purposes of clarity and brevity, a detailed description of each of their functions in regard to Configuration Overly GUI 2500 has been omitted from herein), Configure Selected Device field 2508, Selected Device Button Definition field 2510, Button Display image 2512, Learn Layout button 2514, Keypad Color Designation (Pallet) button 2516, and Button Definition field 2518.

Referring now to FIG. 25, and Configuration Overlay GUI 2500, Configuration App 506 needs to know which set of buttons are installed on an interface device in order to provide for programming thereof. According to aspects of the embodiments, this information can be ascertained in at least one of two methods. The first pertains to interface devices that know their button layout; examples of such interface devices include in-wall dimmers, such as those manufactured by Crestron Electronics, Inc., of Rockleigh, NJ, and have a part number that begins with "CLW," for example. Accordingly, aspects of the embodiments provide that such interface devices can display their current button configuration and instruct, textually, users on how to change it.

Figure 26:
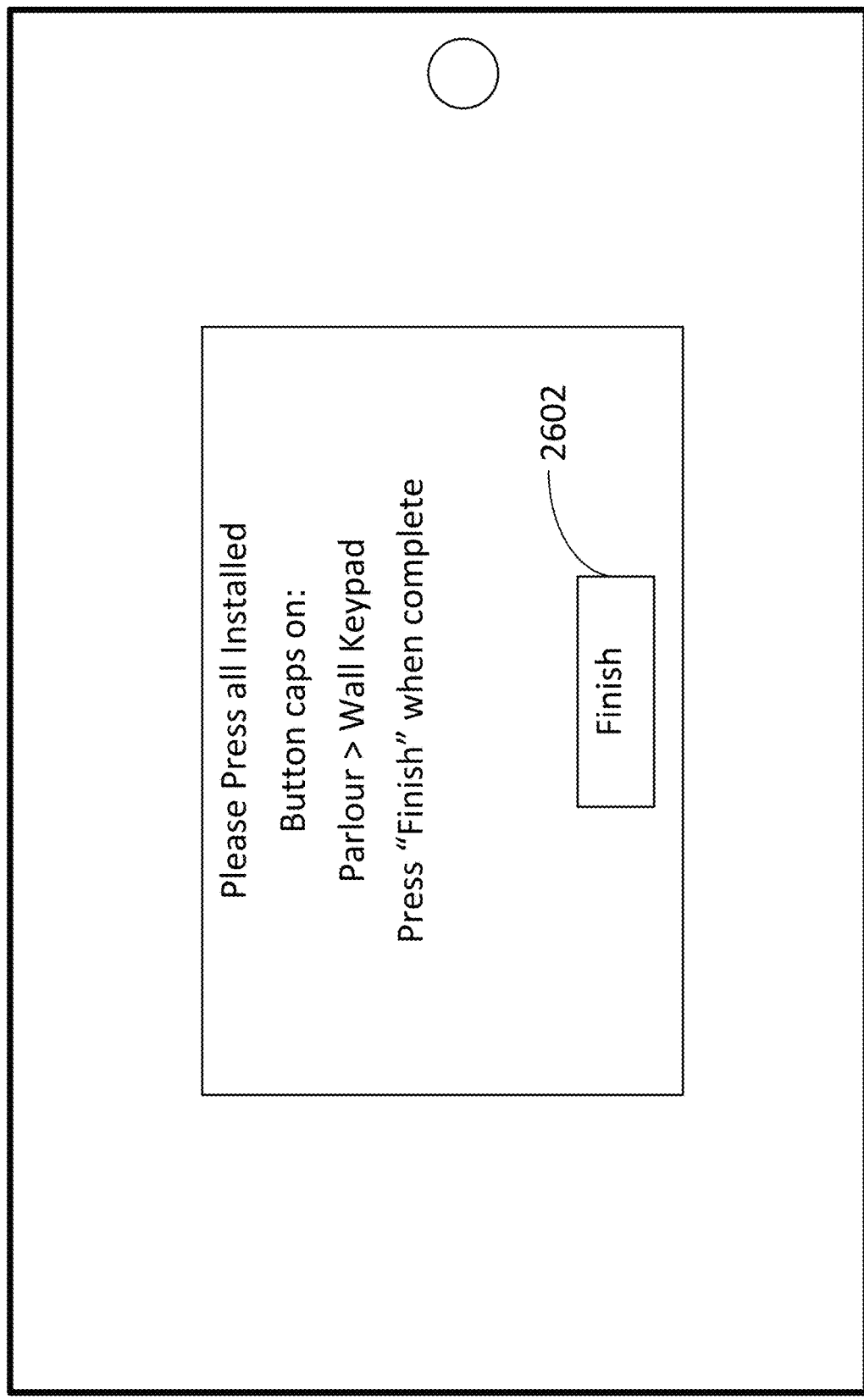
FIG. 26 illustrates a press installed button instruction graphical user interface according to aspects of the embodiments.

For interface devices that do not know their button layout, such as the INET-CBDEX-* products, aspects of the embodiments will provide that all buttons are present and provide a "learn layout" button on the screen. According to aspects of the embodiments, the user can press Learn Layout button 2514 that is located within Configure Selected Device field 2508, which drives Configuration App 506 to present Button Display image 2512, which is a generic display of buttons that the user can use to "teach" Configuration App 506 about the button layout of the interface device in question. Once Button Display Image 2512 is displayed, LEDs will flash that correspond to each of the presented buttons. The user is then prompted to press all of the installed buttons on the interface device (see, FIG. 26, and Press Installed Button Instruction GUI 2600 which appears momentarily after Button Display image 2512 appears; the user then presses Finish button 2602 to close Press Installed Button Instruction GUI 2600 and signals Configuration App 506 to save the layout). As each button is physically pressed, the previously flashing LED will change to constantly on. If all buttons are pressed, the "learn layout mode" will exit. According to further aspects of the embodiments, while the device is in "learn layout" mode, a popup will be presented on the user interface that allows for instructional text and an "exit" button. Tapping Save button 2506 will save the configuration of the user interface and exit the overlay. Clicking cancel button 2504 will restore the user interface (and button layout) to what it was when the overlay was entered, and will cause the overlay to be exited.

Figure 27:
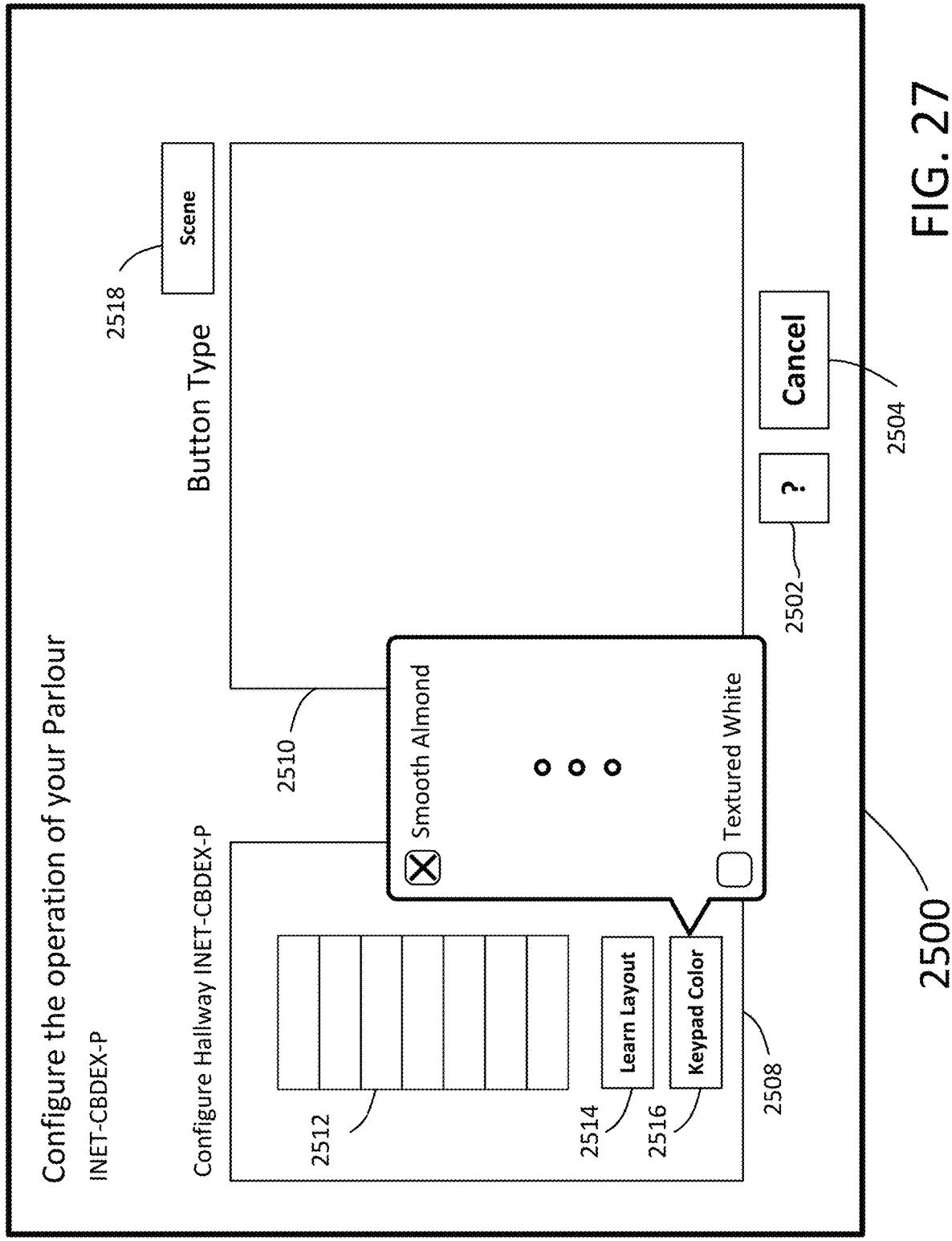
FIG. 27 illustrates a color pallet graphical user interface according to aspects of the embodiments.

Also shown in Configuration Overlay GUI 2500 is Pallet button 2516. Clicking Pallet button 2516 will reveal a pop-out of all available colors for the particular interface device (see, FIG. 27, and Color Pallet GUI 2700). Clicking on one of the colors will change the color of the device (and all button caps on the screen). Clicking anywhere other than the pop-out will close the pop-out without changing the keypad color.

Also shown in FIG. 25, and Configuration Overlay GUI 2500 is Button Definition field 2518. Use of Button Definition field 2518 provides the user and Configuration App 506 with the ability to use the same conflict detection and resolution model as used by the timed event configuration process. According to further aspects of the embodiments, currently available alternative embodiments of Configuration Overlay GUI 2500 do not include Button Definition field 2518, but do include its functionality, which is to select the function of the button, such as scene, lighting load, master raise/lower, among others.

Figure 34:
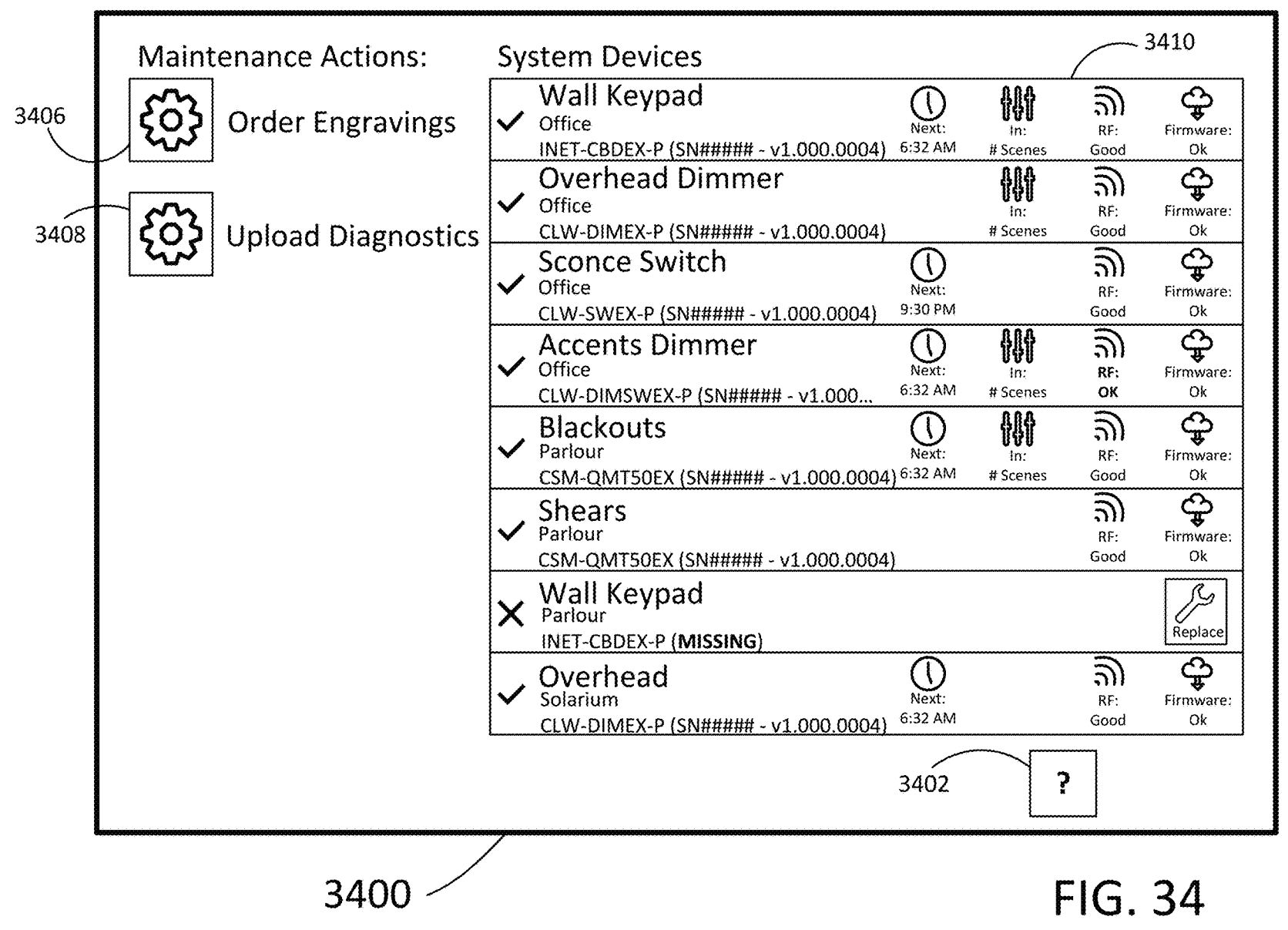

Attention is now directed towards FIG. 34, and Maintenance Mode GUI 3400. Maintenance Mode GUI 3400 can be obtained by pressing/clicking on Maintenance Mode button 1212, as seen in FIG. 12, and control system configuration GUI 1200. Maintenance Mode GUI 3400 includes Information button 3402, Done button 3404, Order Engravings button 3406, Upload Diagnostics button 3408, and System\Devices field 3410. Discussion of Information button 3402, and Done button 3404 has been omitted in fulfillment of the dual purposes of clarity and brevity, as these buttons incorporate substantially similar functions as similarly named buttons already described above.

According to aspects of the embodiments, Maintenance Mode GUI 3400 is not intended for normal use, but rather will be helpful when control network 100 is not performing in an expected way. Pressing or clicking on Order Engravings button 3406 causes a plain text file to be sent to Creston order processing, via email. According to further aspects of the embodiments, the text files can be formatted in such a way that can be translated by a Crestron engraver, and wherein the text file can be tagged with information pertaining to the dealer that sold portions or all of control network 100 and information pertaining to the job itself.

In regard to the diagnostics components of Maintenance Mode GUI 3400, a user can invoke diagnostics by clicking or pressing on Upload Diagnostics button 3408. Upon doing so, Configuration App 506 creates and sends an email that includes a status of control network 100 to Crestron Electronics, Inc., of Rockleigh, NJ, tagged with the media access control (MAC) address of control network 100, as well as a randomly generated key. In addition, configuration information can also be sent in the status email. According to aspects of the embodiments, Configuration App 506 can record all button presses and time clock events in control network 100, including local actions from one or more types of dimmers and switches. Such information is maintained for a predetermined period of time. According to aspects of the embodiments, such period of time can be about two weeks, although longer and shorter periods of time can also be used. According to still further aspects of the embodiments, substantially everything the system does, or actions performed, are recorded. For example, if control network 100 has a device go offline, that information can be recorded. Such information can include movements of the user or users from room to room, if desired. That is, any information that pertains to operation of control network 100—which includes outputs of all sensors—can be recorded.

In addition, once Upload Diagnostics button 3408 is pressed, System Devices field 3410 is opened and populated with diagnostic information pertaining to each type of controllable and interface device that makes up control network 100. Such information can include the status of all devices in control network 100, the room that the device is a part of, the model number of the device, and the firmware version used to program the device. Devices that are missing (and which previously were present, meaning, most likely, that there is a communication issue) can show an "X" on the list to indicate that there is a problem. Otherwise, a check mark appears. For example, as seen in FIG. 34, the wall keypad in the parlour room is exhibiting problems, and thus shows up with an "X" next to it, and Configure button 3412 appears next to it as well.

According to still further aspects of the embodiments, information regarding online/offline status can be recorded. Such recorded information can also include whether the device is part of a scene, whether the device is part of a schedule, and whether the firmware version is up-to-date. Still further, such recorded information can include more device specific information, such as whether the batteries are low in a battery powered device.

According to further aspects of the embodiments, the following information can be presented in Maintenance Mode GUI 3400 and System Devices field 3410: the number of scenes the load (light)/shade is part of; the status of the RF performance; and whether the firmware is up to date. According to aspects of the embodiments, if a device is missing, there can be a device replacement button in line with the list item. Still further according to aspects of the embodiments, by clicking on the RF device replacement, a list of devices that have not been assigned will appear, and this can also put the gateway into acquire mode. Accordingly, this will allow the user to replace a failed device with a new one.

Figure 35:
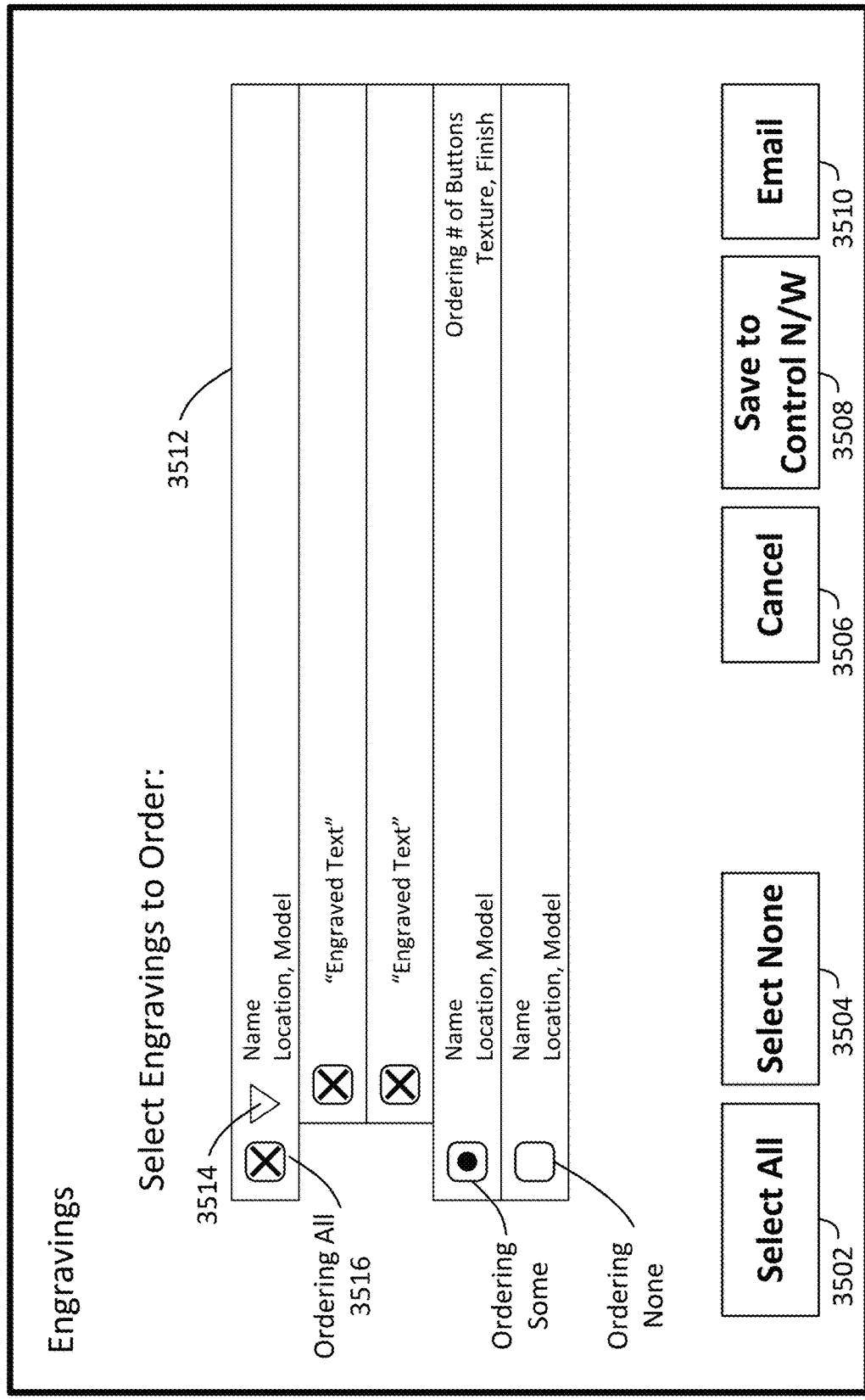
FIG. 35 illustrates an order engravings graphical user interface according to an aspect of the embodiments.

Referring back to Order Engravings button 3406, if a user presses or clicks this button to order engravings, Order Engravings GUI 3500 opens, as shown in FIG. 35. Order Engravings GUI 3500 provides the user with the ability to select some or all engravings to order. The list of engravings can include most or all of the engravable user interfaces that have custom engraving associated with them. By clicking on Show More arrow 3514, a drop down expansion list will open will showing all of the engraved buttons on the keypad. Order Engravings GUI 3500 includes Select All button 3502, Select None button 3504, Cancel button 3506, Save to Control Network button 3508, Email button 3510, Name-Location-Model field 3512, and Order Amount checkboxes 3516a-c.

Buttons that have more than one engraving can show up as one line (CLWI keypads, for example), in Name-Location-Model field 3512. Located on each line is Order Amount checkbox 3516, which has three states: Fully ordered—all buttons selected for order (3516a); Partially ordered—some, but not all buttons selected for order (3516b); and Not ordered—no buttons selected for order (3516c). According to aspects of the embodiments, partial order status is generally not reported, but it can be if desired.

According to further aspects of the embodiments, there are at least two methods of sending engravings. A first method is to save the engraving file to the control system in order to allow a different electronic device to retrieve it and have it emailed to Crestron Electronics, Inc., of Rockleigh, NJ, manually (using Save to Control Network button 3508). A second method is to use PED 104; the user can open an email application and send an email to Crestron Electronics, Inc., of Rockleigh, NJ (using Email button 3510), with a file that has the engraving information. According to aspects of the embodiment, using PED 104 allows the user to send the email from the current site, or store it in an "outbox" on PED 104 if no internet is available on site, and send it at a later date.

According to further aspects of the embodiments, an alternative method for ordering engravings exists. Substantially every control processor 116 or Pyng hub has a dealer name and phone number stored therein (one of the first steps during the initial setup is to ask for this information); the dealer is expected to register the system to his "myCrestron" cloud account. When the "order engravings" button is pressed, the engraving files go to the registered myCrestron email address for any other processing (such as adding a PO number) and then they will be forwarded along to Crestron. If, however, the dealer has not created a myCrestron account (or if control network 100 has not yet been registered with myCrestron) the files will go directly to Crestron so that ownership can be determined, and the engraved buttons can be sent to the user. This can be accomplished by reviewing dealer contact information and then contacting the dealer. At this point, the previously mentioned workflow takes over.

Figure 36:
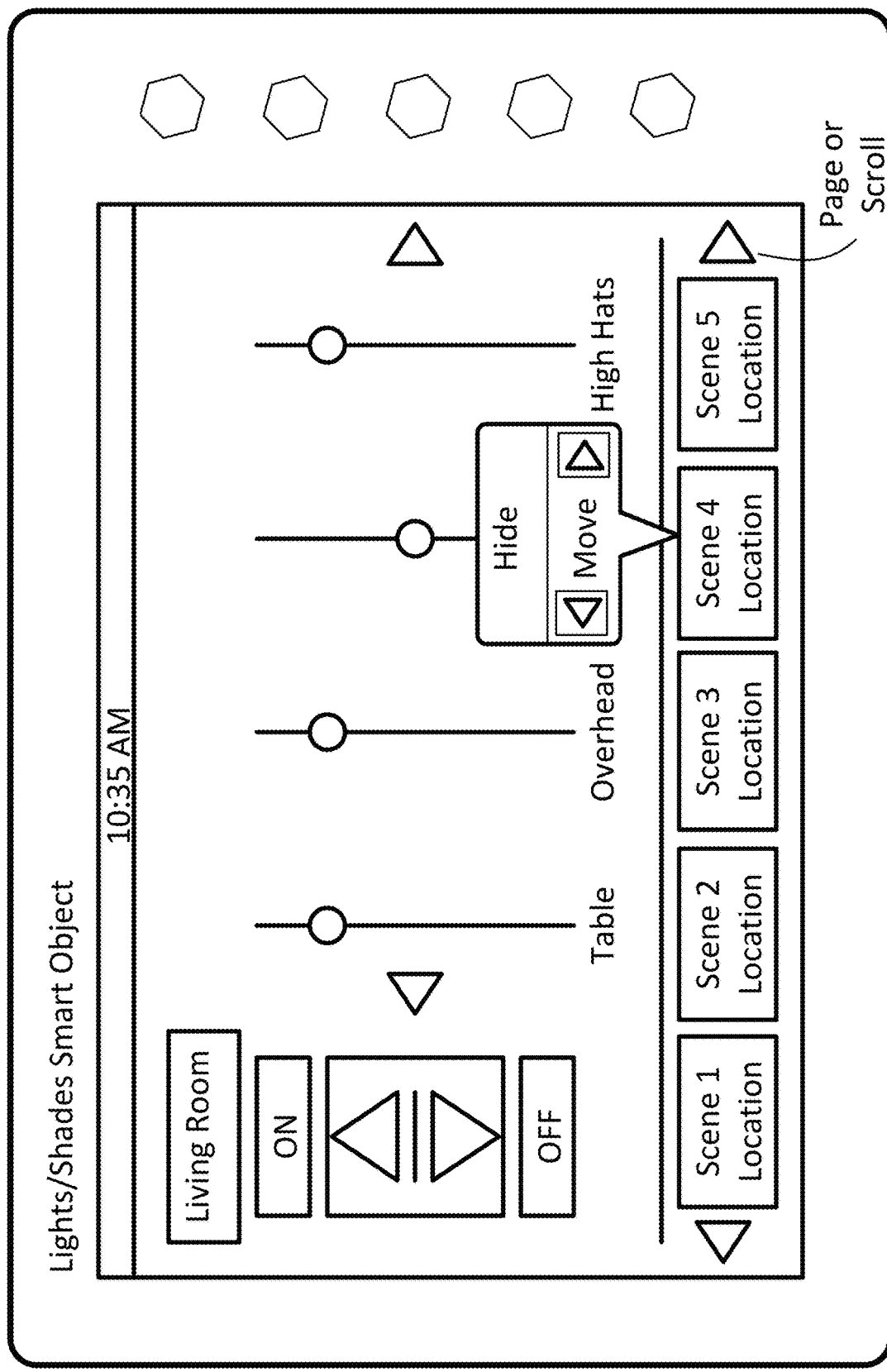
FIGS. 36-39 illustrate a plurality of graphical user interfaces for use in creating smart objects for use with the control network as shown in FIG. 1 according to an aspect of the embodiments.
Figure 37:
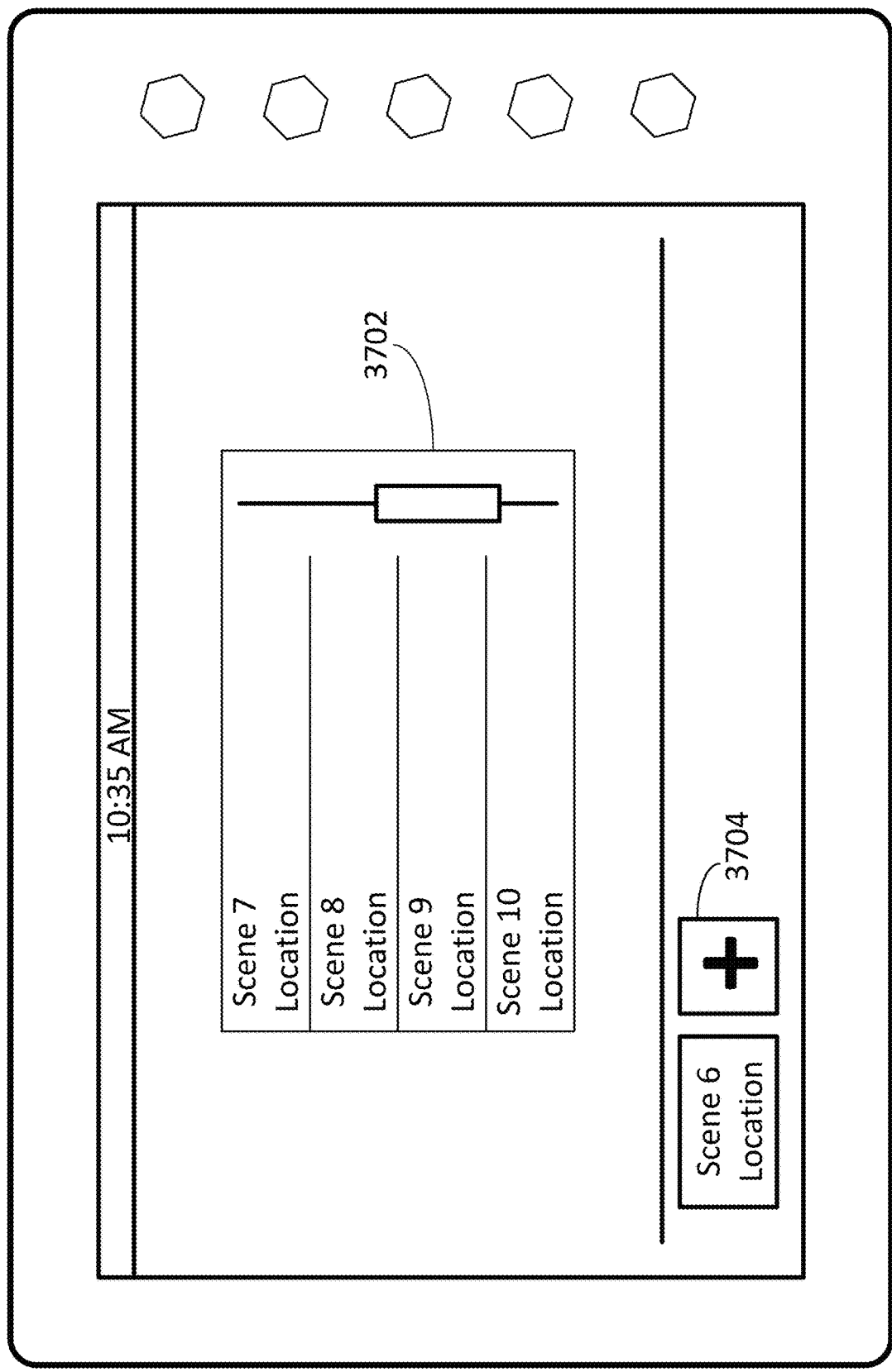

Attention is now directed towards FIGS. 36-39, and Lights/Shades Smart Objects Creation GUI 3600, among other GUIs. FIG. 37 illustrates Scene Location Smart Objects Creation GUI 3700, with Scene field 3702 and Add New Scene button 3704. According to further aspects of the embodiments, control network 100 and Configuration App 506 can include the development of at least two end-user smart objects. According to an aspect of the embodiments, a first of the end-user smart objects is a shades smart object, and a second of the end-user smart objects is a lights smart object (both of which are shown in FIG. 36). While the smart objects can be very similar, they provide for the following features: room control, individual control, and recall of local or linked scenes. According to still further aspects of the embodiments, touch screen user interfaces can also be created that work automatically and substantially always mirror the state of the system.

According to aspects of the embodiments, room control provides for raising or lowering of shades, opening, or closing of shades, and turning on and off of lights, as well as dimming lights. Recalling of local or linked scenes provides for organization of scenes, and hiding or showing of scenes for the room of the whole house/business/enterprise location according to aspects of the embodiments. According to further aspects of the embodiments, a shade motor list can include all shade groups that have one or more shades as members, as well as any shade motor that belongs to zero groups.

Figure 38:
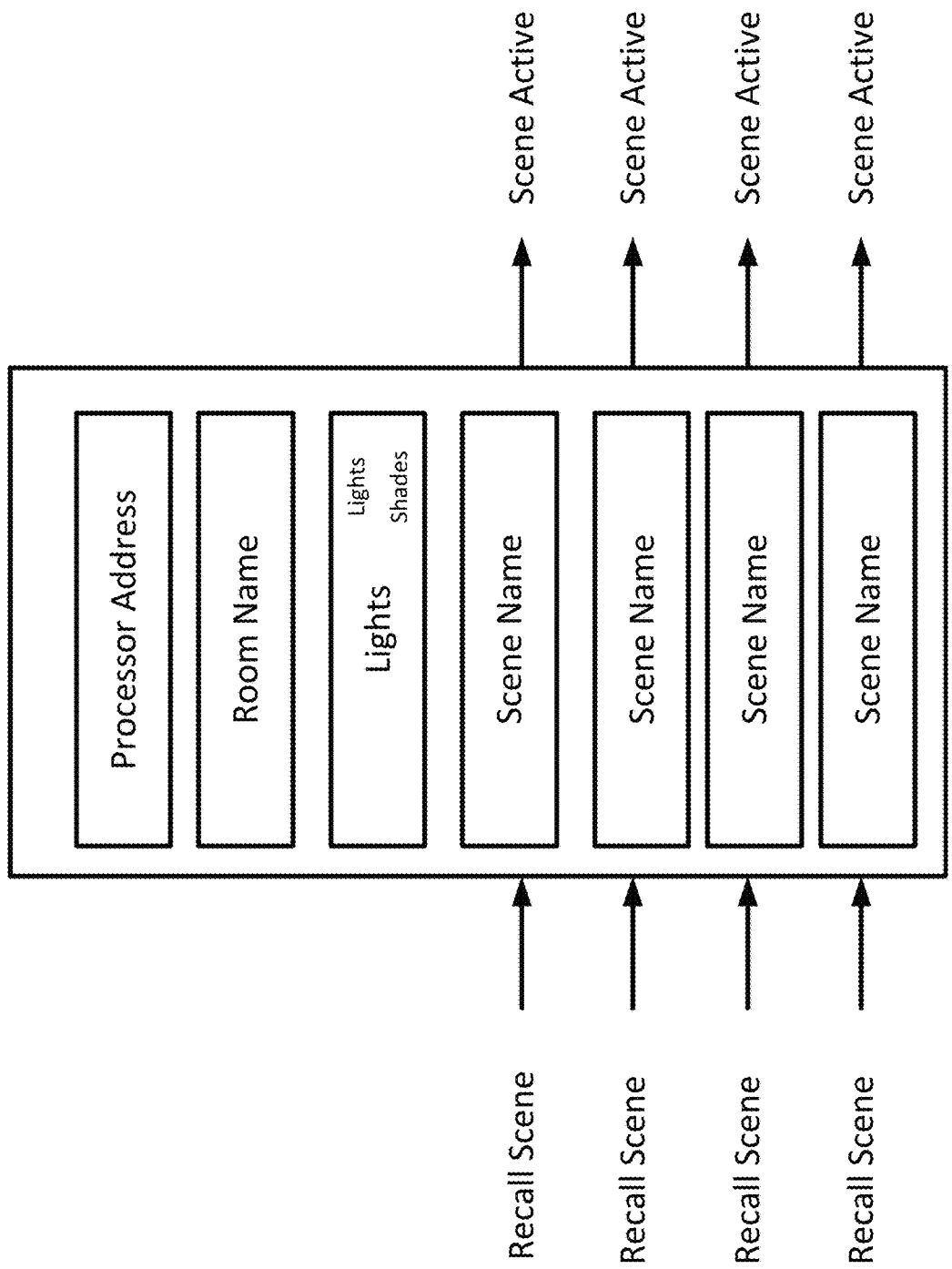
Figure 39:
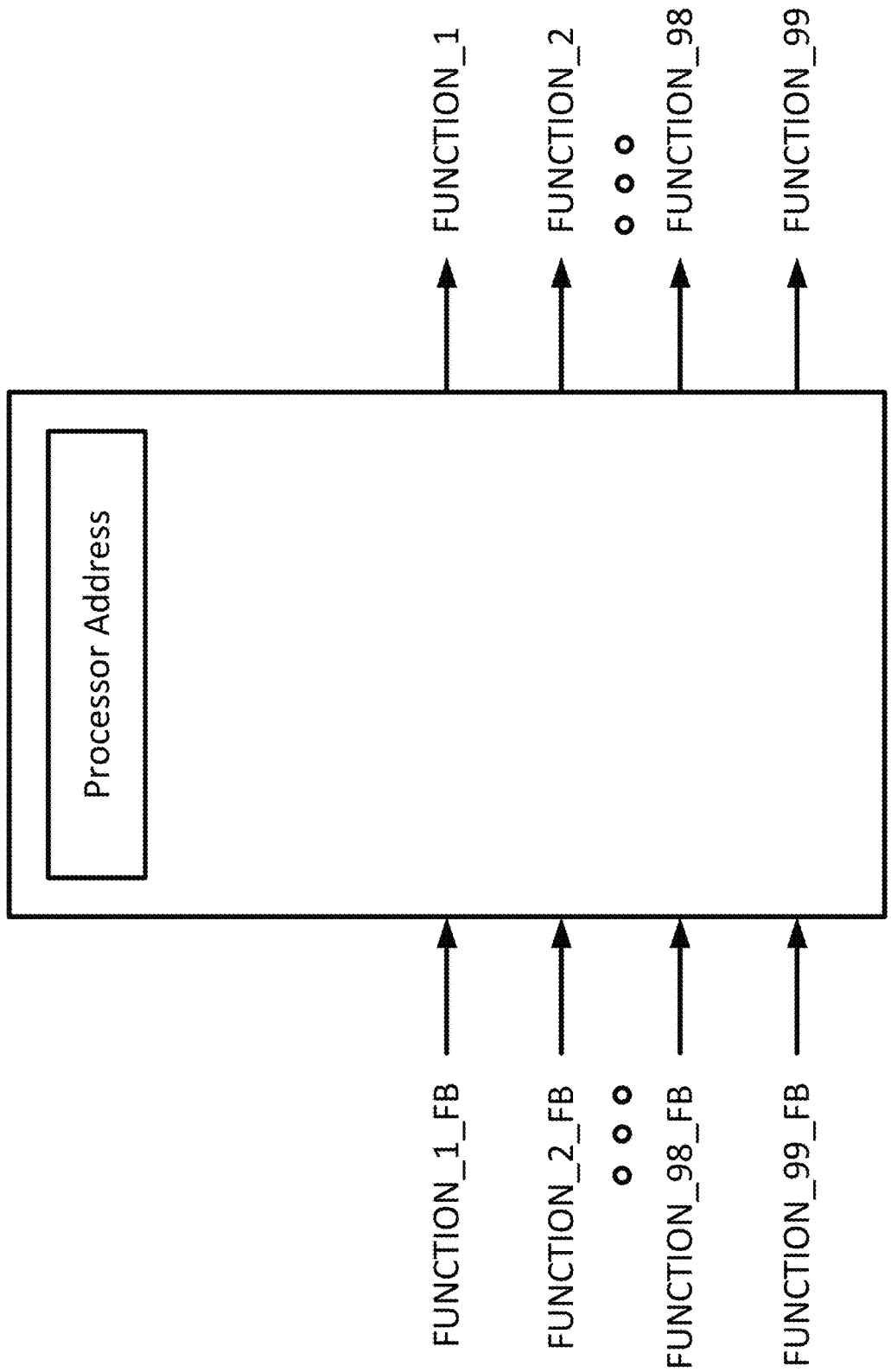

According to further aspects of the embodiments, a button hold can be used to trigger access of the scene hide/reorder menu. Furthermore, the smart objects can support configuring the room that they are part of, and setting can follow the room and persist through resets of the touch screen/mobile project. According to still further aspects of the embodiments, external programs, not part of Configuration App 506, but accessible by it, allows the recalling of scenes from alternate processors. The external programs trigger fake button presses within Pyng and control network 100, and the external programs then are provided feedback regarding the "pressing" of the buttons. There also exists a custom function module that allows foreign programs to access the custom functions defined by the Seawolf system. FIG. 38 illustrates the actions of "fake" button presses, and FIG. 39 illustrates letting an external program know that a button has been pressed so some other totally customizable logic can be created.

Figure 40:
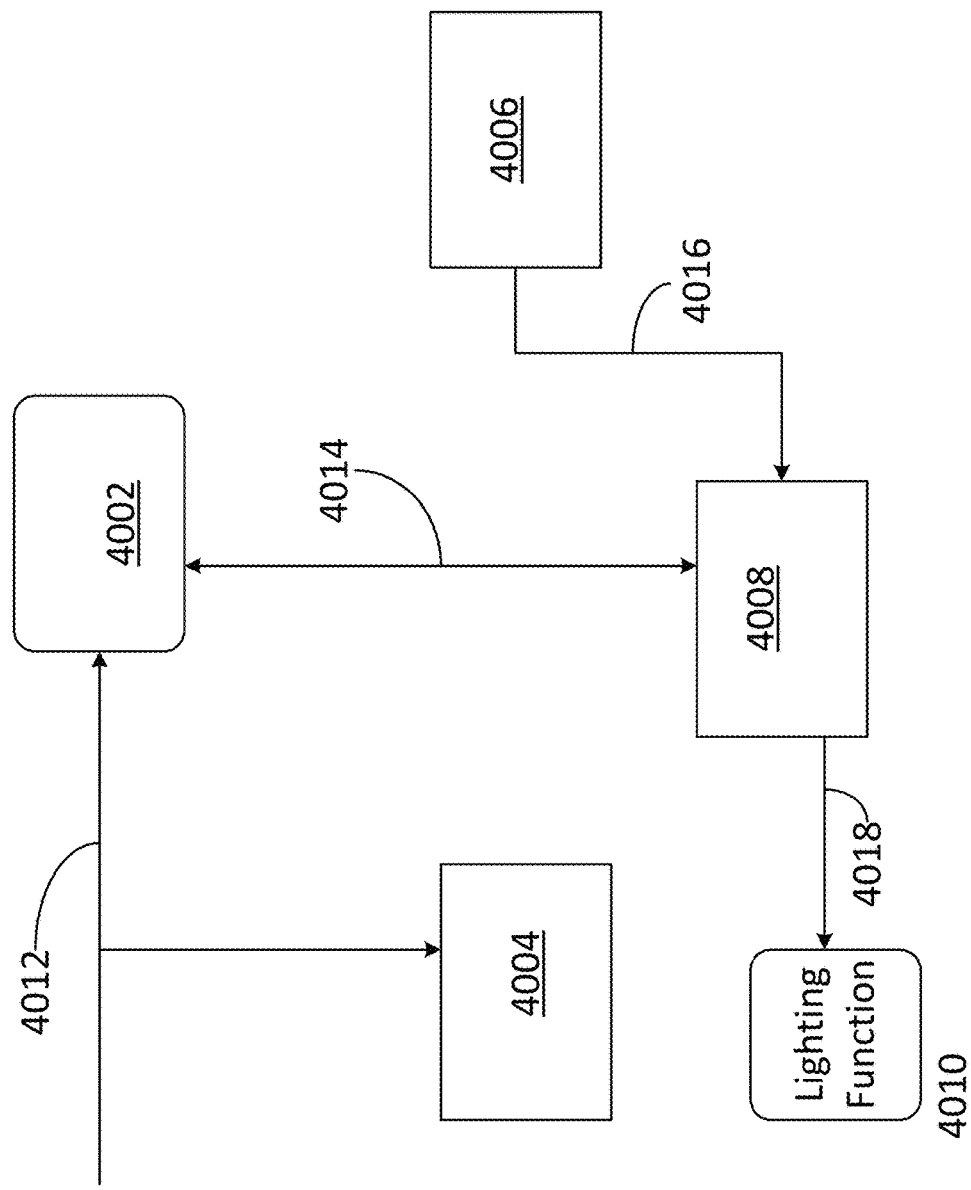
FIG. 40 illustrates a block diagram of a signal flow diagram for configuring buttons in a live manner in the control network of FIG. 1 according to aspects of the embodiments.

FIG. 40 illustrates a block diagram of signal flow diagram 4000 for configuring buttons in a live manner in the control network of FIG. 1 according to aspects of the embodiments. According to aspects of the embodiments, buttons are configured in a live manner; that is, as soon as the user presses or clicks on a button to assign it a task, it gives the button some feature, that task or feature is immediately applied to that button; there is no need to "save" the assignment. According to aspects of the embodiments, this substantially immediate "live" assignment of a task or feature is achieved by providing the task/assignment information (hereinafter "Configuration Information Update 4012") to both PED 104 database (PED database) 4004 and Configuration App 506 database (Configuration App database) 4002. According to further aspects of the embodiments, PED 104 can be an Apple® iPad® device, or some other personal electronic device. When button 4006 is pushed, command signal 4016 is sent to control processor 102 (shown as hub 4008 in FIG. 40). Hub 4008 immediately sends a request to Configuration App database 4002 that verifies the button action, and Configuration App database 4002 tells hub 4008 to produce the configuration information action, in this case, lighting function 4010 (the exchange of information between Configuration App database 4002 and hub 4008 is represented by signal flow 4014). Thus, according to aspects of the embodiments, both buttons 4006 and Configuration App 506 act on Configuration App database 4002; this provides the substantially immediately assignment of button configuration information, as well as the retrieval of the button configuration information to produce the lighting information (although such assignments are not limited to lighting, as those of skill in the art can now appreciate, based on the discussion provided herein).

Figure 41:
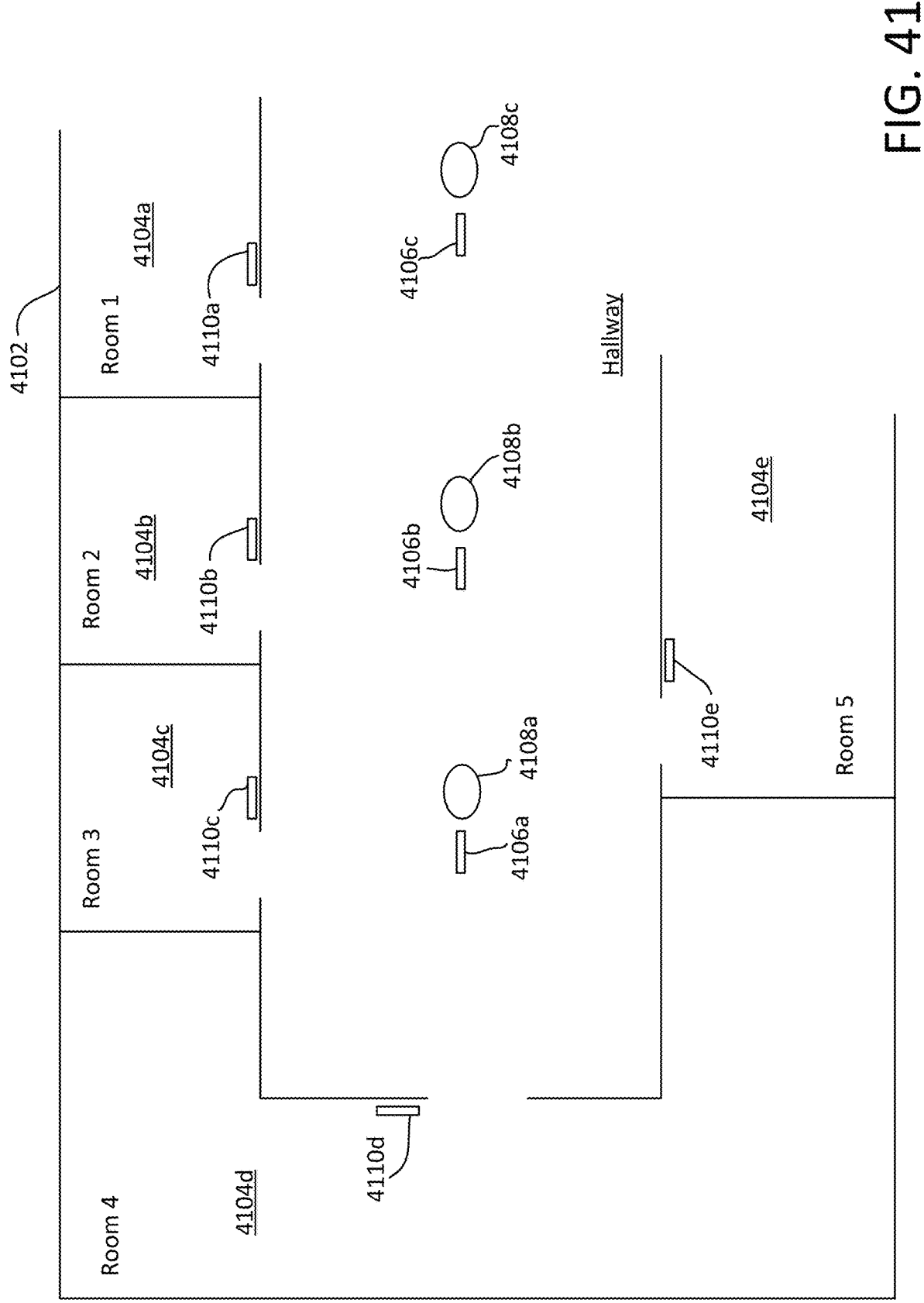
FIG. 41 illustrates a partial floor plan of a building that shows the locations of physical controllable devices that can be used in the creation of smart scenes by a configuration application that runs on the personal electronic device of FIG. 1 that functions on one or more room levels according to aspects of the embodiments.

According to further aspects of the embodiments, Configuration App 506 can utilize the knowledge of the controllable device inventory assigned to a room to build smart scenes that function on a room level function as opposed to a device level function, thereby raising the use of the controllable devices one or more levels of abstraction. In FIG. 41, each of rooms 4104*a-e* contains a respective keypad 4110*a-e* that can control lights 4108*a-c* located in the hallway. In the hallway, there are three sensors 4106*a-c* that also control lights 408*a-c* according to occupancy of the hallway. A first virtual device ($VD_1$) can include lights 4108*a-c* controlled by keypad 4110*a*; a second virtual device ($VD_2$) can also include lights 4108*a-c* but controlled by keypad 4110*b*, and so on for virtual devices $VD_{3-6}$. The seventh virtual device can be lights 4108*a-c* controlled by sensors 4106*a-c*, in the manner described above (logically OR'd to turn them on (if any sensor indicates the presence of a person, then all lights 4108*a-c* go on), and logically NAND'd to turn them off (all of the sensors must indicate absence of people to turn off all of the lights).

Figure 42:
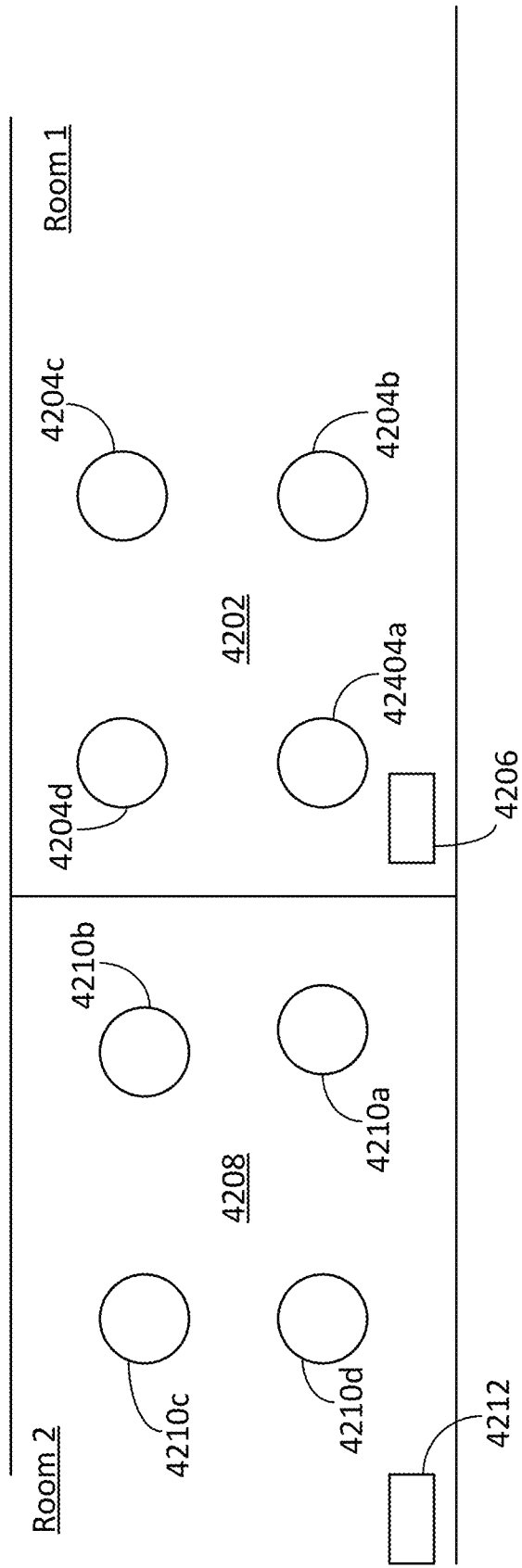
FIG. 42 illustrates a partial floor plan of a building that shows the locations of physical controllable devices that can be organized as one or more virtual controllable devices according to aspects of the embodiments.

According to further aspects of the embodiments, the concept of creating virtual devices is not relegated to lighting products, but can include substantially any type of controllable device that can be included in a home, business, or enterprise location. By way of a further non-limiting example, the creation of multiple virtual devices with different levels of abstraction for control thereof, can be extended to HVAC devices as well. For example, a plurality of thermostats can be combined to create overlapping zones of heating and cooling that functions at a room level as opposed to functioning at a device level. Attention is now directed to FIG. 42.

FIG. 42 illustrates the creation of virtual devices by Configuration App 506 according to aspects of the embodiments. In FIG. 42 a plurality of rooms (in this case, first room 4202 and second room 4208) are shown, each of which contain a respective thermostat, first room thermostat 4206 and second room thermostat 4212, respectively, and further wherein each of first and second rooms 4202 and 4208 has at least four vents (first room vents 4204*a-d* and second room vents 4210*a-d*). According to aspects of the embodiments, thermostats (and other types of control devices, according to further aspects of the embodiments) can be assigned on a room level with a single thermostat being represented as a virtual device in multiple rooms if that thermostat is used to control more than one room (e.g., a first virtual device $VD_1$ is first room thermostat 4206, which controls first room vents 4204*a-d*, and second room vents 4210*a,b*, and a second virtual device $VD_2$ is second room thermostat 4212 that controls vents second room vents 4210*c,d*. At the same time, the virtual device of one thermostat can be combined with the virtual device of another thermostat, if both of those thermostats cover the same room and their functions can be combined into a single room level function (e.g., a third virtual device, $VD_3$, that is comprised of first and second room thermostats 4206, 4212, with respect to second room 4208, and vents 4210*a-d*.

According to further aspects of the embodiments, a non-limiting example cases is one in which the thermostats each are responsible for heating their individual rooms (second room thermostat 4212 heats second room 4208 and first room thermostat 4206 heats first room 4202), but one thermostat is responsible for cooling both rooms, e.g., second room thermostat 4212 cools second room 4208 and first room 4202.

According to further aspects of the embodiments, controllable devices can be placed in groups, and groups can be assigned to a room. For example, shades are usually raised and lowered together in groups, so shades can be placed into a group, such as east wall, west wall, among others, and these groups can be assigned to a room. In this context, according to further aspects of the embodiments, a "group" creates a virtual device. The virtual device can be controlled by the user (through control network 100), which happens to be a shade group. Sensors, similarly, can be used as a virtual "occupancy sensor" that covers an entire room, no matter how many occupancy sensors are actually included in the room.

According to further aspects of the embodiments, lighting and shading scenes can be configured using Configuration App 506. For example, a user can set a scene for a room that includes multiple lights and shades. A scene is defined as a set of operating instructions that controls one or more controllable devices to operate in a specific manner A scene can include multiple operations (open shades, close shades, open them 25%, close them 25%, and so on), and can run over predetermined periods of time. Scenes can be created for one room, and copied over to another room (or rooms) for the same or similar devices (i.e., a user can create a scene for a set of shades, but that would not be applicable for use with lighting controllable devices). Configuration App 506 can ascertain the appropriateness of the created scene for the designated group of controllable devices prior to allowing the scene to drive those controllable devices.

According to further aspects of the embodiments, as a user acquires one or more controllable devices (after setting up control network 100 as described in regard to FIG. 6), these are automatically assigned to a first scene entitled "all-house-on" and a second scene entitled "all-house-off" with no interaction from the user. According to aspects of the embodiments, the "all-house-off" and "all-house-on" functions are generally applied or used only with lights, shades, and audio devices, but control network 100 should not be construed to be so limited thereto. For example, a substantially similar mechanism can be applied to heating/cooling—the entire house can be set to 68° Fahrenheit (F), or 72° F., depending on the time of day/year. Additionally, as a user assigns one or more controllable devices to a particular room, these assigned controllable devices are automatically configured into two additional scenes for that particular room, the first of which is entitled "all-room-on," and the second of which is entitled "all-room-off" for that room. According to still further aspects of the embodiments, additional commands can include "wakeup," "leave," "come home," or "go to sleep," and each can include parameters for the entire house, for different subsystems.

According to further aspects of the embodiments, Configuration App 506 can be implemented with no cancel and save buttons, only a "done" button that the user can utilize to end or terminate configuration of controllable devices. That is, according to aspects of the embodiments, control network 100 is created as controllable devices are installed and thus the control system can be considered to be created live. According to further aspects of the embodiments, control processor 116 is referred to as the "Pyng hub" as designed and manufactured by Crestron Electronics, Inc., of Rockleigh, NJ According to aspects of the embodiments, the configuration information of the control network 100 can be automatically uploaded to a remote server (not shown) for backup through internet 132. Control network 100 logs all activity and captures control network 100 settings substantially continuously. The backup includes usage logs and other status information. According to aspects of the embodiments, control network 100 is an automatic control system and the remote server is backing up the real time configuration. According to aspects of the embodiments, events happen, once programmed, substantially without interruption, and without further instruction. However, as those of skill in the art can appreciate, substantially continuously backing up real time configuration information can create a significant amount of data, and could, if backed up substantially continuously, create innumerable transmissions. Consequently, configuration information is generally not sent after every button press. Accordingly, control network 100 waits until activity is dormant for a predefined period of time and then a backup configuration is uploaded. According to an aspect of the embodiments, a first predetermined time period can be about 15 minutes; changes that occur prior to the first predetermined time period can be pushed to the cloud. Thus, configuration saving is not related to storage space, but rather clarity in terms of communication. According to aspects of the embodiments, the settling time (or predetermined waiting time) makes it more clear to the user which set of events constitute a change in the operating state of the system. As those of skill in the art can appreciate, this can be useful when trying to revert back to a previous operational state of a system.

According to further aspects of the embodiments, a "golden image" of Configuration App 506 is always stored on the remote server. According to aspects of the embodiments, as controllable devices are added to control network 100, Configuration App 506 evolves and becomes a different App than what is installed "out of the box." This is similar to the OS that comes with a new PC one might purchase; the baseline OS is always substantially the same from machine-to-machine, but each time a new device or program is added to your PC, the OS changes, albeit in some cases in only minor ways, and in other cases, in very significant ways. So to with the golden image version of Configuration App 506; it is not over-written by new configuration information. This allows control network 100 to always be returned to a set point, such as after the initial installation.

According to further aspects of the embodiments, deleting devices only removes their association to a room. Removing an assignment of a load/shade from a room causes it to be removed from all associated scenes. Deleting a room sets all devices in that room to unassigned. Deleting a room further removes all scenes associated with that room. Deleting a scene has no effect on the contained loads/shades. Scenes that are programmed to a button are unassigned if a scene is deleted, which causes the button to be considered "unconfigured."

As described above, controllable devices can include additional devices other than lighting and shade devices (among others, shown in FIG. 1), such as AV devices. Accordingly, and in regard to further aspects of the embodiments, control network 100, through use of Configuration App 506, can integrate with an AV control system, such as a Crestron AV system programmed using Crestron software tools (among other AV systems and software tools). Text modules can be written into the AV system project file that detail a room that a controllable device is located in and functions of the AV system that the programmer wishes to expose to the control system. The control system discovers these modules and they are represented in Configuration App 506 as virtual devices. According to further aspects of the embodiments, such text modules can also be used in defining external programs, and Configuration App 506 can discover them, or be alerted of their presence, allow them to be configured within Configuration App 506.

According to still further aspects of the embodiments, controllable devices can include such items as a universal remote control (remote control) that can control lights. Such remote control could ostensibly be used for controlling an AV system, but can be configured to work with control network 100. The remote control can comprise a text module that indicates the room the remote control is located in, as well as which functions the programmer wishes to expose to control network 100 (e.g., a button for controlling lights). Configuration App 506 can discover the text module and represent the exposed function as a virtual device. As described above, a single device can have multiple virtual devices. Additionally, multiple devices can have a room level function represented by a single virtual device.

According to further aspects of the embodiments, control network 100 can learn about user habits by logging settings and activity. One particular embodiment can be the settings and activities of automatic HVAC control. By way of non-limiting example, Configuration App 506 can monitor and track how a user changes temperature settings over a period of time, and create a scene or event that represents typical HVAC settings for the room, house, or enterprise location.

For example, when a user turns on a light, they are now known to be present. Of course, automatic lights on timers need to be disregarded. Only a physical button push should be remembered. Likewise, when a user turns on an audio zone in an audio distribution environment, they are likely present. Further, when a user turns on a video display they are almost certainly present. The system is optimized by knowing how many persons are likely in the house. Lighting events from different rooms (again physical button presses) can be determined by the time between presses. According to aspects of the embodiments, some events can be given priority over others as follows: 1. Video 2. Audio 3. Lighting/Keypads. However, the aspects of the embodiments should not be construed to be so limited by such an example as the order can change, or some devices be excluded, and/or other categories be created. According to still further aspects of the embodiments, such prioritization can be omitted completely. Few people will turn on video on a room they are not in. More people will turn on audio in a room they eventually plan to be in. Lights may on occasion be left on for late night entry. When an event happens, it is place in a database and compared to previous events. If events form a pattern, the system can begin to adjust automatically based on these previous events. A non-HVAC control might be that if someone turns on a particular radio station every morning, when the user turns on the radio in the morning, it defaults to that station. It is probably not desirable to automatically turn on the radio.

Figure 43:
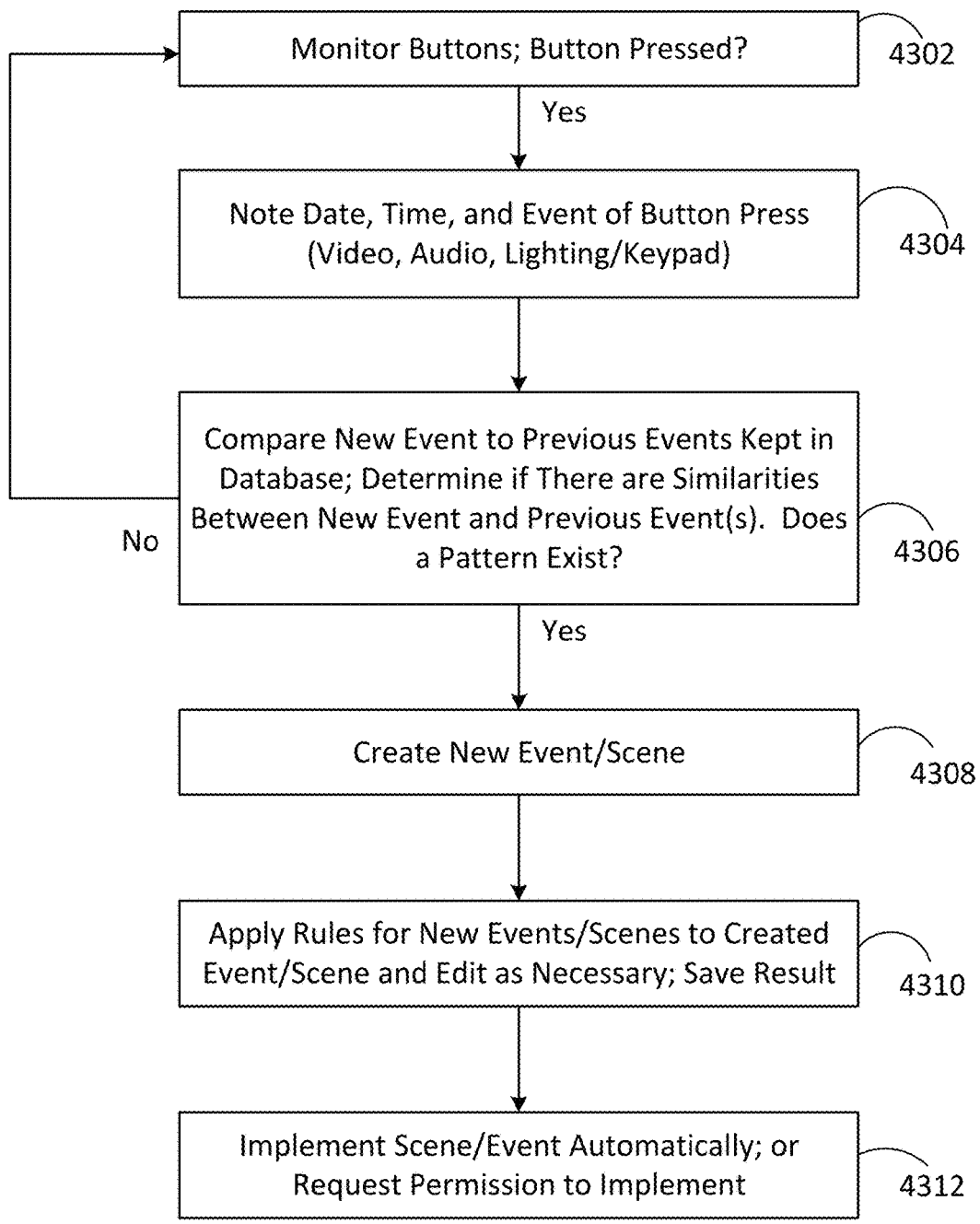
FIG. 43 illustrates a flow diagram of a method for creating an event-scene based on a detected pattern of usage of one or more controllable devices by the configuration application according to aspects of the embodiments.
Figure 44:
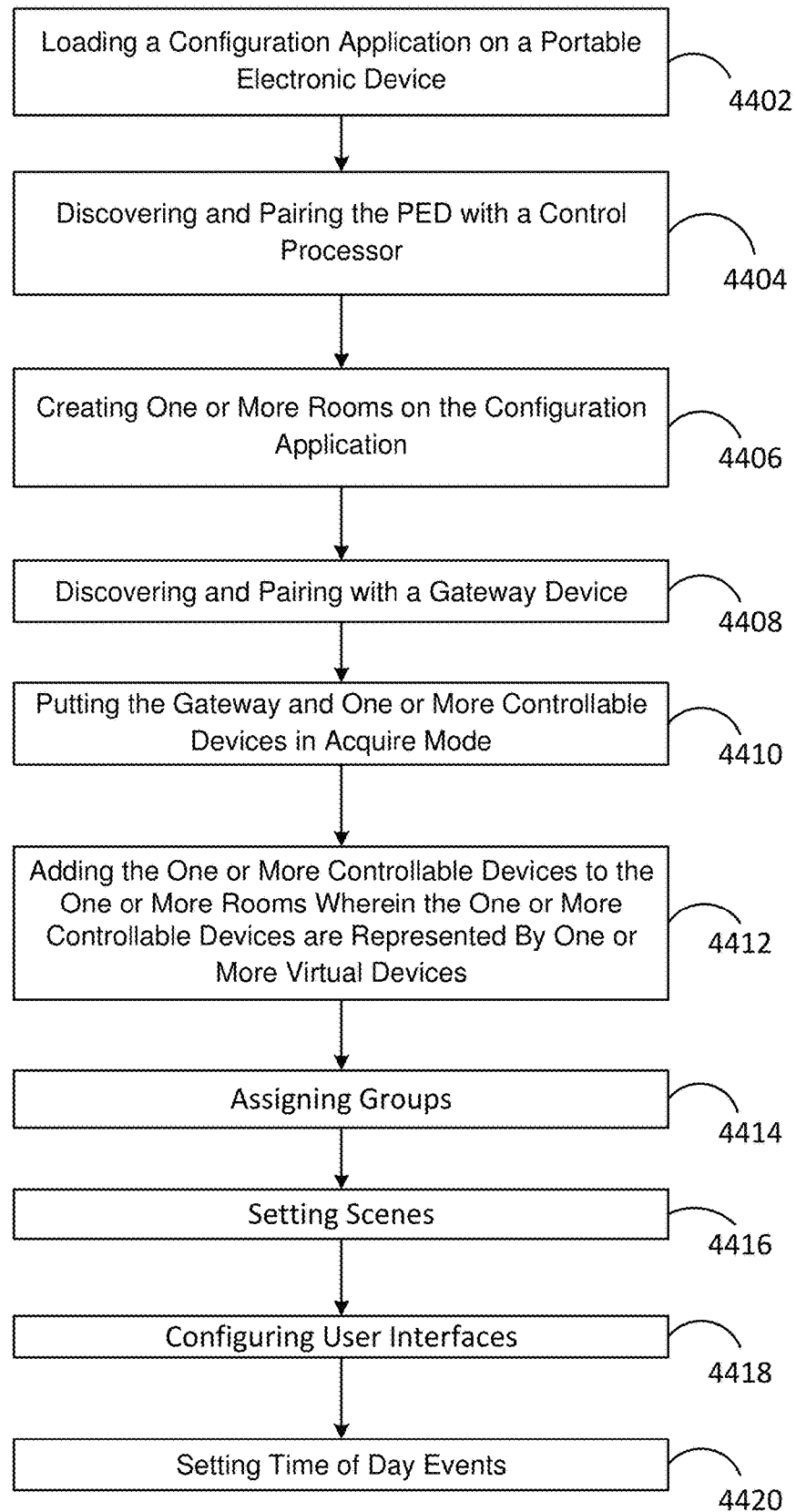
FIG. 44 illustrates a flow diagram of a method for configuring a control system according to aspects of the embodiments.

Attention is directed towards FIG. 43, wherein a flowchart of method 4300 for the creation of a new scene is illustrated. Method 4300 begins with step 4302 in which Configuration App 506 monitors all of the buttons on PED 104; if a button is pressed, then in step 4304 method 4300 notes the date, time, and event of the button press. According to aspects of the embodiments, such events could be a video event (watching a video presentation), audio event (turning on the radio, or CD player, or some other such similar activity), or lighting event (executing an "all-on" light scene, or turning on some specific light In step 4306, Configuration App 506 compares the new event to all of the previously stored events, kept in an event database. Configuration App 506 uses a pattern-recognition algorithm/application (PRA) to determine if enough similarities exist between events to create or recognize a pattern. For example, such algorithm can readily ascertain that a new event is audio based, so it will at first screen out all of the non-audio events, and compare the new audio event to those previously stored audio events. The PRA then compares the time and day of the new audio event to the times and dates all of the previous audio events to ascertain similarities/dissimilarities. Weighting functions can be used, as well as range values (e.g., all audio events that occur on the same day of the week within thirty minutes (or forty minutes) of each other), in order to determine patterns of audio events. Substantially similar processing can occur for the other types of events (video, lighting). In addition, there can be combinations of events, such as a video-lighting event that always occur together. One such example might be "movie night" on Friday evenings, wherein the family watches a movie together, and as such the lights might be turned down, and video presentation occurs. Such a series of events can be readily ascertained by Configuration App 506.

If no such pattern is found to exist, then method 4300 returns to step 4302 to monitor for the next button pressing. If a pattern is found to exist, then in method step 4308, a new event-scene is created. In method step 4310 rules are applied to the new event-scene; that is, a set of constraining rules are created to apply to the newly created event-scene in order to prevent perhaps undesired effects of the newly created event-scene. By way of non-limiting example, a newly created event-scene could be a radio is always tuned to a certain station at about 0800 on weekday mornings, just before the user leaves the house for work, to get the latest traffic information. A constraining event-scene rule can be that the radio is not automatically turned on, but that if the radio is turned on, then it will be tuned to that particular station, and at a relatively lower volume level. The revised event-scene is saved.

In method step 4312, Configuration App 506 adds the revised/edited event-scene to a list of event-scenes that are to be implemented according to their defined schedules; such implementation can occur with permission by the user(s), or without permission, according to further aspects of the embodiments.

Attention is now directed towards method 4400 for configuring a control system according to aspects of the embodiments. Method 4400 configures a control system that has been installed in a home, business, or other enterprise environment, and which comprises one or more controllable devices (108, 110, 112, among others), one or more control devices (106), a gateway (gateway device 114), hub (or central processor/control processor 102), a personal electronic device (e.g., PED 104), configuration software (Configuration App 506) that can be loaded onto one or more of PED 104 or other electronic device, whether local or remotely located, and accessed via one or more different types of networks, including communications network 102.

Method 4400 begins with method step 4402 wherein Configuration App 506 is loaded on a portable electronic device (such as PED 104). In method step 4404, PED 104 is discovered by and paired with a control processor such as control processor 102 (in which additional software components reside, and which interact with Configuration App 506 according to further aspects of the embodiments. In method step 4406, one or more rooms are created using Configuration App 506 according to aspects of the embodiments. The creation of such rooms, described in detail above, provides the user with the ability to create rooms that have not been previously defined. In method step 4408, controllable and control devices can be discovered and paired with the one or more rooms, through use of gateway device 114.

In method step 4410, gateway device 114 and the one or more controllable devices and control devices are put into acquire mode, and in method step 4412, each of the one or more control and controllable devices are added to corresponding and respective rooms, and further wherein one or more control and controllable devices are represented by one or more virtual devices. In method step 4414, the one or more controllable and control devices are assigned to groups, and then in method step 4416 scenes are setup. In method step 4418 one or more user interfaces (control devices) can be configured, and in method step 4420 time of day events can be setup (e.g., turning on lights in a kitchen about 30 minutes before sundown). As those of skill in the art can appreciate, some or all of the above described method steps can be interchangeable in terms of order; in addition, each of the above described method steps has been discussed in greater detail above in reference to one or more of the drawings figures; as such, many details of each method step has been omitted in the immediately preceding discussion in fulfillment of the dual purposes of clarity and brevity.

Figure 45:
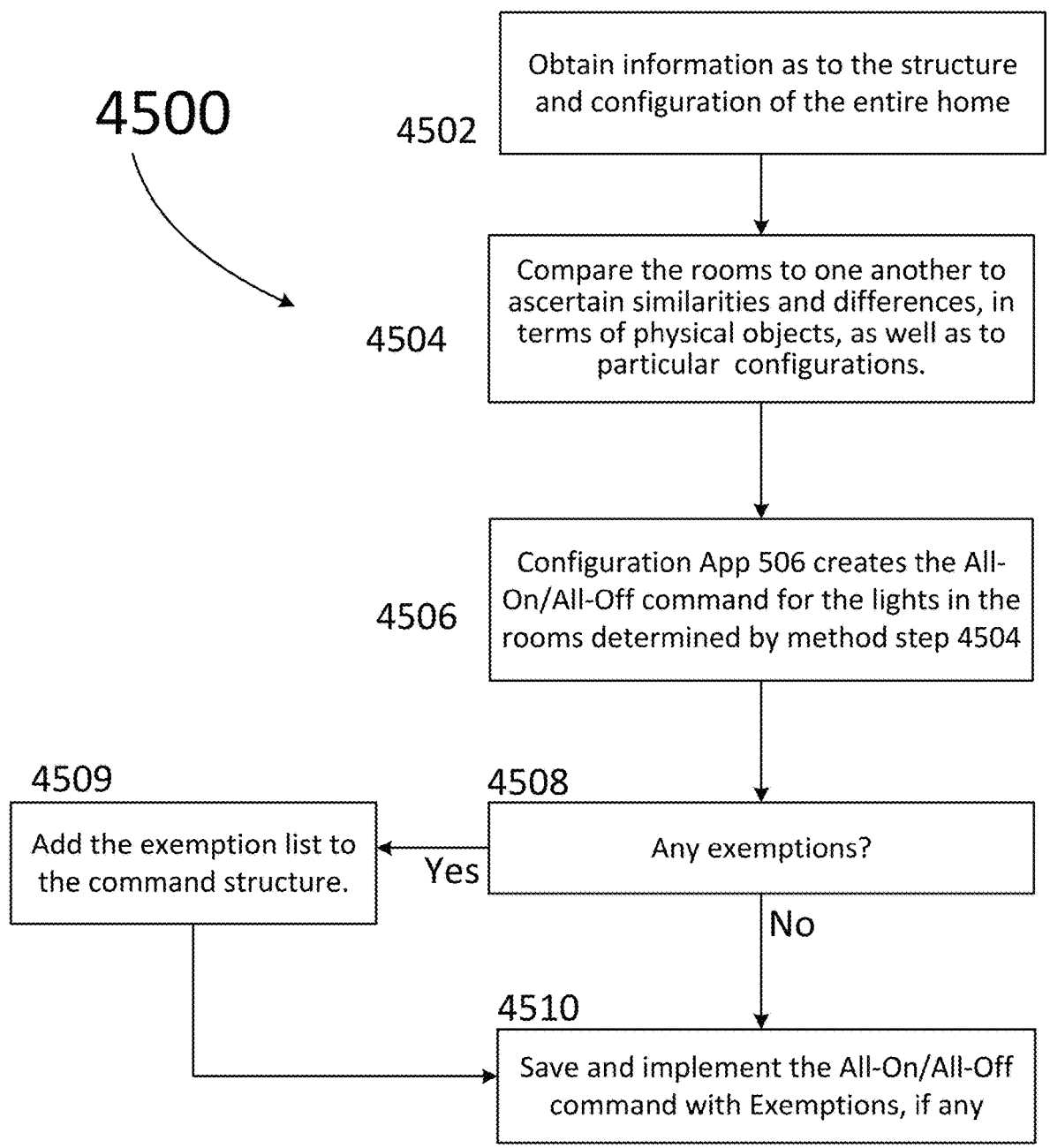
FIG. 45 illustrates a flow diagram of a method for automatic creation of all-on/all-off scenes in a lighting control system according to aspects of the embodiments.

FIG. 45 illustrates a flow diagram of method 4500 for automatic creation of all-on/all-off scenes in a lighting control system according to aspects of the embodiments.

Because control network 100 and Configuration App 506 has information related to the structure of the home (i.e., the rooms and what is contained in them) in conjunction with recognizing that many lighting control systems are configured and programmed identically, Configuration App 506 is able to dynamically create scenes within those rooms to save the user from having to do it. For example, if the user adds three lights (e.g., a virtual device created when a dimmer is added to control network 100) to a room, it can be understood by Configuration App 506 that those three lights must be involved in an All-Off scene, so it is created by default; a substantially similar process occurs for All-On. According to further aspects of the embodiments, natural language processing can be used ascertain "smarter" things in other rooms; for example, if table lamps are located in a bedroom, they can be "exempted" from an All-Off command, for purposes of safety (as well as built in "night-lights), as everything else is turned off in the bedroom for a "Night Time" scene. Similarly, a "Welcome Home" scene can turn on all lights in an "Outdoor" room as well as a garage and foyer.

Turning now to FIG. 4500, and method step 4502, method 4500 begins by obtaining information as to the structure and configuration of the entire home, office, or enterprise location. For the purposes of this discussion, as well as in regard to FIGS. 46-49, reference shall be made only to a "house" as opposed to other alternate locations, though the methods shown and described herein shall not be construed to be limited thereto according to various aspects of the embodiments. In method step 4504, the rooms are compared to one another to ascertain similarities and differences, in terms of physical objects, as well as to particular configurations. Method 4500 and Configuration App 506 can take into account which lights are so similarly configured and used to include in an All-On/All-Off command In method step 4506, method 4500 and Configuration App 506 create the All-On/All-Off command for the lights in the rooms determined by method step 4504, and in method step 4508, it is determined if there should be any exemptions, as described above. According to further aspects of the embodiments, a list of exempted devices can be created, or the natural language process can determine this be reviewing names and/or configurations of the different lights (e.g., "Mark's nightstand lamp" will not be included in an "All-Off" command) If there are exemptions ("Yes" path from decision step 4508), method 4500 proceeds to step 4509, and adds the exemption list to the command structure. In method step 4510 (which follows both of method steps 4508 and 4509), method 4500 and Configuration App 506 saves and implements the All-On/All-Off command.

Figure 46:
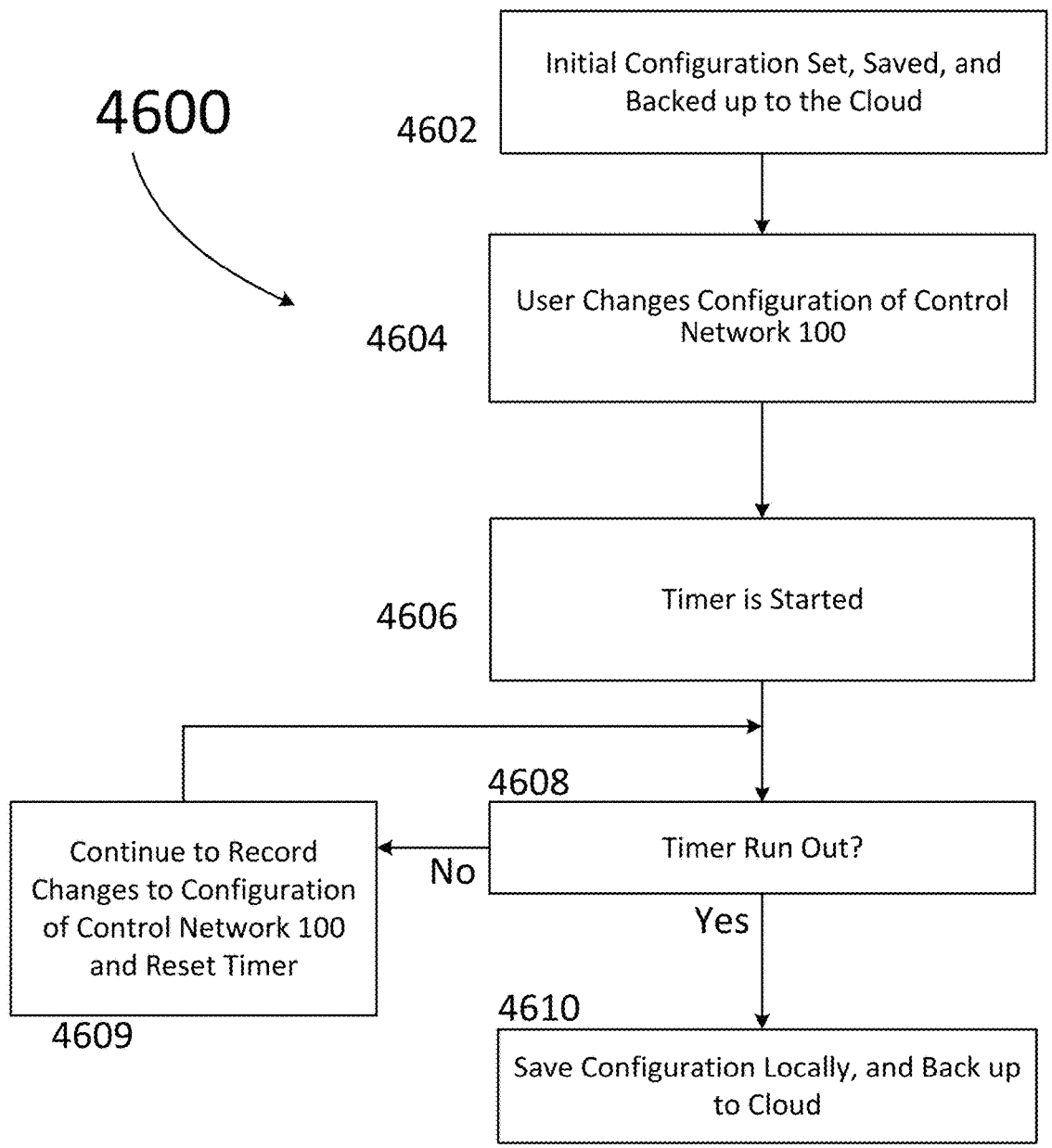
FIG. 46 illustrates a flow diagram of a method for automatic configuration backup in a control system according to aspects of the embodiments.

FIG. 46 illustrates a flow diagram of method 4600 for automatic configuration backup in a control system according to aspects of the embodiments.

According to aspects of the embodiments, method 4600 and Configuration App 506 provides for free-form backing up of the system's operational parameters. Every time the user changes a configuration setting (e.g., a new device is added, or a device is renamed, a scene is added, or a button is redefined, among many other possible changes), a timer is started. If the user performs another configuration change, the timer is reset. Only when the timer runs out does method 4600 and Configuration App 506 consider control network 100 as fundamentally settled and a snapshot is made of all of the configuration parameters of control network 100. That snapshot saved set of configuration parameters can now be thought of as an atomic unbreakable set. The set of changes is stored internally, then backed up to the cloud. At any point in time, the user can select one of those configuration snapshots and roll back to it and control network 100 can be in the exact same state as it was right after that configuration change event.

Method 4600 begins with method step 4602, wherein an initial configuration has been set and saved, and backed up. In method step 4604, the user changes a configuration set point (as described above). In method step 4606, Configuration App 506 starts a timer. In decision step 4608, the timer is checked: if it has run out before a change is made ("Yes" path from decision step 4608), the method 4600 proceeds to step 4610 and the configuration is saved locally and backed up in the cloud. If, however, a new change is made prior to the timer running out ("No" path from decision step 4608), then method proceeds to method step 4609, the new change is recorded, and the timer is reset. This continues until no changes are made prior to the timer running out (i.e., the timer is continuously checked in step 4608).

Figure 47:
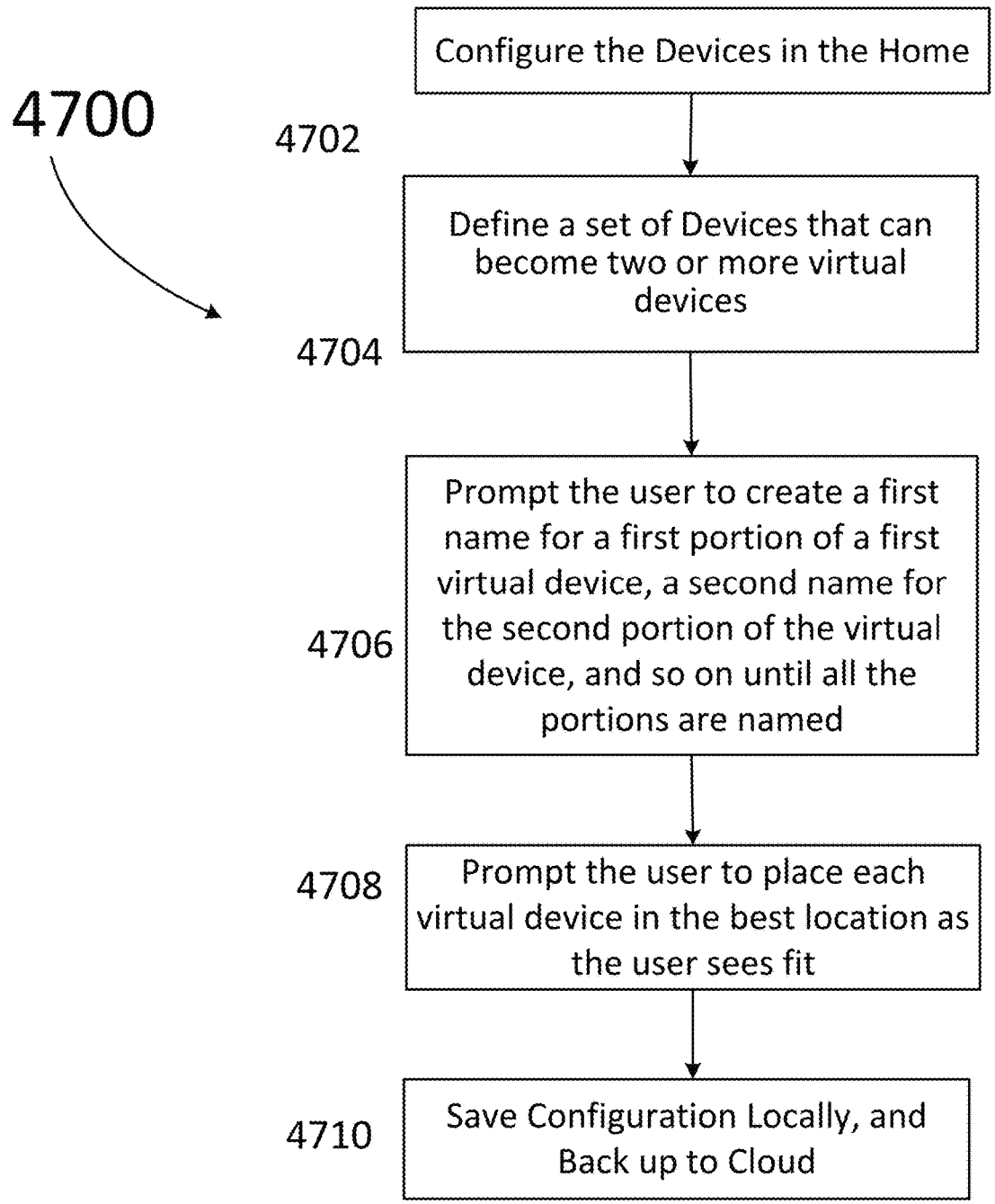
FIG. 47 illustrates a flow diagram of a method for utilization of virtual devices in configuring a control system according to aspects of the embodiments.

FIG. 47 illustrates a flow diagram of method 4700 for utilization of virtual devices in configuring a control system according to aspects of the embodiments.

According to aspects of the embodiments, a dimmer in control network 100 is a set of several items; it not only controls a light, but it also has a set of buttons attached to it. Instead of asking the user to place the dimmer in a room or name the dimmer itself, method 4700 and Configuration App 506 can split the dimmer so that the 2 virtual devices (keypad and light) can be named separately and placed in separate rooms if desired. According to further aspects of the embodiments, this solves at least two fundamental problems when configuring a system: the first is naming; if there is a dimmer by the front door and it controls the outdoor patio lights, should it be named "Entry Way" or "Patio Lights?" Although this may appear trivial, this becomes a much larger problem when using the system because either name is fundamentally wrong. Instead, method 4700 and Configuration App 506 allows the dimmer and light to be independently named so there is no ambiguity. The second problem is in room placement; within the same scenario, should a single device be placed in the entry way room, or in the outside room? As those of skill in the art can appreciate, both are inherently incorrect. By providing for the devices to be split into virtual devices, method 4700 and Configuration App 506 can place the light in the outside room, such that it gets all the benefits of the auto scene generation (All On/All Off), plus it is more clear when feedback is provided such as, "There's a light on outside." Similarly, when the user configures the keypad buttons, if there is an "All-Off" button, method 4700 and Configuration App 506 and control network 100 understand that it is actually referring to the entry way room, and Configuration App 506 can turn those lights off, instead of the outdoor lights.

Method 4700 begins with method step 4702, wherein method 4700 and Configuration App 506 configures the devices in the house. In method step 4704, Configuration App 506 defines a set of devices that can become two or more virtual devices. In method step 4706, method 4700 and Configuration App 506 prompt the user to create a first name for a first portion of a first virtual device, a second name for the second portion of the virtual device, and so on until all the portions are named (generally, they usually are only two, but some devices have more than two). In method step 4708, method 4700 and Configuration App 506 prompt the user to place each virtual device in the best location as the user sees fit; then, in method step 4710, Configuration App 506 sets the configuration, saves, and backs up the same.

Figure 48:
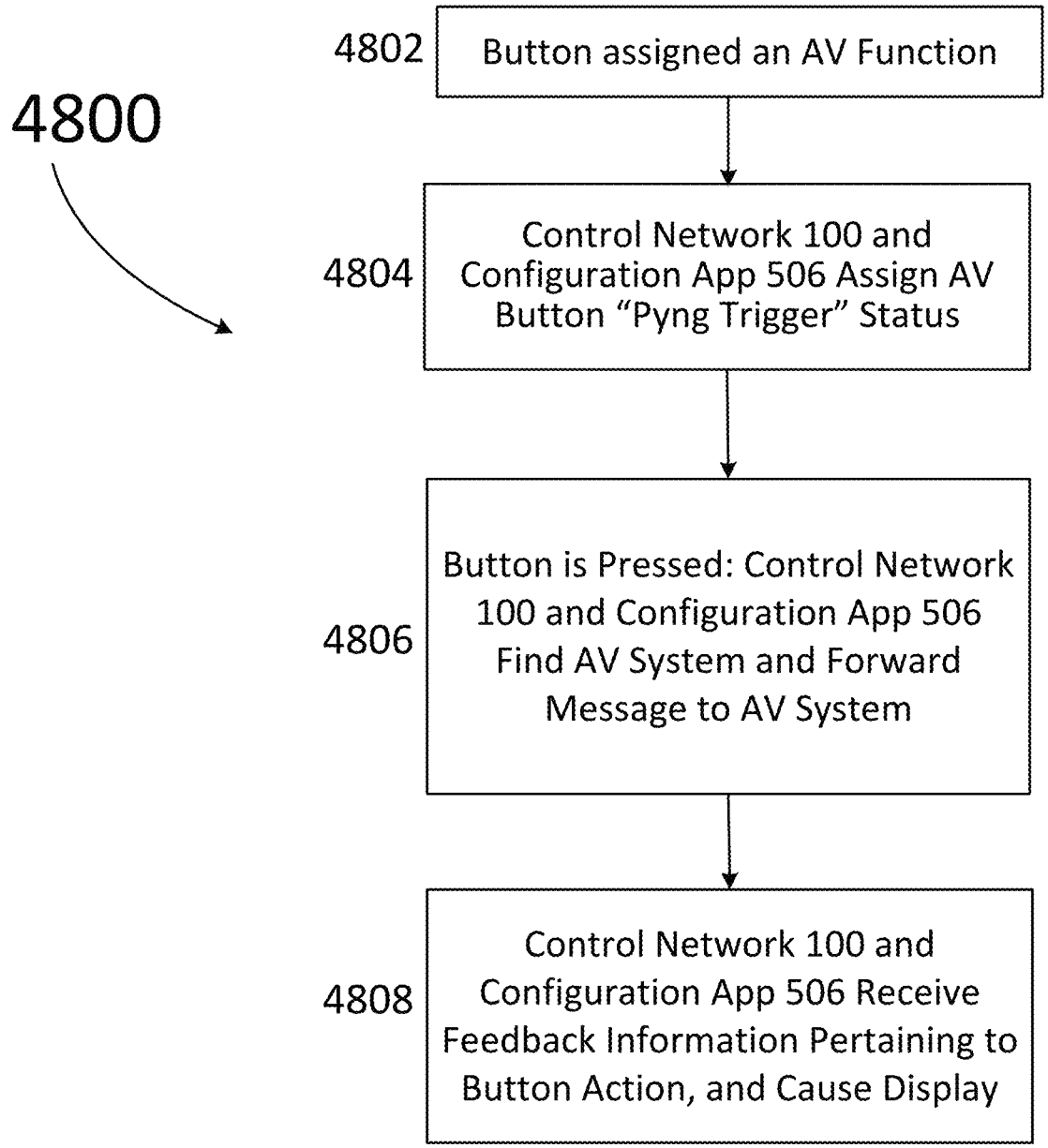
FIG. 48 illustrates a flow diagram of a method for integration of an audio-video control system with a lighting control system according to aspects of the embodiments.

FIG. 48 illustrates a flow diagram of method 4800 for integration of an audio-video control system with a lighting control system according to aspects of the embodiments.

According to aspects of the embodiments, the process of integrating an AV control system with control network 100 comprises a system of bi-directional notifications. The bi-directional notifications can be thought of as virtual button presses with a response that indicates feedback. According to aspects of the embodiments these are referred to as "Pyng Triggers," and "Pyng Listens." Pyng Triggers are information generated within control network 100 but are to be applied to an AV control system. For example, a button can be labelled "Music Off," but control network has no knowledge beforehand of any audio functions. While the label of the button can remain "Music Off," the button itself is reconfigured such that it is a "Pyng Triggers." When Configuration App 506 received a button press signal from such a designated button, it conveys it to a found AV control system, where the programming can be set to do anything, such as turning off music. In addition, the AV control system sends back to control network and Configuration App 506 information about the feedback state. In this case, the feedback state is such that the music is off or on. This feedback is gathered by control network 100 and Configuration App 506 and presented in whatever way the keypad can show it, typically via a status LED next to the aforementioned button.

According to further aspects of the embodiments, the second aspect of the integration of an AV system includes a function referred to as "Pyng Listens." An example can illustrate how the listen function works. A user can have a remote control that controls a media center, but the user wants to have a dedicated button on that remote that says "Lights Off." When that button is pressed, the signal goes into the "Pyng Listens" module on the AV control system and then gets sent over to control network 100 and Configuration App 506. Control network 100 and Configuration App 506 understand that the modules are present, and allows them to be configured in the same way as a keypad; this is programmed through the actions and events page, just like any button. In response, control network 100 and Configuration App 506 determine the feedback state of that button's function (e.g., for a scene the feedback is active if the scene is active), and that information is sent over to the AV control system, which can then do something intelligent with the information, like change the status on the touchscreen display.

According to further aspects of the embodiments, discovering the AV system involves additional functionality of control network 100 and Configuration App 506. Once the AV systems have been discovered and added as part of the AV control system, control network 100 and Configuration App 506 can discover them and add them to the system in the same way as a wirelessly paired dimmer or keypad. In that case, the AV system will show up in the unassigned list, and then they can be added to a room. This allows Configuration App 506 to keep the hierarchy in check and allows control network 100 to extend to the AV control system.

Method 4800 begins with method step 4802, wherein a button is assigned an AV function, such as "Music Off." In method step 4804, control network 100 and Configuration App 506 apply a "Pyng-Trigger" status to the button. When the button is pressed (method step 4806), method 4800 and Configuration App 506 find the AV system and convey the message to it. In method step 4808, method 4800 and Configuration App 506 receive feedback information and convey it to the user in a suitable format.

Figure 49:
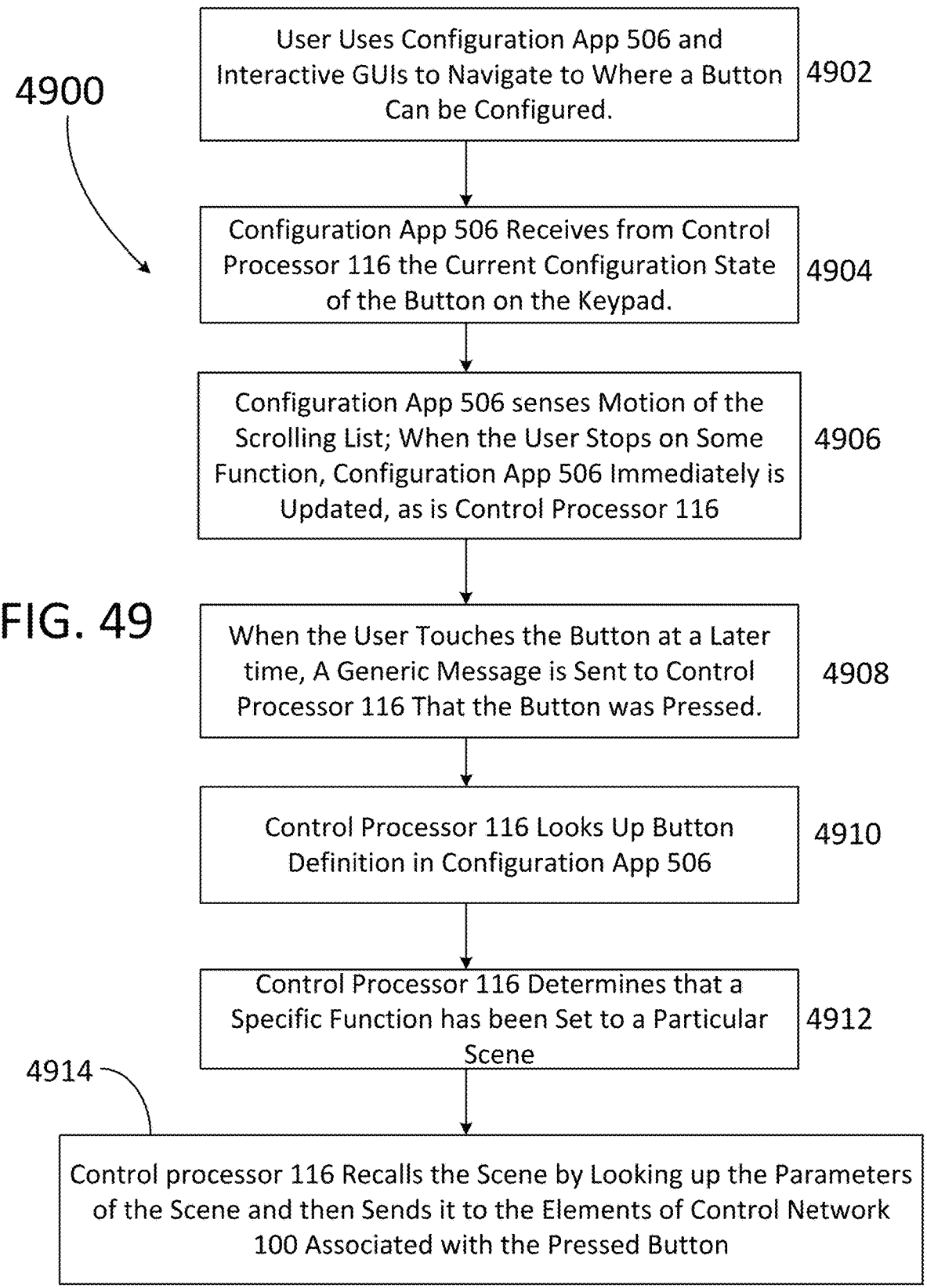
FIG. 49 illustrates a flow diagram of a method for instantaneous function creation in a control system according to aspects of the embodiments.

FIG. 49 illustrates a flow diagram of method 4900 for instantaneous function creation in a control system according to aspects of the embodiments.

As those of skill in the can appreciate, when configuring a traditional control system, a concept is encountered of trying to define what you want, then saving it and subsequently making it live. According to aspects of the embodiments, control network 100 and Configuration App 506 effectively creates a choke point for all logic that updates the moment the change is made, so that the function is immediately live. FIG. 49 illustrates the flow of events to make the immediate live function operate:

In method step 4902, the user is using Configuration App 506 and interactive GUIs to navigate to where a button can be configured. This GUI can also be referred to as the "Actions and Events Page." In method step 4904, Configuration App 506 receives from control processor 116 the current configuration state of the button on the keypad. By way of example, we shall presume that the button has yet to be configured. This means that if the button is pressed, it does nothing, as nothing yet has been assigned to it. In method step 4906, Configuration App 506 senses motion of the scrolling list; when the user stops on some function—for example, the "scene button model," Configuration App 506 is immediately updated. This happens because all the user-interface elements and positions are managed by control processor 116. Therefore, Configuration App 506 is substantially always in sync with the user interface; by definition, it cannot be out of sync. In method step 4908, when the user touches the button on the wall, a generic message is sent to control processor 116 that the button was pressed. In step 4910, control processor 116 looks up that button in Configuration App 506 (the button is now configured as a scene button because that is the state of the user interface), and in step 4912, control processor 116 determines that the function has been set to a particular scene. In method step 4914, control processor 116 recalls the scene by looking up the parameters of the scene, as they may have changed because of a different but related user interface, and then sends it to the dimmers associated with the button (in the event the button is directed towards a dimmer). According to aspects of the embodiment, all messages to and from every device are generic. These generic messages are then coordinated via a configuration file/database before an action is performed.

That same configuration file drives any and all configuration user interfaces that are working on the system, which means that all of those actions are inherently in sync. According to aspects of the embodiments, changing the functions of control network 100 is substantially similar to a "rewiring" of all the logic in real time.

Figure 50:
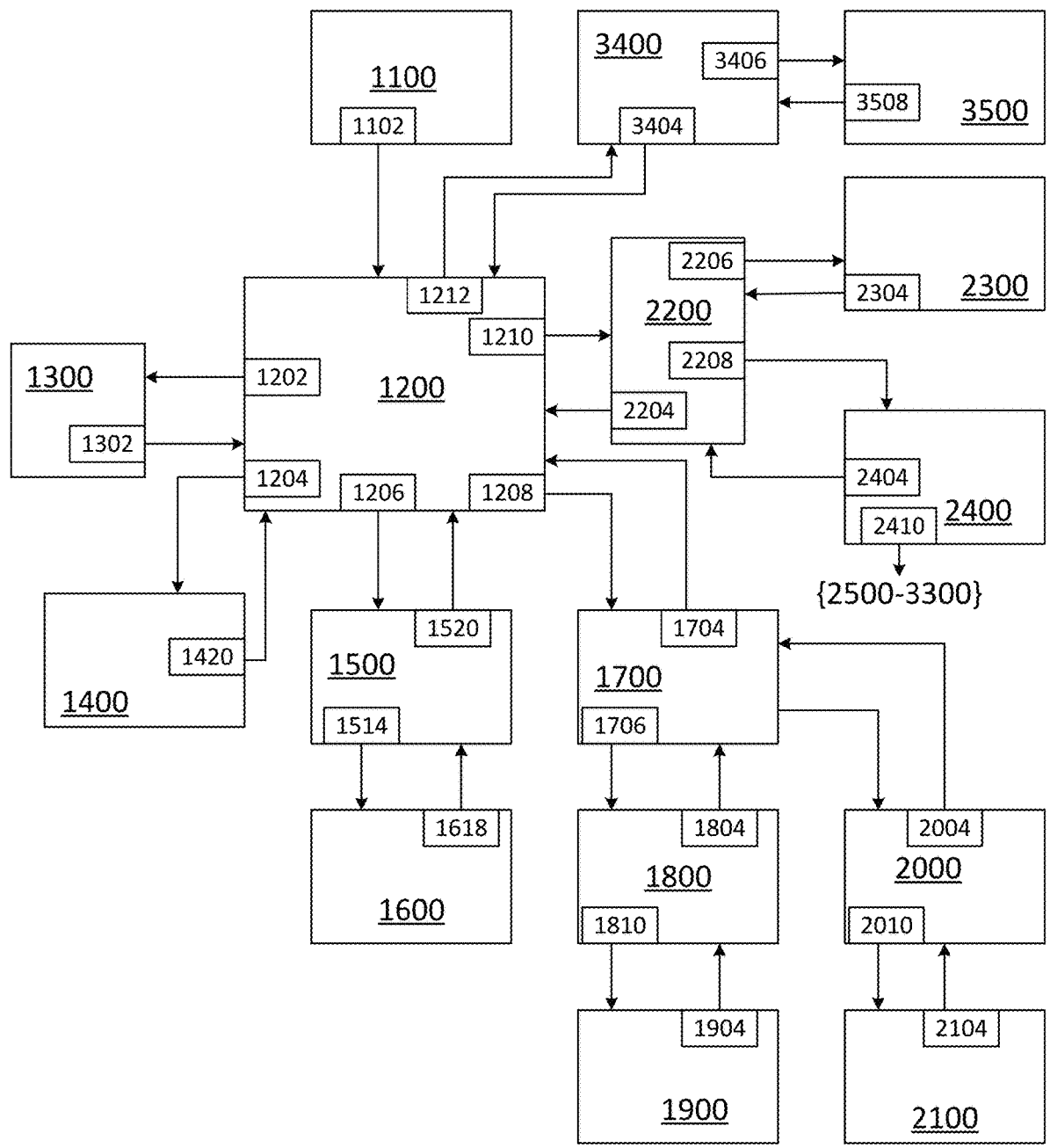
FIG. 50 illustrates a block diagram that shows the flow of control between and among a plurality of graphical user interfaces that can be used by a configuration application installed on one or more of a personal electronic device, or computer, among other types of devices, to install, setup, configure, and use, one or more controllable devices and a control network that can control the one or more controllable devices for use in a home, business, or enterprise environment according to aspects of the embodiments.

Attention is now directed towards FIG. 50. FIG. 50 is a block diagram that illustrates flow between and among a plurality of graphical user interfaces that can be used with a configuration application (such as Configuration App 506) installed on one or more of a personal electronic device, or computer, among other devices, to install, setup, configure, and use one or more controllable devices and a control network that can control the one or more controllable devices for use in a home, business, or enterprise environment according to aspects of the embodiments. In FIG. 50, each of the GUIs discussed above are represented by accordingly enumerated blocks with arrows that indicate direction of control between and among the GUIs; as those of skill in the art can appreciate, the arrow that indicate flow of control should not be construed as being the only paths or direction of control between and among the plurality of GUI's, but at least indicate ones that have been described in particular herein. Numbers associated with each flow line (lines with arrows) indicate the button/field/list or window that can be clicked/pressed by the user to move control in direction of the line arrow. In addition, since each GUI was described in reference to a single drawing, the element number assigned to the GUI indicates the Figure to which it can be found.

For example, in referring to FIG. 50, pressing or clicking button 1202 (for purposes of clarity and brevity, and not to be taken in a limiting fashion, each of the buttons/fields/lists described above and shown in FIG. 50 will be simply referred to as "buttons" for ease of discussion only) of Control System Configuration GUI 1200 leads the user to Room Configuration GUI 1300; the user can then perform certain actions while exposed to Room Configuration GUI 1300, and can return to Control System Configuration GUI 1200 upon pressing/clicking on Done button 1302. Control System Configuration GUI 1200 can be referred to as the "main" GUI or main screen, and from there all control precipitates. In some cases, returning to Control System Configuration GUI 1200 can take several steps, as when the user finds themselves accessing Good Morning Scene Configuration GUI 1900; to return to Lighting Scene Configuration GUI 1800 the user clicks/presses on slider 1904, then in Good Morning Scene Configuration GUI 1900 clicks/presses on Lighting Scene Configuration Done button 1804 to return to Intermediate Scene Configuration Menu GUI 1700, and then to return to Control System Configuration GUI 1200, clicks/presses on Scene Configuration Back button 1704.

Figure 53:
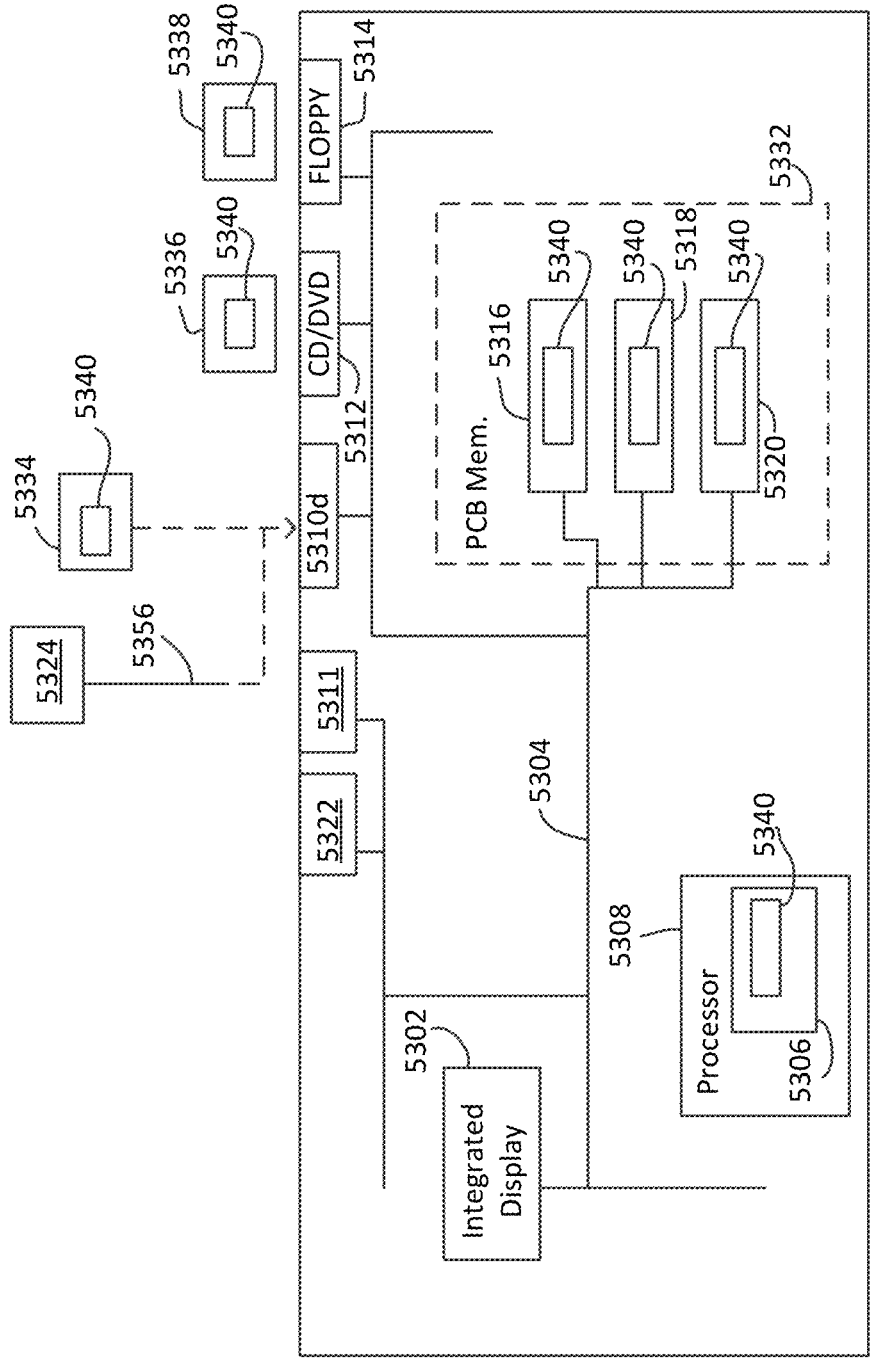
FIG. 53 illustrates processing and memory components/circuitry of one or more of the personal electronic device 104 of FIG. 4, gateway device 114 of FIG. 3, control processor 116 of FIG. 2, and any other devices that uses one or more processors as described herein that uses software and/or applications to perform various functions and actions as described herein according to aspects of the embodiments.

FIG. 53 illustrates processing and memory components/circuitry of one or more of the personal electronic device 104 of FIG. 4, gateway device 114 of FIG. 3, control processor 116 of FIG. 2, and any other devices that uses one or more processors as described herein that uses software and/or applications to perform various functions and actions as described herein according to aspects of the embodiments.

FIG. 53 illustrates processing and memory components/circuitry (generally referred to as a "computer" or personal computer (PC)) of one or more of the personal electronic device 104 of FIG. 4, gateway device 114 of FIG. 3, control processor 116 of FIG. 2, and any other devices that uses one or more processors as described herein that uses or runs or implements software and/or applications, such as the configuration application, project files, or control applications, to perform various functions and actions as described herein according to aspects of the embodiments, suitable for use to implement method 800 for setting up control network 100 according to an embodiment.

PC 5300 comprises, among other items, integrated display/touch-screen 5302 (though not used in every application of PC 5300), internal data/command bus (bus) 5304, processor board/PC internal memory (internal memory) 5332, and one or more processors 5308 with processor internal memory 5306 (which can be typically read only memory (ROM) and/or random access memory (RAM)). Those of ordinary skill in the art can appreciate that in modern PC systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. PC 5300 further comprises multiple input/output ports, such as universal serial bus (USB) ports 5310, Ethernet ports 5311, and video graphics array (VGA) ports/high definition multimedia interface (HDMI) ports 5322, among other types. Further, PC 5300 includes externally accessible drives such as compact disk (CD)/digital video disk (DVD) read/write (RW) (CD/DVD/RW) drive 5312, and floppy diskette drive 5314 (though less used currently, many PCs still include this device).

Internal memory 5332 itself can comprise hard disk drive (HDD) 5316 (these can include conventional magnetic storage media, but, as is becoming increasingly more prevalent, can include flash drive memory 5334, among other types), read-only memory (ROM) 5318 (these can include electrically erasable (EE) programmable ROM (EEPROMs), ultraviolet erasable PROMs (UVPROMs), among other types), and random access memory (RAM) 5320. Usable with USB port 5310 is flash drive memory 5334, and usable with CD/DVD/RW drive 5312 are CD/DVD disks 5336 (which can be both read and write-able). Usable with floppy diskette drive 5314 are floppy diskettes 5338. External memory storage 5324 can be used to store data and programs external to box 5301 of PC 5300, and can itself comprise another HDD 5316*a*, flash drive memory 5334, among other types of memory storage. External memory storage 5324 is connectable to PC 5300 via USB cable 5356. Each of the memory storage devices, or the memory storage media (5306, 5316, 5318, 5320, 5324, 5334, 5336, and 5338, among others), can contain parts or components, or in its entirety, executable software programming code or application (application, or "App") 5340, which can implement part or all of the portions of method 800 described herein.

Bus 5304 provides a data/command pathway for items such as: the transfer and storage of data/commands between processor 5308, integrated display 5302, USB port 5310, Ethernet port 5311, VGA/HDMI port 5322, CD/DVD/RW drive 5312, floppy diskette drive 5314, and internal memory 5332. Through bus 5304, data can be accessed that is stored in internal memory 5332. Processor 5308 can send information for visual display to either or both of integrated and external displays, and the user can send commands to system operating programs/software/Apps 5340 that might reside in processor internal memory 5306 of processor 5308, or any of the other memory devices (5336, 5338, 5316, 5318, and 5320).

PC 5300, and either processor internal memory 5306 or internal memory 5332, can be used to implement method 800 for setting up control network 100 according to an embodiment. Hardware, firmware, software, or a combination thereof can be used to perform the various steps and operations described herein. According to an embodiment, App 5340 for carrying out the above discussed steps can be stored and distributed on multimedia storage devices such as devices 5316, 5318, 5320, 5334, 5336 and/or 5338 (described above) or other form of media capable of portably storing information. Storage media 5334, 5336 and/or 5338 can be inserted into, and read by devices such as USB port 5310, CD/DVD/RW drive 5312, and floppy diskette drive(s) 5314, respectively.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information, and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired, or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

INDUSTRIAL APPLICABILITY

To solve the aforementioned problems, the present invention is a unique control system comprising a control processor comprising a gateway, a control point, a communication network and one or more controllable devices, a portable electronic device executing a control application.

What is claimed is:

1. A method for establishing a building automation system comprising:

establishing a first communications network by a gateway device between and among each of a plurality of controllable devices, one or more controlling devices, and the gateway device;

installing a configuration application on a personal electronic device (PED), wherein the configuration application is adapted to configure and setup the building automation system using a control system application;

installing the control system application in one or more of the one or more controlling devices, the gateway device, or a control processor,
- wherein the control system application is adapted to control communications between each of the plurality of controllable devices, controlling devices, the gateway device, and applications in the building automations system, and wherein,
- the configuration application is adapted to link, for purposes of local control, one or more of the plurality of controllable devices with a first controlling device;

putting the gateway device into an acquiring mode;

acquiring information by the gateway device about each of the plurality of controllable devices;

correlating each of the plurality of controllable devices to a predefined area that is part of a building, such that the control system application learns which function or functions each of the plurality of controllable devices performs in regard to the predefined area of the building; and assigning each of the correlated plurality of controllable devices to its predefined area.

2. The method according to claim 1, wherein the environment comprises:
an exterior of the building, and wherein the controlling device is located in an interior of the building.

3. The method according to claim 1, wherein the controllable devices comprise:
one or more of lights and shades.

4. The method according to claim 1, wherein the first controlling device comprises:
a controlling device adapted to be located in a same room as the one or more controllable devices controlled by the controlling device.

5. The method according to claim 1, wherein the step of establishing a first communications network comprises:
discovering the gateway communications device and the control processor by the configuration application using a local communications network (LAN); and
establishing communications between the configuration application and each of the control processor and gateway communications device.

6. The method according to claim 5, wherein the step of discovering comprises:
using an auto-discovery process by the configurations application, whereby neither internet protocol addresses nor randomly generated hostnames are used in the auto-discovery process.

7. The method according to claim 6, further comprising:
actively engaging by a user the one or more controllable devices that the configuration application has alerted the user must be actively engaged before the step of acquiring.

8. The method according to claim 7, wherein the step of actively engaging comprises:
putting the controllable device into an acquire mode.

9. The method according to claim 8, wherein the step of putting the controllable device into acquire mode comprises:
pushing a pre-established button/interface.

10. The method according to claim 8, wherein the step of putting the controllable device into acquire mode comprises:
sending a separate message to the controllable device putting the controllable device into an acquire mode.

11. The method according to claim 1, wherein the step of acquiring further comprises:
alerting a user when one or more of the controllable devices must be actively engaged by the user prior to the step of acquiring.

12. The method according to claim 11, wherein the environment comprises:
a room within the building.

13. The method according to claim 11, wherein the environment comprises:
an exterior portion of the building.

14. The method according to claim 1, wherein the step of correlating comprises:
associating, but not yet assigning, one or more controllable devices to an environment within the building.

15. The method according to claim 14, wherein the step of associating comprises:
associating a subset of all of the controllable devices in a first environment to the first environment.

16. The method according to claim 15, wherein the un-associated devices can be grouped according to a functional relationship.

17. The method according to claim 16, wherein the functional relationship can include lighting and lighting control.

* * * * *